United States Patent Office 3,598,808
Patented Aug. 10, 1971

3,598,808
PERHYDRO - 5 - PHENYL-CYCLOALKAPOLYENE-1,4-OXAZEPINES AND THEIR PREPARATIONS
Jacob Szmuszkovicz, Kalamazoo, Mich., assignor to The Upjohn Company, Kalamazoo, Mich.
No Drawing. Filed Sept. 3, 1968, Ser. No. 757,135
Int. Cl. C07d 87/54
U.S. Cl. 260—239.3
74 Claims

ABSTRACT OF THE DISCLOSURE

Perhydro - 5 - phenyl - cycloalkapolylene - 4,1-oxazepines of the Formula XXIII:

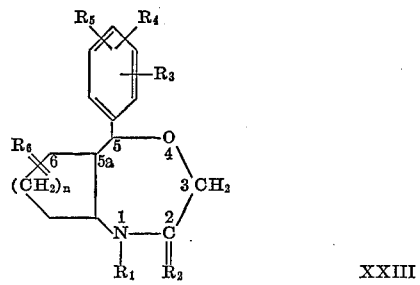

wherein $n$ has a value from 1 to 4, inclusive; wherein $R_1$ is hydrogen, alkyl from 1 to 16 carbon atoms, inclusive, phenylalkyl, heterocyclicaminoalkyl, alkylaminoalkyl, dialkylaminoalkyl, alkanoyl from 1 to 16 carbon atoms, inclusive, benzoyl, phenylacetyl,

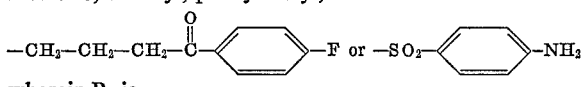

wherein $R_2$ is

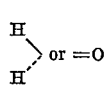

wherein $R_3$, $R_4$ and $R_5$ are selected from the group consisting of hydrogen, hydroxy, halogen, lower alkyl, lower alkoxy, lower alkanoyloxy and $CF_3$; and wherein $R_6$ is hydrogen or

including acid addition salts, quaternary ammonium salts, the N-oxides and acid addition salts thereof are prepared. The compounds of the formula above, wherein $R_2$ is

stimulate the central nervous system and can be used orally or parenterally in the treatment of respiratory difficulties and geriatrics in farm or pet animals. The compounds of the above formula wherein $R_2$ is =O are intermediates.

BACKGROUND OF THE INVENTION

Field of the invention

This invention relates to new organic compounds and is particularly concerned with new central nervous system stimulating perhydro-5-phenyl (and substituted phenyl)-4,1-oxazepines, the intermediates thereof, N-oxides, acid addition salts and quaternary ammonium salts thereof as well as the process for the production therefor.

SUMMARY OF THE INVENTION

The new compounds and the processes of their production are illustratively represented by the following sequences of formulae:

(1) METHOD FOR CIS-A COMPOUNDS

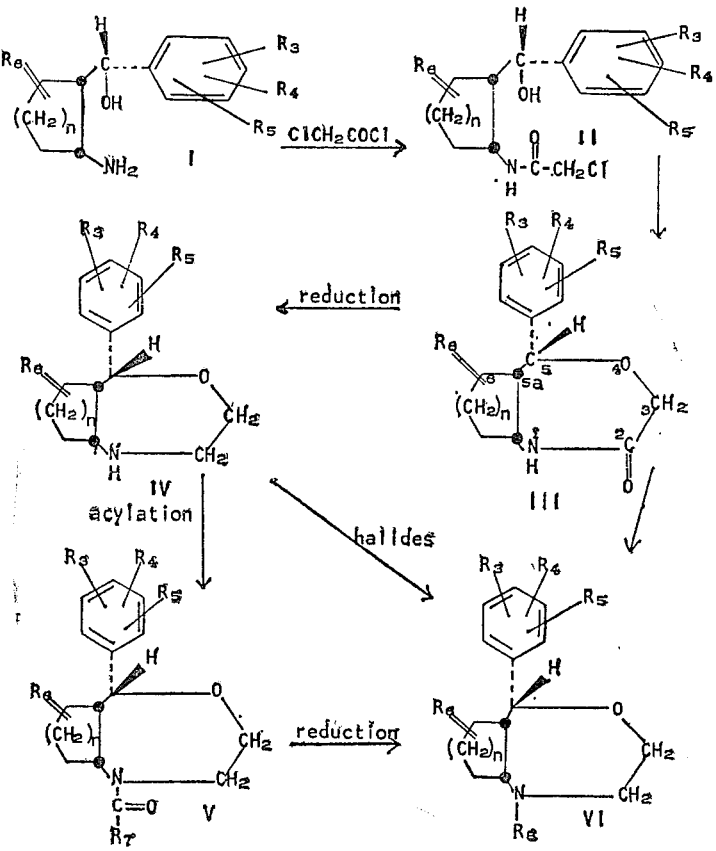

In the same manner the cis-B, trans-C and trans-D compounds are produced, by substituting the cis-A-1,3-aminoalcohol (I) with the corresponding cis-B, trans-C or trans-D alcohols, or by using similar procedures.
Thus:
(2) METHOD FOR CIS-B COMPOUNDS
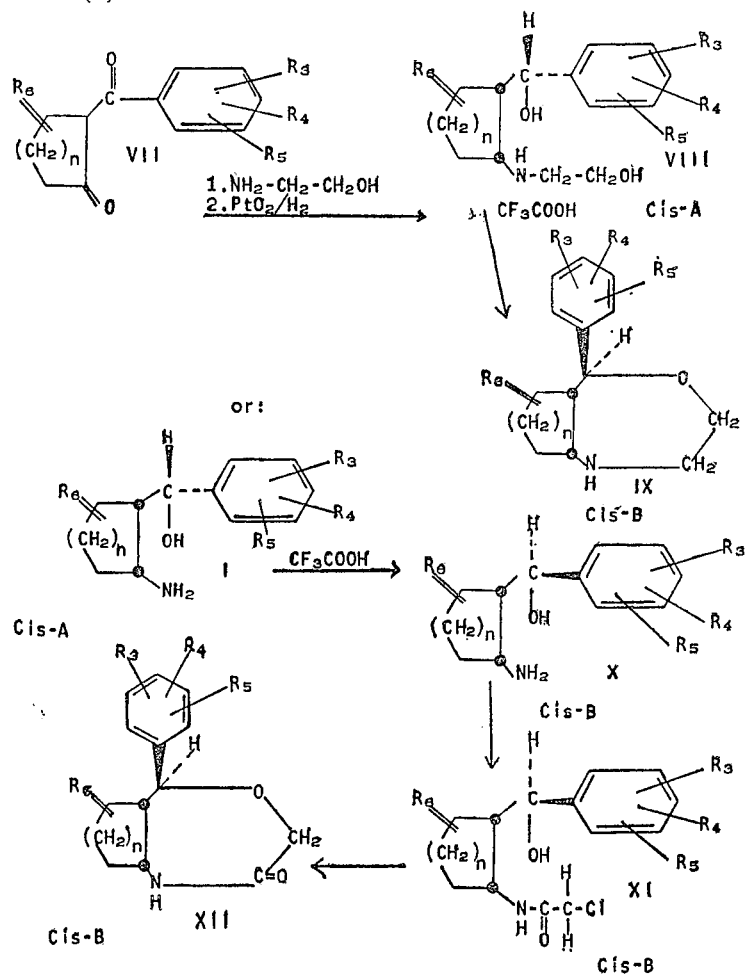
(3) METHOD FOR TRANS-C COMPOUNDS
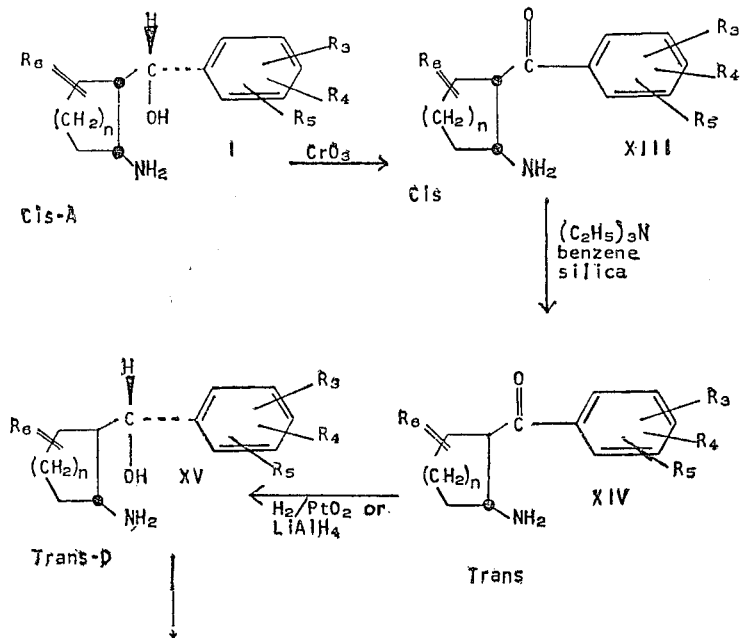

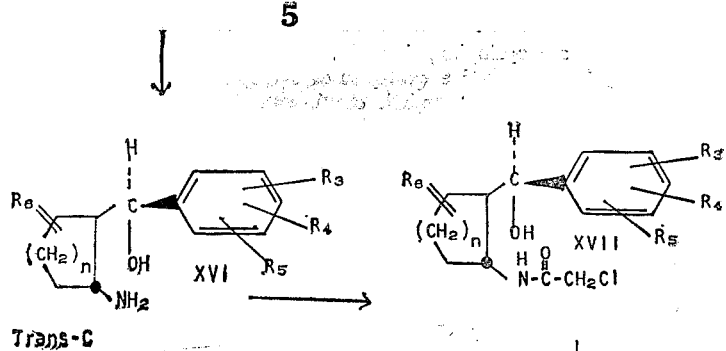
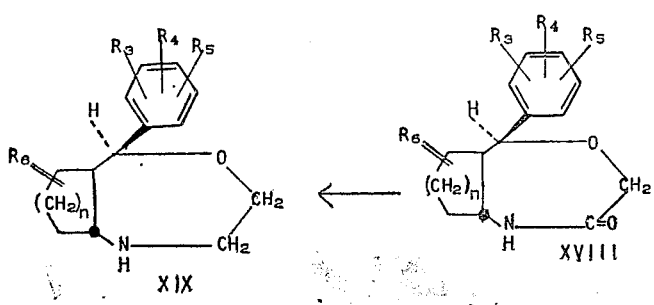
(4) METHOD FOR TRANS-D COMPOUNDS
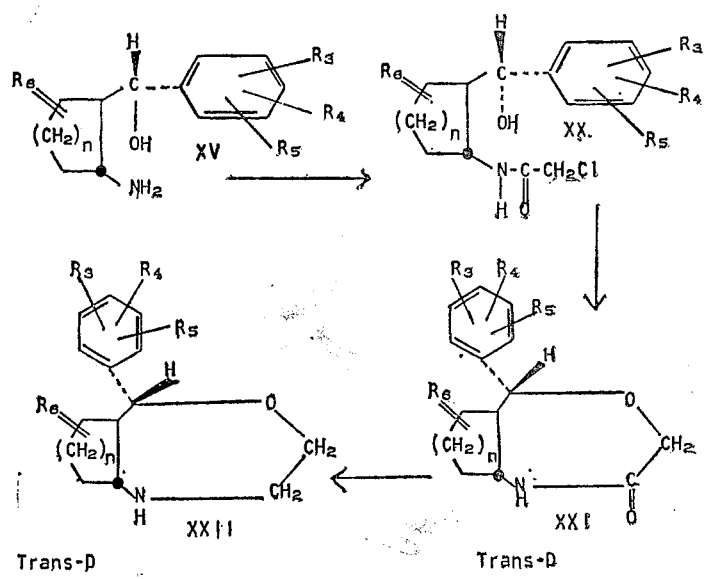
wherein $n$ has a value from 1 to 4, inclusive; wherein $R_3$, $R_4$ and $R_5$ are selected from the group consisting of hydrogen, hydroxy, halogen, alkyl, alkoxy and alkanoyloxy of 1 to 6 carbon atoms, inclusive, and —$CF_3$; wherein $R_6$ is
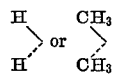
wherein $R_7$ is hydrogen, lower alkyl, —$CH_2C_6H_5$ and —$C_6H_5$; and wherein $R_8$ is alkyl, phenylalkyl,
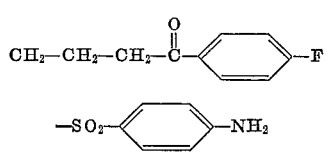

and

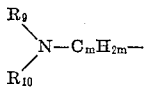

in which

is selected from the group consisting of alkylamino and dialkylamino wherein each alkyl has from 1 to 6 carbon atoms, inclusive, and heterocyclicamino selected from the group consisting of unsubstituted and mono- and polyalkyl substituted pyrrolidino, piperidino, morpholino, piperazino and hexamethyleneimino, and in which $m$ has a value from 2 to 6, inclusive.

The products shown in the methods for cis-B, trans-C and trans-D are end products, namely IX, XII, XVIII and XIX, XXI and XXII, and can all be further substituted at the nitrogen atom of the perhydrooxazepine ring, as has been shown for compounds III and IV, in the above method for cis-A compounds.

The invention, therefore, comprises compounds of the Formula XXIII:

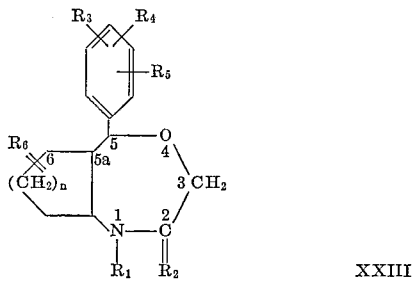

XXIII wherein $n$, $R_3$ $R_4$ $R_5$ and $R_6$ are defined as hereinabove; wherein $R_1$ is selected from the group consisting of hydrogen, alkyl to 1 to 16 carbon atoms, inclusive, phenylalkyl, alkanoyl of 1 to 16 carbon atoms, inclusive, benzoyl, phenylacetyl,

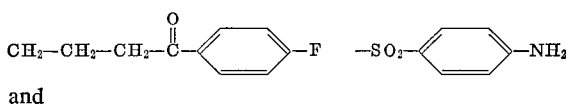

and

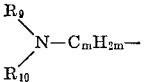

as defined hereinabove; and wherein $R_2$ is

The invention also encompasses the acid addition salts, quaternary ammonium salts, and the N-oxides and the acid addition salts thereof, of the compounds of Formula XXIII.

The novel compounds of Formula XXIII have three asymmetric centers and therefore exist in different stereoisomeric forms such as geometric and optically active forms as well as in racemic mixtures. These optically active forms and racemic mixtures and geometric isomers are also encompassed by this invention.

The invention further more encompasses the methods to produce the final products of Formula XXIII and the intermediates.

Examples of the cycloalkyl radical illustratively represented by the formula:

are cyclophentyl, cyclohexyl, cycloheptyl and cyclooctyl.

Illustrative examples of alkyl groups of 1 to 6 carbon atoms are methyl, ethyl, propyl, isopropyl, butyl, isobutyl, tertiary butyl, pentyl, 2-methylbutyl, neopentyl, hexyl, 2-methylpentyl, 3-methylpentyl and the like. Alkyl groups of 1 to 16 carbon atoms, for $R_1$ and for the quaternary ammonium halide salts, include, in addition to the preceding alkyl groups, other alkyl such as heptyl, octyl, nonyl, decyl, undecyl, dodecyl, tridecyl, tetradecyl, pentadecyl, hexadecyl, the branched isomers thereof, and the like.

The halogen moiety in quaternary ammonium salts includes iodine, bromine and chlorine.

Phenylalkyl groups herein used are particularly benzyl, phenethyl, 2- and 3-phenylpropyl, 2-, 3- and 4-phenylbutyl, 5-phenylpentyl, 6-phenylhexyl, 3-phenylpentyl and the like.

Examples of heterocyclicaminoalkyl radicals are of the formula

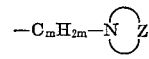

in which $m$ has a value of 2 to 6, inclusive, and

is of 5 to 7 nuclear atoms, such as pyrrolidino, 2-methylpyrrolidino, 2-ethylpyrrolidino, 2,2-dimethylpyrrolidino, 2-isopropylpyrrolidino, 2-sec.butylpyrrolidino, and like alkylpyrrolidino groups, morpholino, 2-ethylmorpholino, 2 - ethyl-5-methylmorpholino, 3,3 - dimethylmorpholino, 4-methylpiperazino, 4-butylpiperazino, piperidino, 2-methylpiperidino, 3 - methylpiperidino, 4 - methylpiperidino, 4-propylpiperdino, 2-propylpiperidino, 4-isopropylpiperidino, and like alkylpiperidino groups, hexamethyleneimino, 2 - methylhexamethyleneimino, 3,6 - dimethylhexamethyleneimino, and the like.

Examples of

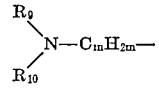

wherein at least one of $R_9$ anl $R_{10}$ is alkyl include (2-methylamino)ethyl, 2 - (ethylamino)ethyl, 2 - (propylamino)ethyl, 2-(butylamino)ethyl, 2-(pentylamino)ethyl, 2-(hexylaminoethyl, 2 - (isopropylamino)ethyl, 2 - (sec. butylaminoethyl, 3 - (isopropylamino)propyl, 5-(methylamino)pentyl, 3-(pentylamino)propyl, 2-(dipropylamino) ethyl, 2-(diisopropylamino)ethyl, 2-(dibutylamino)ethyl, 2-(dipentylamino)ethyl, 2 - (dihexylamino)ethyl, 3 - dihexylamino)propyl, 3-(dipropylamino)propyl, 5 - (diisobutylamino)pentyl, 6-(diethylamino)hexyl, 2-(dimethylamino)propyl and the like.

Representative examples of alkanoyl radicals of 1 to 16 carbon atoms, inclusive, are the acyl radicals of alkanoic acids such as formic, acetic, propionic, butyric, valeric, hexanoic, heptanoic, octanoic, nonanoic, decanoic, undecanoic, dodecanoic, tridecanoic, tetradecanoic, pentadecanoic, hexadecanoic, and their branched analogues and the like.

Under halogen substituents for $R_3$, $R_4$ or $R_5$ is understood fluorine, chlorine, bromine and iodine.

Alkoxy substituents with 1 to 6 carbon atoms, inclusive, on the phenyl ring are exemplified by methoxy, ethoxy, propoxy, isopropoxy, butoxy, pentyloxy, hexyloxy and the like.

Alkanoyloxy substituents with 1 to 6 carbon atoms, inclusive, on the phenyl ring include acetoxy, propionoxy, butyryloxy, valeryloxy, hexanoyloxy and the like.

The process for the production of compounds of Formula XXIII in the cis-A form comprises treating a selected cis-A-α-phenyl (or substituted phenyl)-2-aminocycloalkanemethanol of Formula I with chloroacetyl chloride to give the corresponding cis-A-2-chloro-N-[2-(α-hydroxybenzyl or substituted benzyl)cycloalkyl]acetlactic, acetic, citric, sulfuric, tartaric, hydroiodic, hydrobromic and the like. Moreover, the fluosilicates of these compounds are useful as moth-proofing agents. The thiocyanates of the same compounds can be condensed with formaldehyde to form resinous polymers which are useful as pickling inhibitors. The trichloroacetates of the same compounds are useful as herbicides, for example, against Johnson grass, yellow foxtail, green foxtail, Bermuda grass and quack grass.

The quaternary alkyl ammonium halides of the amino compounds of Formula XXIII possess high wetting power and electroconductivity and are thus suitable to prepare electrocardiographic jellies.

A suitable composition of an electrocardiographic jelly thus prepared comprises:

| | Parts |
|---|---|
| Glycerol | 5 |
| Starch | 10 |
| Quaternary ammonium salt | 60 |
| Water | 100 |

The jelly is prepared by mixing the starch, glycerol and water and then adding the quaternary ammonium salt. The mixture is then allowed to stand for at least two days with occasional agitation to allow the formation of a gel.

The starting materials of Formula I are prepared as shown in the preparations.

In carrying out the process of the present invention for the cis-A-oxazepines, a selected cis-A-α-phenyl (or substituted phenyl)-2-aminocycloalkanemethanol is reacted with chloroacetyl chloride in the presence of an acid acceptor such as pyridine, triethylamine, tripropylamine or the like, in an inert organic solvent. As solvent, ether, tetrahydrofuran, dibutyl ether and the like can be used. In the preferred embodiment of this invention, the temperature is kept at between 20° and —10° C. or below, and the chloroacetyl chloride and the selected substituted methanol are employed in a molar ratio of 1:1.1. The addition of the chloroacetyl chloride, usually dissolved in ether, to the cooled solution of the substituted methanol and triethylamine is performed slowly so as to avoid heating. The temperature is kept below 10° C. The reaction is generally carried out between —10° and +20° C. At this temperature range, the reaction is completed in 30 min. to 2 hours. After termination of the reaction, the product, a cis-A-2-chloro-N-[2-(α-hydroxybenzyl or substituted benzyl)cycloalkyl]acetamide, is separated from the mixture by conventional procedures such as extraction and evaporation of the extracted material and is purified by recrystallization such as from ether, methanol, ethyl acetate, and the like.

The thus-obtained chloroacetamide (II) is treated with a strong base for cyclization. For example, it may be treated with a solution of sodium in excess ethanol at a temperature between 20–50° C. under continuous stirring or, as an alternative, in a solution of tetrahydrofuran with sodium hydride as a base, at about room temperature. The base is usually used in a slight excess to twice the molar equivalent required. In general, a solvent can be used, e.g., an alcohol such as methanol, ethanol, 1-propanol, 2-propanol, tetrahydrofuran, diethyl ether, dibutyl ether, tetrahydrofuran, or the like at temperatures between 20–50° C. with sodium or potassium ethoxide or methoxide or preferably, sodium hydride as the preferred bases. The reaction time at room temperature is generally between 6 hours to 48 hours. After termination of the reaction, the material is recovered and purified by conventional procedures such as extraction, chromatography, recrystallization, and the like.

The thus-obtained oxazepin-2-one (III) is reduced in a conventional manner with lithium aluminum hydride in a solvent such as ether and, more specifically and preferably, tetrahydrofuran. When tetrahydrofuran is used, the compound is refluxed in a solution for a period of 2 to 48 hours. After the reaction is terminated, the product, an oxazepine of Formula IV, is isolated by conventional procedures such as extraction and recrystallization.

If an alkyl derivative of the oxazepine is wanted, the selected oxazepine is treated with a acylating agent, such as an alkanoic acid anhydride or an alkanoyl halide, or formic acid or ethyl formate if a methyl compound is desired. If ethyl formate is employed, the compound (IV) is refluxed in ethyl formate for 1 to 4 days, and the mixture is then evaporated to give the corresponding cis-A-perhydro-5-phenyl-(or substituted phenyl)-oxazepine-1-carboxaldehyde. In case acid anhydrides or acid chlorides or bromides are used, usually 1 hour of heating on the water bath is sufficient to complete the reaction. After the completion of the reaction, the product is recovered in conventional manner, usually by extracting the mixture, after removing by distillation or vacuum distillation the excess anhydride or chloride used. The products are purified by crystallization, chromatography, additional extractions or the like.

The thus-obtained N-alkanoyl derivative of the oxazepine (V) is reduced in conventional manner with lithium aluminum hydride using a solvent such as diethyl ether, dibutyl ether, tetrahydrofuran or mixtures thereof. The reduction is carried out at a temperature between room temperature (24 to 26° C.) and the refluxing temperature of the mixture. The thus-obtained N-alkyl substituted compounds (VI) are purified in conventional manner, such as additional extraction, chromatography, and recrystallization.

Substitution of the nitrogen of the oxazepine can also be carried out by alkyl halides, alkylamino- and dialkylaminoalkyl halides, 4-chloro-4'-fluorobutyrophenone and other alkylating agents in the presence of a base, preferably sodium hydride. This reaction is carried out with oxazepines or with oxazepin-2-ones in the presence of a base. The base is preferably sodium hydride in the case of an oxazepin-2-one, or in the case of an oxazepine is sodium or potassium carbonate and sometimes as a catalyst, crystals of potassium iodide. Dialkylformamide, dialkylacetamide, higher ketones, and the like are used as solvents in the reaction. The reaction is usually carried out at a temperature between 20° C. and reflux temperature of the mixture with a reaction time between 2 to 72 hours. After the reaction is terminated, the product is isolated and purified by conventional procedures, such as extraction, chromatography, and the like. Purification is usually carried out by chromatography or recrystallization.

In the method used for the production of cis-B compounds, a 2-benzoyl(or substituted benzoyl)cycloalkanone (VII), 2-aminoethanol and benzene are refluxed and subsequently reduced to give the corresponding cis-A-2-[(2-hydroxyethyl)amino]-α-phenyl(or substituted phenyl)cycloalkanemethanol (VIII).

This cycloalkanemethanol (VIII) is treated with trifluoroacetic acid to give the cis-B-polyhydro-5-(phenyl or substituted phenyl)-4,1-oxazepine (IX). This cis-B-oxazepine (IX) can be further substituted at the nitrogen atom as shown for the cis-A-oxazepines.

Alternatively, cis-B-oxazepines can be produced by converting a cis-A-methanol (I) to the corresponding cis-B-methanol (X) with trifluoroacetic acid, and treating the cis-B-methanol (X) according to method (1), i.e., chloroacetylating to give (XI) and treatment with a base to give the cis-B-oxazepin-2-one (XII) which by reduction with lithium aluminum hydride produces the cis-B-oxazepine (IX).

The methods to produce trans-oxazepines consist in reacting a cis-A-2-amino-α-phenyl(or substituted phenyl)-cycloalkane-methanol (I) with chromium trioxide to give the corresponding cis-phenyl(or substituted phenyl)2-aminocyclohexyl ketone (XIII). This reaction is in general carried out in a solvent such as acetone or acetic acid in the presence of sulfuric acid. The addition of the chromium trioxide in sulfuric acid solution is usually carried amide (II). This compound, when treated with a strong base such as sodium hydride, sodium ethoxide, or the like gives the corresponding oxazepin-2-one (III). The oxazepin-2-one (III) is reduced with lithium aluminum hydride to give the corresponding oxazepine (IV). The oxazepine can be acylated, for example with formic acid, ethyl formate, alkanoyl halide, alkanoic anhydride, benzoyl halide, benzoic anhydride, phenylacetyl halide, or phenylacetic anhydride to give the corresponding amides (V), which can be reduced with lithium aluminum hydride to give the N-alkyl or N-phenylalkyl oxazepine (VI). The oxazepine (IV) can also be N-alkylated, for example, with alkyl halides, alkylaminoalkyl halides, dialkylaminoalkyl halides, heterocyclicaminoalkyl halides, 4-chloro-4'-fluorobutyrophenone, phenylalkyl halides or the like. The oxazepin-2-one of Formula III can be treated with alkyl halides or phenylalkyl halides, alkylaminoalkyl halides, dialkylaminoalkyl halides, heterocyclicaminoalkyl halide, 4-chloro-4'-fluorobutyrophenone, or the like in the presence of a strong base such as sodium hydride to give the corresponding N-substituted oxazepin-2-one, which can be reduced with lithium aluminum hydride to give an oxazepine of Formula VI.

The cis-B-compound can be made either by reacting a 2-benzoyl (or substituted benzoyl) cycloalkanone (VII) with 2-aminoethanol, hydrogenating the thus-obtained enamine in the presence of platinum oxide to obtain the corresponding cis - A - 2 - [(2-hydroxyethyl)amino]-α-phenyl (or substituted phenyl)cycloalkanemethanol (VIII) which, with trifluoroacetic acid, produces the cis-B-oxazepines of the Formula IX.

The other method of producing cis-B-oxazepines consists of rearranging a cis-A-α-phenyl (or substituted phenyl-2-aminocycloalkanemethanol (I) by treatment with trifluoroacetic acid to obtain the corresponding cis-B-methanol (X) which is then treated like the cis-A alcohol in Method (1), that is, with chloroacetyl chloride followed by treatment with a base to give the corresponding oxazepin-2-one (XII) which can be reduced with lithium aluminum hydride to give the corresponding cis-B-oxazepine. The cis-B-oxazepine or the cis-B-oxazepin-2-one can be further alkylated or substituted in the manner shown for compounds III and IV in the above method (1).

The method (3) for the trans compounds consists of oxidizing a cis-A-α-phenyl (or substituted phenyl)-2-aminocycloalkanemethanol (I) with chromium trioxide to obtain the corresponding cis-(phenyl or substituted phenyl) 2-aminocycloalkyl ketone (XIII) which by treatment with triethylamine in benzene solution and silica is transformed to the corresponding trans isomer (XIV). This trans isomer by reduction with lithium aluminum hydride or catalytically in the presence of platinum oxide produces the trans-D-α-phenyl (or substituted phenyl)-2-aminocycloalkanemethanol (XV) which by treatment with trifluoroacetic acid gives the corresponding trans-C-α-phenyl (or substituted phenyl)-2-aminocycloalkanemethanol (XVI). By treating the trans-C and trans-D methanols of Formulas XVI and XV in the manner given for the cis-A-methanol [method (1)], the corresponding trans-C- and trans-D-oxazepine are obtained, which can be substituted in the manner shown for the cis-A-oxazepine.

Acid addition salts of the oxazepines or of the N-oxides of oxazepines of Formula XXIII are synthesized in the usual manner, that is, by directly reacting the acid with free amine, preferably in an aqueous or anhydrous solvent such as water, ether, methanol, ethanol, ethyl acetate or the like. Evaporation of the solvent provides the desired acid addition salt.

N-oxides of the tertiary amino compounds of Formula XXIII are obtained by reacting the compound at a temperature between 0–30° C., preferably at the start of the reaction at a temperature between 0–10° C., with a peracid such as performic, peracetic, perpropionic, perbenzoic, perphthalic, m-chloroperbenzoic or other organic peracids in a solvent such as methylene chloride, chloroform, methanol, ethanol, ether or the like. Evaporation of the solvent provides the desired N-oxide.

The quaternary alkyl ammonium halides of compounds of Formula XXIII are produced by conventional methods such as heating to reflux a solution of the selected amine in the presence of acetone, methanol, ethanol, acetonitrile or the like, with an excess of a selected alkyl halide such as an iodide or bromide or, less desirably, a chloride of methyl, ethyl, propyl, butyl, isobutyl, isopropyl, pentyl, hexyl, heptyl, octyl, decyl, undecyl, dodecyl, tridecyl, tetradecyl, pentadecyl, hexadecyl or isomers of these alkyl compounds and the like. After the reaction is terminated, the reaction mixture is evaporated to dryness to give the product, which can be purified by recrystallization from organic solvents such as methanol, ethanol, ether, Skellysolve B hexanes, mixtures thereof and the like.

The amine compounds of Formula XXIII including acid addition salts, quaternary alkyl ammonium halide salts, N-oxides and acid addition salts thereof are useful stimulating agents, which act on the central nervous system. They can be used for stimulation of the respiratory, medullary, vagal and vasomotoric centers of mammals and birds.

They may be administered to mammals and birds by both oral and parenteral routes in order to produce their pharmacological, i.e., stimulating effects. For oral administration, the new amines of Formula XXIII, as well as the acid addition salts, the N-oxides and acid addition salts thereof, and the quaternary alkyl ammonium halide salts, can be compounded into solid and liquid unit dosage forms such as tablets, capsules, powders, granules, syrups, elixirs and the like, containing the appropriate amounts for treatment. For tablets, common pharmaceutically acceptable carriers are used such as starch, lactose, kaolin, dicalcium phosphate and the like. The compound XXIII can also be given as powders, particularly in gelatin capsules with or without carriers such as methylcellulose, magnesium stearate, calcium stearate, talc and the like. For fluid preparations, these compounds may be dissolved or suspended in aqueous alcoholic vehicles with or without buffering agents and flavoring mixtures.

The thus-obtained pharmaceutical formulations are administered to animals for the treatment of conditions associated with respiratory difficulties, e.g., pneumonia, bronchitis, asthma, or with heart insufficiencies. In particular, these compounds are useful as geriatric stimulants for pet animals. Dosages between 0.5–100 mg./kg. of body weight per day produce significant stimulation.

The "Spontaneous Motor Activity" increase of cis-A-decahydro-5-(p-methoxyphenyl) - 4,1 - benzoxazepine hydrochloride was measured in mice (6 cages with 2 mice each) with the actophotometer [J. Pharm. Sci., 57, 613 (1968)]. The crossings of the mice through an invisible light beam per couple of animals per 10 minutes is counted by the actophotometer.

| Mg./kg. of cis-A-decahydro-5-(p-methoxyphenyl)-4,1-benzoxazepine hydrochloride: | Average number of crossings per couple of mice during 10 minutes |
|---|---|
| 0 | 178 |
| 1 | 279 |
| 3 | 284 |
| 10 | 483 | i.e. already 1 mg. of the active product produces a 60% rise in motor activity.

In the EEG power spectrum analysis in cats cis-A-decahydro-5-(p-methoxyphenyl) - 4,1 - benzoxazepine hydrochloride was 4 times more active than caffeine (measured over a range of 4–8 mg. intravenous per kg.).

As noted above, the new amine compounds of Formula XXIII can be used in the form of their acid addition salts with inorganic or organic acids, for example, hydrochloric, out at temperatures between 0–30° C. over a period of 5 minutes, followed preferably by stirring of the solution for a period of 5–30 minutes. The reaction is then terminated by either adding an excess of water or by adding an alcohol such as isopropyl alcohol or ethanol, to prevent further oxidation of the desired cis-ketone (XIII). Conventional procedures are used to isolate and purify the desired product, ketone (XIII), such as extraction, chromatography, and recrystallization.

The above cis-ketone (XIII) is converted to the trans-ketone (XIV) by stirring at room temperature in a solution of benzene, toluene, xylene and the like, containing about 1% to 5% triethylamine and 3% to 10% methanol in the presence of a large excess of silica gel. The amount of the cis-ketone to the silica is in a ratio between 1:3 up to 1:10 by weight. The reaction mixture is stirred, usually at a temperature between 10–35° C. for a period of 6–48 hours. Thereafter, the silica gel is removed by filtration, the filtrate is distilled in vacuo and the product, a trans-phenyl (or substituted phenyl) 2-aminocycloalkyl ketone (XIV) is obtained by conventional procedures such as extraction, recrystallization, and the like.

The above trans-ketone (XIV), either by catalytic reduction or by reduction with lithium aluminum hydride, gives the corresponding trans-D-2-amino-α-phenyl (or substituted phenyl) cycloalkanemethanol (XV). The catalytic reduction is carried out preferably in methanol or ethanol using platinum oxide as a catalyst. The catalyst is used in a quantity of from 2–10% by weight, with respect to the weight of the trans-ketone (XIV). The time of the catalytic hydrogenation is usually between 12 to 72 hours at room temperature, 20–26° C. After the reduction is complete, or nearly complete, as can be seen from the amount of hydrogen consumed, the reaction mixture is filtered and concentrated and the desired product obtained by conventional procedures, e.g., by extraction, recrystallization, chromatography and the like.

In the event that lithium aluminum hydride is used for the reduction, the trans-ketone is generally added, in ether or tetrahydrofuran solution, to an ether or tetrahydrofuran solution of lithium aluminum hydride. The reaction time is usually between 10–48 hours, at room temperature, but temperatures between 10–30° C. up to the reflux temperature of the reaction mixture are operative. After the reaction is completed, the reaction mixture is decomposed by the addition of water and sodium hydroxide, filtered, the filtrate is evaporated to dryness. The desired trans-D-methanol (XV) is isolated and purified by conventional procedures, such as recrystallization, extraction, and the like.

From the trans-D-methanol (XV), the trans-C-methanol, that is, trans-C-2-amino-α-(phenyl or substituted phenyl)cycloalkanemethanol (XVI) is obtained by treating the trans-D-2-amino-α-(phenyl or substituted phenyl) cycloalkanemethanol with trifluoroacetic acid at low temperature. This reaction is preferably carried out by adding the trifluoroacetic acid, under continuous stirring, to the selected cooled solid trans-D-2-amino-α-phenyl (or substituted phenyl)cycloalkanemethanol. After the addition is completed, stirring is continued at room temperature for a period of 5–60 minutes and the mixture is poured into ice water. The mixture is then neutralized with aqueous sodium hydroxide (added under cooling), and after neutralization is extracted with a water-immiscible solvent, such as ether, methylene chloride, chloroform, ethyl acetate or the like. From these extracts, the trans-C-2-amino-α-(phenyl or substituted phenyl)cycloalkanemethanol is obtained by evaporating the extract, and is purified generally by recrystallization. The trans-C and trans-D-oxazepin-2-ones and oxazepines (XVIII, XIX, XXI, XXII) are obtained from the corresponding trans-C- (XVI) and trans-D-2-amino-α-phenyl (or substituted phenyl) cycloalkanemethanol (XV) by the same process shown for the cis-A-2-amino-α-phenyl (or substituted phenyl) cycloalkanemethanol.

The 5 - (hydroxy - substituted phenyl)-perhydro-cycloalkapolyene-4,1-oxazepines and oxazepinones of above are generally produced from the 5-alkoxyphenyl analogues by splitting the ether linkage with boron trichloride or tribromide by the method of D. Taub et al., Tetrahedron 24, 2443 (1968).

OXAZEPINES OF FORMULA XXIII

Acid addition salts are synthesized in the usual manner, that is, by directly reacting the acid with the free amine, preferably in an aqueous or anhydrous solvent such as water, ether, methanol, ethanol, ethyl acetate or the like. Evaporation of the solvent provides the desired acid addition salt.

Useful salts thus prepared include the hydrochlorides, hydrobromides, hydroiodides, sulfates, phosphates, acetates, lactates, tartrates, cyclohexanesulfamates, pamoates, citrates, benzensulfonates, methanesulfonates, and the like.

As each of the oxazepines, cis-A, cis-B, trans-C and trans-D represents in effect a racemic mixture, optically active compounds of Formula XXIII are produced by using optically active acids; e.g., D- and L-camphorsulfonic acid, D-tartaric and L-tartaric acid, D- and L-lactic acid, optically active, substituted tartaric acids; e.g., 1-α,α'-diethoxytartaric acid, produce diastereoisomer acid addition salts, which can be separated from each other through their different solubilities in organic solvents. From the separate diastereoisomeric salts by treatment with a base, e.g., aqueous sodium hydroxide, the optically active oxazepines are obtained.

N-oxides of the tertiary amino compounds of Formula XXIII are obtained by permitting the selected compound to react at a temperature between 0–30° C., preferably at the start of the reaction at a temperature between 0–10° C., with a peracid such as peracetic, perpropionic, perbenzoic, perphthalic, m-chloroperbenzoic or other organic peracids in a solvent such as methylene chloride, chloroform, methanol, ethanol, ether or the like. Evaporation of the solvent provides the desired N-oxide of the products of Formula XXIII. Acid addition salts of the N-oxides are produced by reacting the N-oxide with the stoichiometric amount of acid.

The alkyl quaternary ammonium halides of products of Formula XXIII are produced by conventional methods such as heating to reflux a solution of the selected compound XXIII in the presence of methanol, ethanol, acetonitrile or the like, with a selected alkyl halide such as an iodide or bromide, or, less desirably, a chloride of methyl, ethyl, propyl, butyl, isobutyl, isopropyl, pentyl, hexyl, heptyl, octyl, decyl, undecyl, dodecyl, tetradecyl, hexadecyl, or the like. After the reaction is terminated, the reaction mixture is evaporated to dryness to give the quaternary ammonium salt which can be purified by recrystallization from organic solvents such as methanol, ethanol, ether, Skellysolve B hexanes, mixtures thereof and the like.

Further quaternary ammonium salts of the Formula XXIII are produced from the quaternary ammonium halides by treatment with a base, for example, sodium or potassium hydroxide or aqueous slurries of silver oxide or carbonate, to give the corresponding quaternary ammonium hydroxide, which is then treated with the calculated amount of a selected mineral or organic acid.

The following preparations and examples are illustrative of the process and the products of the present invention, but are not to be construed as limiting.

PREPARATION 1

*Cis-A-α-(p-methoxyphenyl)-2-aminocyclohexanemethanol*

(A) 2 - (p-methoxybenzoyl)cyclohexanone.—A solution of 167 g. (0.98 mole) of p-anisoyl chloride in 480 ml. of chloroform was added during a period of 1.5 hours to a solution of 371.7 g. (2.46 moles) of distilled 1-pyrrolidino-1-cyclohexene in 1260 ml. of chloroform. The temperature was kept between 5–10° C. by cooling with ice. After stirring for a period of about 20 hours at room temperature, the mixture was decomposed by addition of 1800 ml. of 10% aqueous hydrochloric acid over a period of 20 minutes. The mixture was then stirred for 2 hours, allowed to settle, the organic layer was separated and the aqueous layer extracted twice with 250 ml. portions of chloroform. The original organic layer and the chloroform extracts were combined, washed with water, saturated salt solution, and then dried by passage through anhydrous sodium sulfate and evaporated. The residue resulting from the above evaporation was a brown oil which was dissolved in 1 l. of ethanol and added to a solution of 344 g. of cupric acetate monohydrate in 5200 ml. of water, preheated to 65° C. The mixture was stirred for 0.5 hour, cooled to room temperature and filtered. The obtained precipitate was washed with water and then with ether. It was then dissolved in 800 ml. of chloroform and added to a solution of 300 ml. of concentrated hydrochloric acid in 1100 ml. of water. The mixture was stirred for 1 hour. The organic layer was separated, and the aqueous layer was extracted once with chloroform. The combined chloroform original layer and extract were washed with water, saturated salt solution, dried by passing through anhydrous sodium sulfate and evaporated to give a solid which was crystallized from 7 l. of methanol, yielding 136.5 g. of 2-(p-methoxybenzoyl)cyclohexanone having a melting point of 115–128° C. A second crop of 26 g., melting point 116–127° C., was obtained from the mother liquor; the total yield was 71%. A recrystallized sample from methanol of 2-(p-methoxybenzoyl)cyclohexanone had a melting point of 117–122° C.

*Analysis.*—Calcd. for $C_{14}H_{16}O_3$ (percent): C, 72.39; H, 6.94. Found (percent): C, 72.30; H, 7.05.

(B) Cis-A-α-(p-methoxyphenyl) - 2 - (benzylamino)cyclohexanemethanol.—A solution of 23.0 g. (0.099 mole) of 2 - (p-methoxybenzoyl)cyclohexanone and 11.0 g. (0.103 mole) of benzylamine in 150 ml. of benzene was heated at reflux for 1.5 hours. The water from the reaction was collected—2.2 ml. The reaction mixture was then concentrated in vacuo to give a residue which was taken up in 150 ml. of ethanol and hydrogenated in the presence of 1.5 g. of platinum oxide catalyst for a period of 18 hours. The reaction mixture was then filtered, the filtrate concentrated in vacuo and the resulting residue taken up into 200 ml. of 10% aqueous acetic acid and 300 ml. of ether. This mixture was stirred for 1.5 hours; the acid layer was separated and basified with 20% aqueous sodium hydroxide solution to give an oily material which separated. This oil was extracted with methylene chloride, the methylene chloride extracts were washed with water, saturated sodium chloride solution and dried over anhydrous magnesium sulfate. After evaporation of the reaction mixture, 22.8 g. of an oil was left which gave with hydrogen chloride in ether a hydrochloride which was recrystallized from ethanol-ether. A sample of this hydrochloride was treated with aqueous sodium hydroxide to give cis-A-α-(p-methoxyphenyl)-2-(benzylamino)cyclohexanemethanol as a free base having a melting point of 86–87° C.

(C) Cis-A-α-(p-methoxyphenyl) - 2 - aminocyclohexanemethanol.—A suspension of 8.0 g. (0.0221 mole) of cis-A-α-(p-methoxyphenyl) - 2 - (benzylamino)cyclohexanemethanol hydrochloride in 150 ml. of ethanol was hydrogenated in the presence of 1 g. of 10% palladium-on-carbon catalyst over a period of 24 hours at a pressure of 28–52 p.s.i. The mixture was then filtered to eliminate the catalyst, the filtrate was concentrated in vacuo and the residue recrystallized from isopropanol-ether to give 4.32 g. (72%) of cis-A-α-(p-methoxyphenyl) - 2 - aminocyclohexanemethanol hydrochloride of melting point 202–203° C.

The hydrochloride was treated with aqueous sodium hydroxide and the mixture extracted with methylene chloride, the methylene chloride extracts were washed with aqueous sodium chloride and thereupon evaporated to give the free base, cis-A-α-(p-methoxyphenyl) - 2 - aminocyclohexanemethanol of melting point 86–87° C.

PREPARATION 2

*Cis-A-α-(o-methoxyphenyl)-2-aminocyclohexanemethanol*

A mixture of 23 g. (0.099 mole) of 2-(o-methoxybenzoyl)cyclohexanone and 11 g. (0.103 mole) of benzylamine in 150 ml. of benzene was heated at reflux for 1.5 hours using a water trap (Dean-Stark). A total of 1.5 ml. of water was collected. The mixture was thereupon evaporated in vacuo, and the resulting residue was dissolved in 150 ml. of ethanol and hydrogenated in the presence of 1.5 g. of platinum oxide catalyst for a period of 24 hours at a pressure of 20–50 p.s.i. During this time about 1.6 molar equivalents of hydrogen were adsorbed. The reaction mixture was thereupon filtered to remove the catalyst, 1.5 g. of 10% palladium-on-carbon catalyst was added to the filtrate and the mixture was then hydrogenated for 24 hours at a hydrogen pressure between 40–50 p.s.i. The resulting reaction mixture was filtered and the filtrate was evaporated to give an oily material which was taken up with a mixture of 400 ml. of aqueous 10% acetic acid and 500 ml. of ether-methylene chloride (1:1). The acetic acid layer was separated and basified with 20% aqueous sodium hydroxide solution, whereupon an oil separated which was extracted with methylene chloride. The methylene chloride extracts were washed with water, saturated aqueous sodium chloride solution and finally dried over anhydrous sodium sulfate. Evaporation of the solution resulted in a solid which was recrystallized from ether-Skellysolve B hexanes several times to give cis - A - α - (o - methoxyphenyl) - 2 - aminocyclohexanemethanol of melting point 122–123° C.

*Analysis.*—Calcd. for $C_{14}H_{21}NO_2$ (percent): C, 71.45; H, 9.00; N, 5.95. Found (percent): C, 71.59; H, 9.15; N, 6.31.

U.V.: λ max. 216 (8,450); 272 (2,150); 278 (2,000).

PREPARATION 3

*Cis-A-α-(3,4,5-trimethoxyphenyl)-2-aminocyclohexanemethanol*

Three grams of cis - A - α - (3,4,5 - trimethoxyphenyl)- 2 - (benzylamino)cyclohexanemethanol in 150 ml. of ethanol was hydrogenated in the presence of 1 g. of 10% palladium-on-carbon catalyst for a period of 6.5 hours at a pressure of 46–49 p.s.i. The reaction mixture was then filtered, the filtrate evaporated in vacuo, the residue dissolved in ether, filtered again, and the filtrate was admixed with an ethereal solution of hydrogen chloride. The hydrochloride precipitated and was collected on a filter and recrystallized from methanol-ether to give 1.47 g. of cis - A - α - (3,4,5 - trimethoxyphenyl)-2-aminocyclohexanemethanol hydrochloride of melting point 234° C.

The free base, cis - A - α - (3,4,5 - trimethoxyphenyl)- 2-aminocyclohexanemethanol, was obtained by treating the hydrochloride with aqueous sodium hydroxide solution, extracting with methylene chloride, and evaporating the extract.

*Analysis.*—Calcd. for $C_{16}H_{25}NO_4 \cdot HCl$ (percent): C, 57.91; H, 7.90; N, 4.22; Cl, 10.69. Found (percent): C, 58.11; H, 8.24; N, 4.24; Cl, 10.76.

U.V.: λ max. sh. 232 (7,250); 268 (790); 278 (604).

PREPARATION 4

*α-(p-ethoxyphenyl)-2-aminocyclohexanemethanol*

In the manner given in Preparation 2, 2-(p-ethoxybenzoyl)cyclohexanone was treated with benzylamine; the resulting product was hydrogenated consecutively in the presence of platinum oxide catalyst and then in the presence of palladium-on-carbon catalyst to give α-(p-ethoxyphenyl)-2-aminocyclohexanemethanol.

PREPARATION 5

α-(3,4,5-trimethoxyphenyl)-2-aminocyclopentanemethanol

In the manner given in Preparation 2, 2-(3,4,5-trimethoxybenzoyl)cyclopentanone was treated with benzylamine; the resulting product was hydrogenated consecutively in the presence of platinum oxide catalyst and then in the presence of palladium-on-carbon catalyst to give α - (3,4,5 - trimethoxyphenyl) - 2 - aminocyclopentanemethanol.

PREPARATION 6

α-(3,4,5-trimethoxyphenyl)-2-aminocycloheptanemethanol

In the manner given in Preparation 2, 2-(3,4,5-trimethoxybenzoyl)cycloheptanone was treated with benzylamine; the resulting product was hydrogenated consecutively in the presence of platinum oxide catalyst and then in the presence of palladium-on-carbon catalyst to give α - (3,4,5 - trimethoxyphenyl) - 2 - aminocycloheptanemethanol.

PREPARATION 7

α-(p-methoxyphenyl)-2-aminocyclopentanemethanol

In the manner given in Preparation 2, 2-(p-methoxybenzoyl)cyclopentanone was treated with benzylamine; the resulting product was hydrogenated consecutively in the presence of platinum oxide catalyst and then in the presence of palladium-on-carbon catalyst to give α-(p-methoxyphenyl)-2-aminocyclopentanemethanol.

PREPARATION 8

α-(2-methoxy-4-methylphenyl)-2-aminocyclohexanemethanol

In the manner given in Preparation 2, 2-(2-methoxy-4-methylbenzoyl)cyclohexanone was treated with benzylamine; the resulting product was hydrogenated consecutively in the presence of platinum oxide catalyst and then in the presence of palladium-on-carbon catalyst to give α - (2 - methoxy - 4 - methylphenyl) - 2 - aminocyclohexanemethanol.

PREPARATION 9

α-(3,5-dimethyl-4-methoxyphenyl)-2-aminocyclohexanemethanol

In the manner given in Preparation 2, 2-(3,5-dimethyl-4-methoxybenzoyl)cyclohexanone was treated with benzylamine; the resulting product was hydrogenated consecutively in the presence of platinum oxide catalyst and then in the presence of palladium-on-carbon catalyst to give α - (3,5 - dimethyl - 4 - methoxyphenyl) - 2 - aminocyclohexanemethanol.

PREPARATION 10

α-(p-trifluoromethylphenyl)-2-aminocyclohexanemethanol

In the manner given in Preparation 2, 2-(p-trifluoromethylbenzoyl)cyclohexanone was treated with benzylamine; the resulting product was hydrogenated consecutively in the presence of platinum oxide catalyst and then in the presence of palladium-on-carbon catalyst to give α - (p - trifluoromethylphenyl) - 2 - aminocyclohexanemethanol.

PREPARATION 11

α-(p-chlorophenyl)-2-aminocyclohexanemethanol

In the manner given in Preparation 2, 2-(p-chlorobenzoyl)cyclohexanone was treated with benzylamine; the resulting product was hydrogenated consecutively in the presence of platinum oxide catalyst and then in the presence of palladium-on-carbon catalyst to give α-(p-chlorophenyl)-2-aminocyclohexanemethanol.

PREPARATION 12

α-(p-ethoxyphenyl)-2-aminocyclooctanemethanol

In the manner given in Preparation 2, 2-(p-ethoxybenzoyl)cyclooctanone was treated with benzylamine; the resulting product was hydrogenated consecutively in the presence of platinum oxide catalyst and then in the presence of palladium-on-carbon catalyst to give α-(p-ethoxyphenyl)-2-aminocyclooctanemethanol.

PREPARATION 13

α-(2,3,4-trimethoxyphenyl)-2-aminocyclooctane methanol

In the manner given in Preparation 2, 2-(2,3,4-trimethoxybenzoyl)cyclooctanone was treated with benzylamine; the resulting product was hydrogenated consecutively in the presence of platinum oxide catalyst and then in the presence of palladium-on-carbon catalyst to give α - (2,3,4 - trimethoxyphenyl) - 2-aminocyclooctanemethanol.

In the manner given in Preparation 2, condensing a selected 2-(substituted benzoyl)cycloalkanone with benzylamine and hydrogenating in the presence of platinum oxide catalyst, following by hydrogenation in the presence of palladium-on-carbon catalyst, yields the corresponding cis-A-α-phenyl-2-aminocycloalkanemethanols (I). Representative α-phenyl-2-aminocycloalkanemethanols (all in the cis-A form), thus obtained, include:

α-(2,4-dimethylphenyl)-2-aminocyclohexanemethanol;
α-(p-bromophenyl)-2-aminocyclohexanemethanol;
α-(p-iodophenyl)-2-aminocyclohexanemethanol;
α-(p-fluorophenyl)-2-aminocyclohexanemethanol;
α-(2,5-diiodophenyl)-2-aminocyclohexanemethanol;
α-(p-isopropoxyphenyl)-2-aminocyclohexanemethanol;
α-(p-pentylphenyl)-2-aminocyclohexanemethanol;
α-(2,4-diethoxyphenyl)-2-aminocyclohexanemethanol;
α-(bromophenyl)-2-aminocyclohexanemethanol;
α-(p-hexylphenyl)-2-aminocyclopentanemethanol;
α-(p-butoxyphenyl)-2-aminocyclopentanemethanol;
α-(p-isopropylphenyl)-2-aminocyclopentanemethanol;
α-(m-trifluoromethylphenyl)-2-aminocyclopentanemethanol;
α-(2,4-diiodophenyl)-2-aminocyclopentanemethanol;
α-(p-fluorophenyl)-2-aminocyclopentanemethanol;
α-(p-bromophenyl)-2-aminocyclopentanemethanol;
α - (p - bromophenyl)-2-amino-5,5-dimethylcyclopentanemethanol;
α-(2,5-diiodophenyl)-2-aminocycloheptanemethanol;
α-(3,4-dipropylphenyl)-2-aminocycloheptanemethanol;
α-(3,4,5-triethoxyphenyl)-2-aminocycloheptanemethanol;
α-(2-chlorophenyl)-2-aminocycloheptanemethanol;
α-(3,4,5-triethoxyphenyl)-2-amino-3,3-dimethylcycloheptanemethanol;
α-(3,4,5-trimethoxyphenyl)-2-amino-3,3-dimethylcycloheptanemethanol;
α-(2,4-dichlorophenyl)-2-aminocycloheptanemethanol;
α-(p-trifluoromethylphenyl)-2-aminocycloheptanemethanol;
α-(p-iodophenyl)-2-aminocycloheptanemethanol;
α-(m-methylphenyl)-2-aminocyclooctanemethanol;
α-(p-ethoxyphenyl)-2-aminocyclooctanemethanol;
α-(p-bromophenyl)-2-aminocyclooctanemethanol;
α-(2,4-diethoxyphenyl)-2-aminocyclooctanemethanol;
α-(o-fluorophenyl)-2-aminocyclooctanemethanol;
α-(o-fluorophenyl)-2-amino-5,5-dimethylcyclooctanemethanol;
α-(p-methoxyphenyl)-2-aminocyclooctanemethanol;
α-(p-ethoxyphenyl)-2-amino-8,8-dimethylcyclooctanemethanol;

α-(p-butoxyphenyl)-2-aminocyclooctanemethanol;
α-(3,5-dipropylphenyl)-2-aminocyclooctanemethanol;
and the like.

EXAMPLE 1

*Cis-A-2-chloro-N-[2-(α-hydroxy-p-methoxybenzyl)-cyclohexyl]acetamide*

A solution of 90.5 g. (0.8 mole) of chloroacetyl chloride in 2.3 l. of ether was added during a period of 2 hours to a cooled solution of 201 g. (0.855 mole) of cis-A-α-(p - methoxyphenyl) - 2 - aminocyclohexanemethanol and 173 g. (1.71 moles) of triethylamine in 7.5 l. of ether. During addition, the temperature was kept below 5° C. The mixture was then stirred at 5° C. for 1 hour. Thereafter, 600 ml. of water and 1 l. of methylene chloride were added. The organic layer was separated and washed with 500 ml. of water, then with 4 portions of 200 ml. each of 10% aqueous hydrochloric acid, 500 ml. of water, 500 ml. of saturated salt solution, then dried over anhydrous magnesium sulfate and evaporated. The residue which resulted was triturated with 500 ml. of ether to give 148.1 g. (59% yield) of crude product which was recrystallized once from ether to give cis-A-2-chloro-N-[2-(α-hydroxy-p-methoxybenzyl)cyclohexyl]acetamide of melting point 138–139° C.

U.V.: λ max. 224 (11,450); 274 (1,500); 281 (1,250).

*Analysis.*—Calcd. for $C_{16}H_{22}ClNO_3$ (percent): C, 61.63; H, 7.11; Cl, 11.37; N, 4.49. Found (percent): C, 61.34; H, 6.92; Cl, 11.46; N, 4.44.

EXAMPLE 2

*Cis-A-octahydro-5-(p-methoxyphenyl)-4,1-benzoxazepin-2-(3H)-one*

A solution of 13.6 g. (0.0437 mole) of cis-A-2-chloro-N - [2 - (α - hydroxy - p-methoxybenzyl)cyclohexyl]acetamide in 150 ml. of ethanol was added during a period of 10 minutes to a solution of 1.1 g. (0.048 mole) of sodium in 125 ml. of ethanol at 40° C. The addition was made in a nitrogen atmosphere under stirring. The mixture was then heated at reflux during 1 hour and allowed to stand overnight. It was then evaporated and to the resulting residue was added 100 ml. each of water and methylene chloride. The mixture was stirred until all the material passed into solution. The water layer was separated and extracted with methylene chloride; the methylene chloride extract was added to the original methylene chloride layer. The combined methylene chloride solutions were washed with saturated salt solution, dried over anhydrous magnesium sulfate and evaporated, to give 13.8 g. of product which was recrystallized from 100 ml. of ethanol which, after an additional recrystallization from ethanol, gave cis-A-octahydro - 5-(p-methoxyphenyl)-4,1-benzoxazepin-2(3H)-one of melting point 245–247° C.

U.V.: λ max. 224 (12,800); 275 (1,500); 282 (1,270).

*Analysis.*—Calcd. for $C_{16}H_{21}NO_3$ (percent): C, 69.75; H, 7.69; N, 5.09. Found (percent): C, 69.63; H, 7.80; N, 5.25.

Alternative method B

Cyclization of cis - A - 2 - chloro - N - [2-(α-hydroxy-p-methoxybenzyl)cyclohexyl]acetamide with sodium hydride.—A solution of 35.1 g. (0.113 mole) of cis-A-2-chloro - N - [2-(α-hydroxy-p-methoxybenzyl)cyclohexyl]acetamide in 165 ml. of tetrahydrofuran was added to a suspension of 10 g. of sodium hydride in mineral oil (a 53% dispersion of sodium hydride in mineral oil) to which had been added 1100 ml. of tetrahydrofuran. The mixture was stirred for 24 hours. It was then evaporated in vacuo, 500 ml. of water was added and the mixture was stirred until a suspension resulted. It was thereupon filtered and the solid obtained was washed with water and ether and recrystallized from 400 ml. of ethanol, to give 24.1 g. (78% yield) of cis - A - octahydro-5-(p-methoxyphenyl)-4,1-benzoxazepin-2(3H)-one.

EXAMPLE 3

*Cis-A-octahydro-5-(p-methoxyphenyl)-1-methyl-4,1-benzoxazepin-2(3H)-one*

A solution was prepared by heating 21.8 g. (0.0795 mole) of cis-A-octahydro-5-(p-methoxyphenyl)-4,1-benzoxazepin-2(3H)-one in 840 ml. of dimethylformamide on the steam bath. The solution was cooled to 40° C. and thereto was added 7.55 g. of sodium hydride (a 53% dispersion of sodium hydride in mineral oil). The mixture was then stirred at room temperature for a period of 4 hours. To the mixture was then added a solution of 35.2 g. (0.248 mole) of methyl iodide in 160 ml. of dimethylformamide during a period of 70 minutes. After the addition was terminated the mixture was stirred overnight and evaporated in vacuo to give a solid. To this solid was added 300 ml. of water and the mixture was stirred until a uniform suspension resulted. The suspension was filtered; the solid was washed with water, then ether, and crystallized from methanol to give 18.8 g. (82% yield) of cis-A-octahydro - 5 - (p-methoxyphenyl)-1-methyl-4,1-benzoxazepin-2(3H)-one of melting point 142–143.5° C. After an additional recrystallization from ether, an analytically pure sample melted at 142.5–144° C.

U.V.: λ max. 224 (13,550); 276 (1,550); 283 (1,300).

*Analysis.*—Calcd. for $C_{17}H_{23}NO_3$ (percent): C, 70.56; H, 8.01; N, 4.84. Found (percent): C, 70.51; H, 7.96; N, 5.03.

EXAMPLE 4

*Cis-A-decahydro-5-(p-methoxyphenyl) 4,1-benzoxazepine*

Cis - A-octahydro-5-(p-methoxyphenyl)-4,1-benzoxazepin-2(3H)-one (30.3 g., 0.11 mole) was added in portions during 5 minutes to a solution of 30.3 g. of lithium aluminum hydride in 1 l. of tetrahydrofuran. The mixture was refluxed for 23 hours, then cooled in ice and decomposed by the successive addition of 31 ml. of water, 31 ml. of 15% aqueous sodium hydroxide solution, and 93 ml. of water. The thus-obtained suspension was filtered, the filter cake was washed with tetrahydrofuran using two portions of 100 ml. each, and the resulting filtrate was dried over anhydrous magnesium sulfate and evaporated to give a residue. The residue was dissolved in 400 ml. of boiling Skellysolve B hexanes and the solution was cooled in ice to give a total of 25 g. of cis-A-decahydro-5-(p-methoxyphenyl)-4,1-benzoxazepine of melting point 77–78.5° C.

U.V.: λ max. 224 (10,100); 275 (1,450); 282 (1,200).

*Analysis.*—Calcd. for $C_{16}H_{23}NO_2$ (percent): C, 73.53; H, 8.87; N, 5.36. Found (percent): C, 73.35; H, 8.98; N, 5.36.

EXAMPLE 5

*Cis-A-decahydro-5-(p-methoxyphenyl)-4,1-benzoxazepine hydrochloride and solvates*

To a solution of 42.5 g. of cis-A-decahydro-5-(p-methoxyphenyl)-4,1-benzoxazepine in 1200 ml. of ether was added 290 ml. of a one normal solution of ethereal hydrogen chloride. The resulting precipitate was filtered and washed with ether to give crude cis-A-decahydro-5-(p-methoxyphenyl)-4,1-benzoxazepine hydrochloride.

Crystallization of the crude hydrochloride from a mixture of methanol and ether gave cis-A-decahydro-5-(p-methoxyphenyl)-4,1-benzoxazepine hydrochloride methanol solvate of melting point 174–176° C.

Crystallization of the crude hydrochloride from ethanol gave the corresponding ethanol solvate, that is, cis-A-decahydro-5-(p-methoxyphenyl) - 4,1-benzoxazepine hydrochloride ethanol solvate of melting point 170–173° C.

Refluxing the crude hydrochloride with ethyl acetate for about 5 minutes gave solvent-free cis-A-decahydro-5-(p-methoxyphenyl)-4,1-benzoxazepine hydrochloride of melting point 232–233° C.

U.V.: λ max. 225 (11,600); 275.5 (1,700); 282 (1,350).

*Analysis.*—Calcd. for $C_{16}H_{23}NO_2 \cdot HCl$ (percent): C, 64.52; H, 8.12; Cl, 11.91; N, 4.70. Found (percent): C, 64.31; H, 7.93; Cl, 11.85; N, 4.44.

EXAMPLE 6

*Cis-A-octahydro-5-(p-methoxyphenyl)-4,1-benzoxazepine-1(5H)-carboxaldehyde*

A mixture of 14.5 g. (0.056 mole) of cis-A-decahydro-5-(p-methoxyphenyl)-4,1-benzoxazepine and 460 ml. of ethyl formate was refluxed for 72 hours. The resulting solution was evaporated and the residue was crystallized from 50 ml. of methanol to give 13.2 g. (82% yield) of cis-A-octahydro - 5 - (p-methoxyphenyl)-4,1-benzoxazepine-1(5H)-carboxaldehyde of melting point 125.5–127° C.

U.V.: λ max. 223 (14,700); 274 (1,550); 282 (1,350).

*Analysis.*—Calcd. for $C_{17}H_{23}NO_3$ (percent): C, 70.56; H, 8.01; N, 4.84. Found (percent): C, 70.32; H, 7.90; N, 5.21.

EXAMPLE 7

*Cis-A-decahydro-5-(p-methoxyphenyl)-1-methyl-4,1-benzoxazepine*

A solution of 12.1 g. (0.042 mole) of cis-A-octahydro-5-(p-methoxyphenyl)-4,1-benzoxazepine - 1(5H)-carboxaldehyde in 40 ml. of tetrahydrofuran was added during a period of 25 minutes to a suspension of 12.1 g. of lithium aluminum hydride in 400 ml. of ether. The mixture was refluxed for 20 hours, then cooled in ice and decomposed by successive addition of 12 ml. of water, 12 ml. of 15% aqueous sodium hydroxide solution, and 36 ml. of water. The suspension was filtered, the filter cake was washed with tetrahydrofuran, the washings and filtrate were combined, dried over anhydrous magnesium sulfate and evaporated to give a residue. This residue was dissolved in 50 ml. of petroleum ether (boiling range 30–60° C.) and allowed to crystallize at −70° C. to give 9.2 g. (79% yield) of cis-A-decahydro-5-(p-methoxyphenyl)-1-methyl-4,1-benzoxazepine of melting point 41–42° C.

U.V.: λ max. 224 (11,750); 274 (1,550); 282 (1,300).

*Analysis.*—Calcd. for $C_{17}H_{25}NO_2$ (percent): C, 74.14; H, 9.15; N, 5.09. Found (percent): C, 73.90; H, 9.15; N, 5.30.

EXAMPLE 8

*Cis-A-decahydro-5-(p-methoxyphenyl)-1-acetyl-4,1-benzoxazepine*

A mixture of 15.1 g. (0.058 mole) of cis-A-decahydro-5-(p-methoxyphenyl)-4,1-benzoxazepine and 50 ml. of acetic anhydride was heated on the steam bath for 1 hour. It was then evaporated in vacuo, 100 ml. of water was added, the mixture heated on the steam bath for 30 minutes, cooled and extracted several times with ether. The combined ether extract was washed with saturated aqueous sodium bicarbonate solution (2 portions of 25 ml. each), saturated salt solution, then dried over magnesium sulfate and evaporated to give a residue. This residue was recrystallized from ether to give 12.3 g. of cis-A-decahydro-5-(p-methoxyphenyl) - 1-acetyl-4,1-benzoxazepine of melting point 104–105° C. Including a second crop of 1.7 g. of the material, the yield was 80%.

U.V.: λ max. 223 (14,100); 274 (1,540); 281 (1,300).

*Analysis.*—Calcd. for $C_{18}H_{25}NO_3$ (percent): C, 71.25; H, 8.31; N, 4.62. Found: (percent): C, 71.06; H, 8.25; N, 4.49.

This compound also exists as a polymorph of melting point 131–132° C.

EXAMPLE 9

*Cis-A-decahydro-5-(p-methoxyphenyl)-1-ethyl-4,1-benzoxazepine and ether solvate*

A solution of cis-A-decahydro-5-(p-methoxyphenyl)-1-acetyl-4,1-benzoxazepine (8.5 g., 0.028 mole) in 50 ml. of tetrahydrofuran was added during 5 min. to a solution of 8.5 g. of lithium aluminum hydride in 350 ml. of tetrahydrofuran. The mixture was then refluxed for 4 hours. It was cooled in ice, decomposed in succession with 8.5 ml. of water, 8.5 ml. of 15% aqueous sodium hydroxide solution and 25.5 ml. of water, then stirred for 30 min. at room temperature and filtered. The filter cake was washed with tetrahydrofuran; the filtrate was dried over magnesium sulfate and evaporated. The residue was crystallized from 30 ml. of ether at −18° C. to give 4 g. of cis-A-decahydro-5-(p-methoxyphenyl)-1-ethyl-4,1-benzoxazepine ether solvate of melting point 75–76° C.

U.V.: λ max. 224 (12,900); 275 (1,640); 282 (1,390).

*Analysis.*—Calcd. for $C_{18}H_{27}NO_2 \cdot \frac{1}{4}(C_2H_5)_2O$ (percent): C, 74.10; H, 9.65; N, 4.55. Found (percent): C, 74.03, 74.09; H, 9.49, 9.53; N, 4.89.

This ether solvate was kept at a melting temperature for 72 hours in a reduced pressure of 10 to 12 mm. mercury, to give the solvent-free cis-A-decahydro-5-(p-methoxyphenyl)-1-ethyl-4,1-benzoxazepine.

EXAMPLE 10

*Cis-A-octahydro-5-(p-methoxyphenyl)-1-[3-dimethylamino)propyl]-4,1-benzoxazepin-2(3H)-one*

A solution was prepared by heating on a steam bath 1 l. of dimethylformamide and 27.5 g. (0.1 mole) of cis-A-octahydro - 5 - (p-methoxyphenyl) - 4,1 - benzoxazepin-2(3H)-one. The solution was cooled to 35° C. and thereto was added 4.53 g. of 53% dispersion of sodium hydride in mineral oil (0.1 mole). The mixture was stirred for 2 hours at room temperature and thereto was added 12.1 g. (0.1 mole) of 3-(dimethylamino)propyl chloride diluted with 12.1 g. of xylene. The addition was carried out during 45 min. and the mixture was thereafter stirred for 20 hours. It was then evaporated in vacuo on the steam bath, and to the resulting residue was added 300 ml. of ether and 150 ml. of 10% hydrochloric acid. The resulting suspension was stirred for 30 minutes and filtered. The resulting solid was washed with water followed by ether to give 20 g. of starting material. The filtrate was separated into layers. The aqueous, acidic layer was cooled, basified with aqueous sodium hydroxide and extracted with ether. The ether extract was washed with saturated salt solution, dried over anhydrous magnesium sulfate and evaporated. The thus-obtained residue was dissolved in 200 ml. of ether, filtered to remove about 0.5 g. of insoluble material, concentrated to 20 ml. and then allowed to crystallize to give in 3 crops a total of 4.04 g. (11% yield) of cis-A-octahydro - 5 - (p-methoxyphenyl) - 1 - [3 - (dimethylamino)propyl]-4,1-benzoxazepin - 2(3H)-one of melting point 104–105° C.

U.V.: λ max. 224 (13,430); 275 (1,490); 282 (1,250).

*Analysis.*—Calcd. for $C_{21}H_{32}N_2O_3$ (percent): C, 69.97; H, 8.95; N, 7.77. Found (percent): C, 70.13; H, 8.86; N, 7.57.

EXAMPLE 11

*Cis-A-decahydro - 5 - (p-methoxyphenyl)-1-[3-(dimethylamino)propyl]-4,1-benzoxazepine dihydrochloride and methanol solvate*

A solution of 2.8 g. (7.8 mmoles) of cis-A-octahydro-5-(p-methoxphenyl) - 1 - [3 - (dimethylamino)propyl]-4,1-benzoxazepin-2(3H)-one in 25 ml. of tetrahydrofuran was added during 5 min. to a solution of 2.8 g. of lithium aluminum hydride in 120 ml. of tetrahydrofuran. The mixture was refluxed for 7 hours and allowed to stand overnight. It was then cooled in ice, decomposed in succession with 2.8 ml. of water, 2.8 ml. of 15% aqueous sodium hydroxide solution and 8.4 ml. of water. The suspension was filtered and the filter cake was washed with tetrahydrofuran. The filtrate and washings were combined, dried over anhydrous magnesium sulfate and evaporated. The residue thus obtained was dissolved in ether and converted to the dihydrochloride with ethereal hydrogen chloride. The resulting solid was filtered, washed with ether and crystallized from methanol-ether to give 2.1 g. of cis-A-decahydro - 5 - (p-methoxyphenyl)-1-[3-(dimethylamino)propyl]-4,1-benzoxazepine dihydrochloride methanol solvate of melting point 259-260° C. after an additional recrystallization from methanol-ether.

U.V.: λ max. 224 (12,400); 274 (1,590); 281 (1,350).

*Analysis.*—Calcd. for $C_{21}H_{34}N_2O_2 \cdot 2HCl \cdot 0.5CH_3OH$ (percent): C, 59.29; H, 8.66; Cl, 16.91; N, 6.68. Found (percent): C, 59.40, 59.42; H, 8.59, 8.73; Cl, 16.72; N, 6.66.

By heating the solvate to 100° C. for a period of 4 days at house vacuum (15 mm. Hg) the unsolvated cis-A-decahydro - 5 - (p-methoxyphenyl)-1-[3-(dimethylamino)propyl]-4,1-benzoxazepine dihydrochloride was obtained.

EXAMPLE 12

*Cis-A-octahydro - 5 - (p-methoxyphenyl)-1-[2-(dimethylamino)ethyl]-4,1-benzoxazepin-2(3H)-one hydrochloride methanol solvate*

In the manner given in Example 10, 27.5 g. of cis-A-octahydro - 5 - (p-methoxyphenyl) - 4,1 - benzoxazepin-2(3H)-one was reacted with 2-(dimethylamino)ethyl chloride in the presence of sodium hydride in dimethylformamide solution to give cis-A-octahydro - 5 - (p-methoxyphenyl)-1-[2-(dimethylamino)ethyl] - 4,1 - benzoxazepin-2(3H)-one which was isolated as hydrochloride methanol solvate of melting point 213-214.5° C. in colorless prisms.

U.V.: λ max. 224 (13,200); 276 (1,580); 282 (1,320).

*Analysis.*—Calcd. for $C_{20}H_{30}N_2O_3 \cdot HCl \cdot 0.5CH_3OH$ (percent): C, 61.71; H, 8.34; Cl, 8.89; N, 7.02. Found (percent): C, 61.95; H, 8.02; Cl, 9.39; N, 7.20.

Treatment of this solvated acid addition salt with a base provides the free base, cis-A-octahydro - 5 - (p-methoxyphenyl)-1-[2-(dimethylamino)ethyl] - 4,1 - benzoxazepin-2(3H)-one.

EXAMPLE 13

*Cis-A-decahydro - 5 - (p-methoxyphenyl)-1-[2-(dimethylamino)ethyl]-4,1-benzoxazepine and dihydrochloride hemihydrate*

In the manner given in Example 11, cis-A-octahydro-5-(p-methoxyphenyl) - 1 - [2 - (dimethylamino)ethyl]-4,1-benzoxazepin-2(3H)-one as a free base (an oily material, 6.5 g.) was added, after solution in 500 ml. of tetrahydrofuran, to a solution of lithium aluminum hydride in tetrahydrofuran to give cis-A-decahydro-5-(p-methoxyphenyl)-1-[2-(dimethylamino)ethyl]-4,1-benzoxazepine dihydrochloride hemihydrate of melting point 237-238° C., when crystallized from methanol-ether.

U.V.: λ max. 224 (12,000); 275 (1,570); 282 (1,370).

*Analysis.*—Calcd. for $C_{20}H_{32}N_2O_2 \cdot 2HCl \cdot 0.5H_2O$ (percent): C, 57.96; H, 8.51; Cl, 17.11; N, 6.76. Found (percent: C, 57.56; H, 8.54; Cl, 17.14; N, 6.73.

Treatment of this dihydrochloride hemihydrate with a base, e.g., aqueous sodium hydroxide gave cis-A-decahydro - 5 - (p-methoxyphenyl)-1-[2-dimethylamino)ethyl]-4,1-benzoxazepine.

EXAMPLE 14

*Cis-A-octahydro-5-(p-methoxphenyl)-1-propyl-4,1-benzoxazepin-2(3H)-one*

A solution was prepared containing 13.7 g. (0.05 mole) of cis-A-octahydro-5-(p-methoxyphenyl) - 4,1 - benzoxazepin-2(3H)-one in 375 ml. of warm dimethylformamide. The solution was cooled to 40° C., 4.55 g. of sodium hydride (a 53% dispersion of sodium hydride in mineral oil) was added all at once and the mixture was stirred for 5 hours. To this mixture was added a solution of propyl bromide (18.5 g., 0.15 mole) in 250 ml. of dimethylformamide over a period of 1.5 hours. The mixture was then stirred for a period of 20 hours, evaporated in vacuo on the steam bath, and 100 ml. of water and 200 ml. of ether were added. The ether solution was washed with saturated salt solution, then dried over anhydrous magnesium sulfate and evaporated. The thus-obtained residue was crystallized from ether-petroleum ether (boiling range 30-60° C.) to give 8.13 g. (52% yield) of cis-A-octahydro-5-(p-methoxyphenyl)-1-propyl - 4,1 - benzoxazepin-2(3H)-one which after additional recrystallization from ether-petroleum ether had a melting point of 115–116.5° C.

U.V.: λ max. 223 (14,000); 276 (1,550); 282 (1,300).

*Analysis.*—Calcd. for $C_{19}H_{27}NO_3$ (percent): C, 71.89; H, 8.57; N, 4.41. Found (percent): C, 71.86; H, 8.55; N, 4.41.

EXAMPLE 15

*Cis-A-decahydro-5-(p-methoxphenyl)-1-propyl-4,1-benzoxazepine*

To a solution of 0.7 g. of lithium aluminum hydride and 60 ml. of tetrahydrofuran was added 0.7 g. (2.2 mmoles) of cis - A - octahydro-5-(p-methoxyphenyl)-1-propyl-4,1-benzoxazepin-2(3H)-one. The mixture was refluxed for 24 hours, cooled in ice and decomposed by successive addition of 0.7 ml. of water, 0.7 ml. of 15% aqueous sodium hydroxide solution and 2.1 ml. of water. A suspension was obtained which was filtered, the filter cake was washed with tetrahydrofuran, the filtrates and washings were combined and evaporated to give 0.6 g. of a yellow oil. The yellow oil was crystallized from petroleum ether (boiling range 30–60° C.) at −70° C. to give 0.36 g. (54% yield) of cis-A-decahydro-5-(p-methoxyphenyl)-1-propyl-4,1-benzoxazepine of melting point 44–47° C. After recrystallization from the same solvent the melting point of this compound was 46.5–47.5° C.

U.V.: λ max. 224 (12,250); 275 (1,550); 282 (1,300).

*Analysis.*—Calcd. for $C_{19}H_{29}NO_2$ (percent): C, 75.20; H, 9.63; N, 4.62. Found (percent): C, 75.57; H, 9.77; N, 4.79.

EXAMPLE 16

*Cis-A-octahydro-5-(p-methoxyphenyl)-1-butyl-4,1-benzoxazepin-2(3H)-one*

In the manner given in Example 3, cis-A-octahydro-5-(p-methoxphenyl)-4,1-benzoxazepin-2(3H)-one in solution in dimethylformamide was treated with sodium hydride and thereupon with butyl bromide to give oily cis-A - octahydro - 5 - (p-methoxyphenyl)-1-butyl-4,1-benzoxazepin-2(3H)-one.

U.V.: λ max. 224 (13,600); 275 (1,500); 282 (1,250).

EXAMPLE 17

*Cis-A-decahydro-5-(p-methoxyphenyl)-1-butyl-4,1-benzoxazepine*

In the manner given in Example 15, cis-A-octahydro-5-(p - methoxyphenyl) - 1 - butyl-4,1-benzoxazepin-2(3H)-one was reduced with lithium aluminum hydride in tetrahydrofuran by refluxing the mixture for 23 hours to give cis - A-decahydro-5-(p-methoxyphenyl)-1-butyl-4,1-benzoxazepine of melting point 49–50° C.

U.V.: λ max. 224 (12,400); 275 (1,500); 282 (1,300).

*Analysis.*—Calcd. for $C_{20}H_{32}NO_2$ (percent): C, 75.67; H, 9.84; N, 4.41. Found (percent): C, 75.22; H, 9.79; N, 4.37.

EXAMPLE 18

*Cis-A-decahydro-5-(p-methoxyphenyl)-1-hexadecanoyl-4,1-benzoxazepine*

To a solution of 3.91 g. (15 mmoles) of cis-A-decahydro - 5 - (p-methoxyphenyl)-4,1-benzoxazepine and 3.03 g. (30 mmoles) of triethylamine in 60 ml. of methylene chloride in an ice bath was added dropwise over a period of 2 hours, a solution of 15 mmoles of hexadecanoyl chloride in 15 ml. of methylene chloride. The reaction mixture was stirred for 2½ hours at 5° C. and then 100 ml. of water was added, the mixture was shaken, and the water was discarded. The organic layer was then additionally washed with 60 ml. of water, four times with 30-ml. portions of cold 10% aqueous hydrochloric acid, water and saturated aqueous sodium chloride solution. The organic layer was then dried over anhydrous magnesium sulfate, filtered and concentrated to dryness. The material obtained was crystallized from acetone to give cis - A - decahydro-5-(p-methoxyphenyl)-1-hexadecanoyl-4,1-benzoxazepine of melting point 91–92.5° C. (yield 82.5%).

Analysis.—Calcd. for $C_{32}H_{53}NO_3$ (percent): C, 76.91; H, 10.69; N, 2.80. Found (percent): C, 76.52; H, 10.53; N, 3.20.

In the manner given in Example 18, using benzoyl and phenylacetyl chloride, respectively, instead of hexadecanoyl chloride, there were also produced: cis-A-decahydro - 5 - (p-methoxyphenyl)-1-benzoyl-4,1-benzoxazepine, melting point 147.5–149° C. after crystallization from ethyl acetate.

Analysis.—Calcd. for $C_{23}H_{27}NO_3$ (percent): C, 75.59; H, 7.45; N, 3.83. Found (percent): C, 75.44; H, 7.41; N, 3.68.

Cis - A - decahydro - 5-(p-methoxyphenyl)-1-phenylacetyl-4,1-benzoxazepine, melting point 110.5–112° C. after crystallization from acetone.

Analysis.—Calcd. for $C_{24}H_{29}NO_3$ (percent): C, 75.96; H, 7.70; N, 3.69. Found (percent): C, 76.25; H, 7.78; N, 3.72.

Example 19

*Cis-A-decahydro-5-(p-methoxyphenyl)-1-hexadecyl-4,1-benzoxazepine*

To 50 ml. of dry peroxide-free tetrahydrofuran in a nitrogen atmosphere was added 1.38 g. of lithium aluminum hydride, portionwise and with stirring. To this solution was added 5 mmoles of cis-A-decahydro-5-(p-methoxyphenyl) - 1-hexadecanoyl-4,1-benzoxazepine, portionwise, over 5 minutes. The mixture was refluxed for 3 hours, then cooled in an ice bath and the reaction mixture was decomposed by the successive addition of 1.5 ml. of water, 1.5 ml. of 15% aqueous sodium hydroxide and 4.5 ml. of water. The solids were removed by filtration and washed with tetrahydrofuran. The tetrahydrofuran washings and filtrate were combined, dried over anhydrous magnesium sulfate, filtered and concentrated to a syrup, which was crystallized from acetone to give cis - A - decahydro - 5-(p-methoxyphenyl)-1-hexadecyl-4,1-benzoxazepine of melting point 60.5–61.5° C.

Analysis.—Calcd. for $C_{32}H_{55}NO_2$ (percent): C, 79,12; H, 11.41; N, 2.88. Found (percent): C, 78.89; H, 11.26; N, 2.93.

In the manner given above, reduction of the corresponding 1-benzoyl and 1-phenylacetyl analogues resulted in:

Cis - A - decahydro-5-(p-methoxyphenyl)-1-benzyl-4,1-benzoxazepine of melting point 84–85.5° C. after crystallization from methanol.

Analysis.—Calcd. for $C_{23}H_{29}NO_2$ (percent): C, 78.60; H, 8.32; N, 3.98. Found (percent): C, 78.09; H, 8.28; N, 4.50.

Cis - A - decahydro-5-(p-methoxyphenyl)-1-phenethyl-4,1-benzoxazepine as hydrochloride of melting point 230–231° C. after crystallization from isopropyl alcohol.

Analysis.—Calcd. for $C_{24}H_{31}NO_2 \cdot HCl$ (percent): C, 71.71; H, 8.02; N, 3.48. Found (percent): C, 71.75; H, 8.23; N, 3.15.

Example 20

*4'-fluoro-4-cis-A-[octahydro-5-(p-methoxyphenyl)-4,1-benzoxazepin-1(5H)-yl]-butyrophenone*

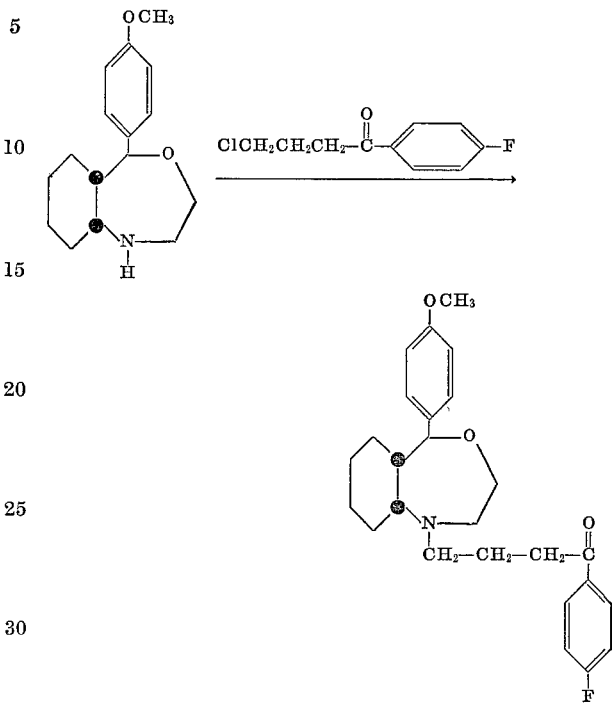

A mixture of 5.22 g. (20 mmoles) of cis-A-decahydro-5-(p-methoxyphenyl)-4,1-benzoxazepine, 5.62 g. (28 mmoles) of 4-chloro-4'-fluorobutyrophenone, 6.42 g. of sodium carbonate and a few crystals of potassium iodide in 250 ml. of 4-methyl-2-pentanone was kept at reflux for a period of 24 hours under nitrogen. The solution was cooled, extracted three times with 200-ml. portions of ether and the combined ether extracts were washed with saturated sodium chloride solution. The ether layer was thereafter dried over anhydrous sodium sulfate, filtered, concentrated to dryness and the thus-obtained residue was chromatographed over 500 g. of silica gel, taking fractions of 150 ml. each with a mixture of ethyl acetate-cyclohexane in the ratio of 1:1 by volume. Fractions 22 to 37 inclusive were combined, filtered, and concentrated. The obtained residue was crystallized from acetone to give 310 mg. of 4'-fluoro-4-cis-A-[octahydro-5-(p-methoxyphenyl) - 4,1-benzoxazepin-1(5H)-yl]-butyrophenone of melting point 112.5–114° C.

Analysis.— Calcd. for $C_{26}H_{32}FNO_3$ (percent): C, 73.38; H, 7.58; N, 3.29. Found (percent): C, 72.52; H, 7.67; N, 3.52.

Example 21

*Cis-A-decahydro-5-(p-methoxyphenyl)-1-isopropyl-4,1-benzoxazepine*

A mixture of 5.22 g. (20 mmoles) of cis-A-decahydro-5-(p-methoxyphenyl)-4,1-benzoxazepine, 6.89 g. (56 mmoles) of isopropyl bromide, 6.42 g. of sodium carbonate and a few crystals of potassium iodide was kept at reflux for 41 hours. An additional 6.89 g. of isopropyl bromide was added at this point and the mixture was refluxed an additional 22 hours. This was repeated so that the mixture was kept at reflux for three additional days. The reaction mixture was then poured on ice, extracted with ether, the ether layers shaken with saturated sodium chloride solution and dried over anhydrous sodium sulfate. The solution thus obtained was concentrated to give a residue which was chromatographed over 450 g. of silica gel, taking fractions of 100 ml. each of a mixture (v./v.) of 25% ethyl acetate —75% Skellysolve B hexanes. Fractions 7 to 10 inclusive were combined and concentrated to give 1.25 g. of oily cis-A-decahydro-5-(p-methoxyphenyl)-1-isopropyl-4,1-benzoazepine.

*Analysis.*—Calcd. for $C_{19}H_{29}NO_2$ (percent): C, 75.20; H, 9.63; N, 4.62. Found (percent): C, 75.67; H, 9.65; N, 4.64.

EXAMPLE 22

*Cis-A-decahydro-5-(p-methoxyphenyl-1-butyl-4,1-benzoxazepine and its hydrochloride*

(A) Cis - A - decahydro - 5 - (p-methoxyphenyl)-1-butyryl-4,1-benzoxazepine.—A mixture of cis-A-decahydro - 5 - (p-methoxyphenyl)-4,1-benzoxazepine (24.2 g., 0.0927 mole) and 72.6 g. (0.46 mole) of butyric anhydride was heated on the steam bath for 2 hours. To this mixture was added 1800 ml. of water and the mixture was stirred at 95° C. for 2 hours. The mixture was then cooled and extracted with 3 portions of 150 ml. each of ether. The ether extracts were combined, washed with 5% aqueous sodium hydroxide (3 times with 50 ml. each), then with saturated salt solution, and dried over magnesium sulfate and evaporated to give a residue. The residue was crystallized from ether-petroleum ether (30–60° C. boiling range) to give 25.4 g. (80% yield) of cis-A - 1 - decahydro - 5-(p-methoxyphenyl)-1-butyryl 4,1-benzoxazepine which after one recrystallization from ether-petroleum ether had a melting point of 82–83° C.

U.V.: λ max. 223 (15,200); 275.5 (1,550); 282 (1,350).

*Analysis.*—Calcd. for $C_{20}H_{29}NO_3$ (percent): C, 72.47; H, 8.82; N, 4.23. Found (percent): C, 72.47; H, 8.61; N, 4.30.

(B) Cis - A - decahydro - 5 - (p-methoxyphenyl)-1-butyl-4,1-benzoxazepine and its hydrochloride.—A solution of cis - A - decahydro-5-(p-methoxyphenyl)-1-butyryl-4,1-benzozxazepine (22.3 g., 0.0674 mole in 200 ml. of tetrahydrofuran was added during 10 min. to a solution of 22.3 g. of lithium aluminum hydride in 720 ml. of tetrahydrofuran. The resulting mixture was refluxed for 20 hours, then decomposed by successive addition of 22.3 ml. of water, 22.3 ml. of 15% aqueous sodium hydroxide solution and 70 ml. of water, stirred for 1 hour and filtered. The filtrate was dried over anhydrous magnesium sulfate and evaporated to give a residue which after two crystallizations from petroleum ether (boiling range 30–60° C.), first at −70° C. and second at −18° C., gave 5 g. (24% yield) of cis-A-decahydro-5-p-methoxyphenyl)-1-butyl 4,1-benzoxazepine of melting point 49–51° C.

Some of the free base was treated with ethereal hydrogen chloride to obtain a solid; melting point 129–130° C. after recrystallization from methanol-ether. This material was the hydrochloride of cis-A-decahydro-5-(p-methoxyphenyl)-1-butyl-4,1-benzoxazepine hydrochloride as a methanol solvate.

*Analysis.* — Calcd. for $C_{20}H_{31}NO_2 \cdot HCl \cdot 0.5CH_3OH$ (percent): C, 66.55; H, 9.26; Cl, 9.58; N, 3.79. Found (percent): C, 66.73; H, 9.63; Cl, 9.78; N, 3.99.

By heating the solvate to 100° C. for a period of 4 days at house vacuum (15 mm. Hg) the unsolvated cis-A-decahydro - 5 - (p - methoxyphenyl) - 1 - butyl-4,1-benzoxazepine hydrochloride was obtained.

EXAMPLE 23

*Cis-A-decahydro-5-(o-methoxyphenyl)-4,1-benzoxazepine*

(A) Cis - A - 2 - chloro-N-[2-(α-hydroxy-o-methoxybenzyl)cyclohexyl]acetamide.—A solution of 8.25 g. (0.073) mole) of chloroacetyl chloride in 250 ml. of ether was added during 2 hours to a solution of cis-A-α-(o - methoxyphenyl) - 2 - aminocyclohexanemethanol (17.1 g., 0.073 mole) (Preparation 2) and 14.8 g. (0.146 mole) of triethylamine in 1100 ml. of ether, keeping the temperature at 5° C. To this mixture was added 250 ml. of water and 500 ml. of methylene chloride. The organic layer was then separated, washed with 100 ml. of water, then with 10% hydrochloric acid (3 portions of 100 ml. each) and saturated salt solution, and finally dried over magnesium sulfate and evaporated to give 21.4 g. of cis-A - 2 - chloro - N - [2-(α-hydroxy-o-methoxybenzyl)cyclohexyl]acetamide.

U.V.: sh. 218 (9,350); sh. 227; λ max. 272 (2,100); 277 (2,050).

B. Cis - A - octahydro - 5 - (o-methoxyphenyl)-4,1-benzoxazepin-2(3H)-one.—A solution of cis-A-2-chloro-N - [2 - (α - hydroxy-o-methoxybenzyl)cyclohexyl]acetamide (21.3 g., 0.0686 mole) in 280 ml. of tetrahydrofuran was added during 10 min. to 6.24 g. of a 53% suspension of sodium hydride in mineral oil in 280 ml. of tetrahydrofuran. The mixture was stirred overnight, then evaporated to dryness and to the residue was added 150 ml. of water and 200 ml. of ether. The mixture thus obtained was stirred for 1 hour and filtered. The resulting solid was washed with water and then ether to give 15.1 g. of solid which was recrystallized from methanol to give cis - A - octahydro - 5 - (o - methoxyphenyl) - 4,1-benzoxazepin-2(3H)-one of melting point 246–247° C.

U.V.: sh. 218 (10,500); λ max. 270 (2,560); 276 (2,350).

*Analysis.*—Calcd. for $C_{16}H_{21}NO_3$ (percent): C, 69.79; H, 7.69; N, 5.09. Found (percent): C, 69.92; H, 7.69; N, 5.34.

C. Cis - A - decahydro - 5 - (o-methoxyphenyl)-4,1-benzoxazepine.—A solution of cis - A - octahydro-5-(o-methoxyphenyl)-4,1-benzoxazepin-2(3H)-one (10.8 g., 0.0394 mole) in 650 ml. of tetrahydrofuran was added during 10 min. to a solution of 10.8 g. of lithium aluminum hydride in 400 ml. of tetrahydrofuran. This mixture was refluxed for 18 hours, then cooled in ice, and decomposed successively with 10.8 ml. of water, 10.8 ml. of 15% aqueous sodium hydroxide solution and 32.4 ml. of water. The mixture was stirred for 1 hour at room temperature, then filtered, the filter cake washed with tetrahydrofan, and the tetrahydrofuran washings were added to the filtrate. The filtrate and washings were dried over anhydrous magnesium sulfate and evaporated to give an oily residue which solidified upon standing. This residue was crystallized from ether to give in 3 crops 6.85 g. of cis - A - decahydro - 5 - (o-methoxyphenyl)-4,1-benzoxazepine which after recrystallization from ether had a melting point of 115–116° C.; yield 66%.

U.V.: λ max. 216 (8,450); sh. 220 (8,100); 270 (2,350); 277 (2,250).

*Analysis.*—Calcd. for $C_{16}H_{23}NO_2$ (percent): C, 73.53; H, 8.87; N, 5.36. Found (percent): C, 73.31; H, 9.00; N, 5.35.

EXAMPLE 24

*Cis-A-decahydro-5-(o-methoxyphenyl)-1-ethyl-4,1-benzoxazepine*

(A) Cis-A-decahydro-5-(o-methoxyphenyl) - 1 - acetyl-4,1-benzoxazepine.—In the manner given in Example 8, cis-A-decahydro-5-(o - methoxyphenyl) - 4,1 - benzoxazepine was acetylated with acetic anhydride to give cis-A-decahydro-5-(o-methoxyphenyl)-1-acetyl - 4,1 - benzoxazepine.

U.V.: sh. 215 (11,200); λ max. 269.5 (2,000); 276 (1,900).

(B) Cis-A-decahydro-5-(o-methoxyphenyl) - 1 - ethyl-4,1-benzoxazepine.—Cis - A - decahydro - 5 - (o-methoxyphenyl)-1-acetyl-4,1-benzoxazepine was reduced in tetrahydrofuran with lithium aluminum hydride as shown in Example 9, to give cis-A-decahydro-5-(o-methoxyphenyl)-1-ethyl-4,1-benzoxazepine of melting point 113–114° C. after crystallization from petroleum ether (boiling range 30–60° C.).

U.V.: λ max. 215 (9,300); sh. 220 (8,850); 269.5 (2,350); 276.5 (2,250).

*Analysis.*—Calcd. for $C_{18}H_{27}NO_2$ (percent): C, 74.70; H, 9.40; N, 4.84. Found (percent): C, 74.74; H, 9.47; N, 4.88

EXAMPLE 25

*Cis-A-decahydro-5-(o-methoxyphenyl)-1-methyl-4,1-benzoxazepine*

(A) Cis - A-octahydro-5-(o-methoxyphenyl)-4,1-benzoxazepine-1(5H)-carboxaldehyde.—A solution of cis-A-decahydro-5-(o-methoxyphenyl)-4,1 - benzoxazepine (2.5 g., 0.0095 mole) in 45 ml. of ethyl formate was refluxed for 20 hours and then evaporated to dryness to give 28 g. of cis-A-octahydro-5 - (o - methoxyphenyl) - 4,1 - benzoxazepine-1(5H)-carboxaldehyde.

U.V.: sh. 215 (11,550); λ max. 269 (2,000); 276 (1,900).

(B) Cis-A-decahydro-5-(o-methoxyphenyl)-1 - methyl-4,1-benzoxazepine.—A solution of cis-A-octahydro-5-(o-methoxyphenyl)-4,1-benzoxazepine - 1(5H) - carboxaldehyde (2.7 g., 0.00935 mole) in 25 ml. of tetrahydrofuran was added during 5 min. to a solution of 2.7 g. of lithium aluminum hydride in 200 ml. of tetrahydrofuran. The mixture was refluxed for 20 hours, then cooled in ice and decomposed in succession with 2.7 ml. of water, 2.7 ml. of 15% aqueous sodium hydroxide and 8.1 ml. of water. The resulting suspension was filtered, the filter cake was washed with tetrahydrofuran, the combined washings and filtrates were dried over anhydrous magnesium sulfate and evaporated to give 2.3 g. of a colorless oil which upon standing solidified. This material was crystallized from petroleum ether (boiling range 30–60° C.) to give 1.6 g. (62% yield) of cis-A-decahydro-5-(o-methoxyphenyl)-1-methyl-4,1 - benzoxazepine which after another recrystallization from petroleum ether melted at 73–74.5° C.

U.V.: λ max. 215 (9,150); sh. 220 (8,700); 269.5 (2,350); 276 (2,200).

*Analysis.*—Calcd. for $C_{17}H_{25}NO_2$ (percent): C, 74.14; H, 9.15; N, 5.09. Found (percent): C, 73.95; H, 9.27; N, 4.93.

EXAMPLE 26

*Cis-A-octahydro-5-(p-methoxyphenyl)-7,7-dimethyl 4,1-benzoxazepin-2(3H)-one*

(A) 2 - (p - anisoyl) - 4,4-dimethylcyclohexanone.—A mixture of 189 g. (1.5 moles) of 4,4 - dimethylcyclohexanone, 157 g. (1.8 moles) of morpholine, 1.5 g. of p-toluenesulfonic acid and 300 ml. of toluene was refluxed for a period of 18 hours in apparatus equipped with an azeotropic separator. After 18 hours the reaction mixture was evaporated, giving 300 g. of crude, oily 4-(4,4-dimethyl-1-cyclohexen-1-yl)morpholine.

A solution of 255 g. (1.5 moles) of anisoyl chloride in 780 ml. of chloroform was added during 2 hours to a solution of the above enamine (1.5 moles) and 152 g. (1.5 moles) of triethylamine in 1800 ml. of chloroform at a temperature of −5° C. The mixture was then stirred at −5° C. during 1 hour and at room temperature overnight. It was then decomposed with 3 l. of 10% aqueous hydrochloric acid and stirred for a period of 1 hour. The organic layer was separated, washed with saturated salt solution, dried over anhydrous magnesium sulfate and evaporated to give 434 g. of crude product. A solution of 50 g. of this oily crude product in 300 ml. of ethanol was added to a solution of 80 g. of cupric acetate monohydrate in 1200 ml. of water, preheated to 60° C. The mixture was stirred at room temperature for two hours and filtered to give 25 g. of solid. A solution of the solid in 125 ml. of chloroform was treated with a solution of 36 ml. of concentrated hydrochloric acid in 110 ml. of water. This mixture was stirred for 1 hour, the organic layer was separated, washed with saturated aqueous salt solution, dried over anhydrous magnesium sulfate and evaporated to give 15 g. of material which was recrystallized from cold methanol two times, to give 2-(p-anisoyl)-4,4-dimethylcyclohexanone of melting point 101–102° C.

U.V.: λ max. 220 (5,950); sh. 273 (6,200); 324 (16,200).

*Analysis.*—Calcd. for $C_{16}H_{20}O_3$ (percent): C, 73.82; H, 7.74. Found (percent): C, 73.76; H, 8.00.

(B) Cis-A-α-(p-methoxyphenyl)-2-amino-5,5-dimethylcyclohexanemethanol.—A mixture of 56.9 g. (0.219 mole) of 1-(p-anisoyl)-4,4-dimethylcyclohexanone, 21.4 g. (0.22 mole) of benzylamine and benzene was refluxed under nitrogen for 5 hours using an azeotropic separator. After 3.9 ml. of water was collected, the reaction mixture was evaporated to dryness. The residue was dissolved in 500 ml. of ethanol and hydrogenated in two portions, each in the presence of 2.5 g. of platinum oxide catalyst at an initial hydrogen pressure of 52 p.s.i. After 14 hours each mixture was filtered and hydrogenation was continued in the presence of 4.5 g. of 10% palladium-on-charcoal catalyst. After 21 hours the combined mixture was filtered in the presence of a filter aid and the filtrate was evaporated. The residue thus obtained was stirred with 380 ml. of 10% aqueous acetic acid and 380 ml. of ether for a period of 1 hour. The acid layer was separated, cooled in ice, basified and extracted with methylene chloride. The organic extracts were washed with saturated salt solution, dried over magnesium sulfate and evaporated, to give 43 g. of an oil which solidified. Crystallization from ether-petroleum ether (boiling range 30–60° C.) gave 33.9 g. (59% yield) of cis-A-α-(p-methoxyphenyl)-2-amino-5,5-dimethylcyclohexanemethanol, which after an additional recrystallization from ether-petroleum ether had a melting point of 84–85° C.

U.V.: λ max. 224.5 (11,300); 274.5 (1,550); 282 (1,300).

*Analysis.*—Calcd. for $C_{16}H_{25}NO_2$ (percent): C, 72.96; H, 9.57; N, 5.32. Found (percent): C, 72.95; H, 9.58; N, 5.42.

(C) Cis-A-2-chloro-N-[2 - (α-hydroxy-p-methoxybenzyl)-4,4-dimethylcyclohexyl]acetamide. A solution of 12.1 g. (0.107 mole) of chloroacetyl chloride in 300 ml. of ether was added during 2 hours to a solution of 28 g. (0.107 mole) of cis-A-α-(p-methoxyphenyl)-2-amino-5,5-dimethylcyclohexanemethanol and 21.6 g. (0.214 mole) of triethylamine in 1500 ml. of ether. The temperature during the addition was kept at 5° C. and the reaction mixture was subsequently stirred at 5° C. for 2 hours. Thereafter 350 ml. of water was added, and the organic layer which separated was washed with water, then with three 100-ml. portions of aqueous 10% hydrochloric acid and saturated salt solution, and dried over anhydrous magnesium sulfate. The dried solution was evaporated to give 36 g. of crude cis-A-2-chloro-N-[2-(α-hydroxy-p - methoxybenzyl) - 4,4-dimethylcyclohexyl]acetamide.

U.V.: λ max. 224.5 (11,200); 274.5 (1,500); 282 (1,300).

(D) Cis-A-octahydro-5 - (p - methoxyphenyl)-7,7-dimethyl-4,1-benzoxazepin-2(3H)-one. A solution of 36 g. (0.109 mole) of cis-A-2-chloroN-[2-(α-hydroxy-p-methoxybenzyl)-4,4 - dimethylcyclohexyl]acetamide in 450 ml. of tetrahydrofuran was added during a period of 15 min. to a suspension of sodium hydride (9.9 g. of a 53% dispersion of sodium hydride in mineral oil) and the mixture was stirred overnight at room temperature (24–26° C.). It was then evaporated and to the residue was added 200 ml. of water and 200 ml. of ether. This mixture was stirred for 30 min. and then filtered. The resulting precipitate was collected, washed with water, then with ether, and recrystallized from methanol to give 14.5 g. of cis-A-octahydro-5-(p-methoxyphenyl)-7,7-dimethyl-4,1-benzoxazepin-2(3H)-one of melting point 224.5–226° C.

U.V.: λ max. 224 (12,700); 274.5 (1,550); 282 (1,300).

*Analysis.*—Calcd. for $C_{18}H_{25}NO_3$ (percent): C, 71.25; H, 8.31; N, 4.62. Found (percent): C, 17.33; H, 8.42; N, 4.83.

EXAMPLE 27

*Cis-A-decahydro-5-(p-methoxyphenyl)-7,7-dimethyl-4,1-benzoxazepine*

To a solution of 13.2 of lithium aluminum hydride in 550 ml. of tetrahydrofuran was added 31.2 g. (0.0435 mole) of cis-A-octahydro-5-(p-methoxyphenyl)-7,7-dimethyl-4,1-benzoxazepin-2(3H)-one portionwise, during 5 min. The resulting mixture was refluxed for 20 hours, then cooled in ice and decomposed by successive addition of 13 ml. of water, 13 ml. of 15% aqueous sodium hydroxide solution and 39 ml. of water. The resulting suspension was stirred at room temperature for 1 hour and filtered. The filter cake was washed with tetrahydrofuran and the filtrate and washings were combined, dried over anhydrous magnesium sulfate, and evaporated to give 13 g. of residue. This residue was crystallized from petroleum ether (boiling range 30–60° C.) to give in 2 crops a total of 10.5 g. of cis-A-decahydro-5-(p methoxyphenyl)-7,7-dimethyl-4,1-benzoxazepine of melting point 91–92° C.

U.V.: λ max. 224.5 (11,250); 275.5 ,1,550); 282 (1,300).

*Analysis.*—Calcd. for $C_{18}H_{27}NO_2$ (percent): C, 74.70; H, 9.40; N, 4.84: Found (percent): C, 74.91; H, 9.40; N, 5.12.

EXAMPLE 28

*Cis-A-decahydro-5-(p-methoxyphenyl)-1-ethyl-7,7-dimethyl-4,1-benzoxazepine*

A solution of 4.4 g. (0.0152 mole) of cis-A-decahydro-5-(p-methoxyphenyl)-7,7-dimethyl-4,1-benzoxazepine in 20 ml. of acetic anhydride was heated on the steam bath in a nitrogen atmosphere for a period of 2 hours. The reaction mixture was then evaporated, 50 ml. of water was added to the residue and the mixture was heated on the steam bath for ½ hour, cooled and extracted several times with ether. The organic extract was washed with water, then with saturated sodium bicarbonate solution and saturated salt solution, dried over anhydrous magnesium sulfate and evaporated, to give 4.6 g. of the crude N-acetyl derivative of the starting material, cis-A-decahydro-5-(p-methoxyphenyl) - 1 - acetyl-7,7-dimethyl-4,1-benzoxazepine.

U.V.: λ max. 223 (13,000); 275.5 (1,500); 282 (1,300).

A solution of the above N-acetyl compound in 50 ml. of tetrahydrofuran was added during 5 min. to a solution of 4.9 g. of lithium aluminum hydride in 300 ml. of tetrahydrofuran and the mixture was refluxed for 20 hours. It was then cooled and decomposed successively with 4.4 ml. of water, 4.4 ml. of 15% aqueous sodium hydroxide solution and 13.2 ml. of water. The suspension thus obtained was filtered and the filter cake was washed with tetrahydrofuran. The filtrate and washings were combined, dried over anhydrous magnesium sulfate and evaporated. The thus-obtained residue was recrystallized at —70° C. from petroleum ether (boiling range 30–60° C.) to give 4 g. of cis-A-decahydro-5-(p-methoxyphenyl)-1-ethyl-7,7-dimethyl-4,1-benzoxazepine which after an additional recrystallization from petroleum ether melted at 59–60° C.

U.V.: λ max. 223 (14,250; 274.5 (1,500); 282 (1,300).

*Analysis.*—Calcd. for $C_{20}H_{31}NO_2$ (percent): C, 75.67; H, 9.84; N, 4.41. Found (percent): C, 75.40; H, 9.90; N, 4.51.

EXAMPLE 29

*Cis-A-decahydro-5-(p-methoxyphenyl)-1,7,7-methyl-4,1-benzoxazepine and its hydrochloride*

A solution of 4.4 g. (0.0152 mole) of cis-A-decahydro-5-(p-methoxyphenyl)-7,7-dimethyl-4,1-benzoxazepine in 90 ml. of ethyl formate was refluxed for 20 hours and then evaporated to give cis-A-octahydro-5-(p-methoxyphenyl)-7,7-dimethyl-4,1-benzoxazepine-1(5H)-carboxaldehyde as an oil, the N-formyl derivative of the starting material.

U.V.: λ max. 223 (12,150); 274.5 (1,400); 2882 (1,200).

A solution of the above N-formyl compound in 50 ml. of tetrahydrofuran was added during 5 min. to a solution of 4.5 g. of lithium aluminum hydride in 300 ml. of tetrahydrofuran and the mixture was refluxed for 20 hours. It was then cooled and decomposed with 4.4 ml. of water, 4.4 ml. of 15% sodium hydroxide solution and 13.2 ml. of water. The thus-obtained suspension was filtered and the filter cake was washed with tetrahydrofuran. The filtrate and washings were combined, dried over anhydrous magnesium sulfate and evaporated to give a residue. A solution of this residue in ether was treated with ethereal hydrogen chloride and the resulting hydrochloride was crystallized from methanol-ether to give, after recrystallization from the same solvent mixture, 3 g. (58% yield) of cis-A-decahydro-5-(p-methoxyphenyl)-1,7,7-trimethyl - 4,1-benzoazepine hydrochloride of melting point 247–248° C.

U.V.: λ max. 225 (11,750); 275 (1,550); 282 (1,300).

*Analysis.*—Calcd. for $C_{19}H_{29}NO_2 \cdot HCl$ (percent): C, 67.13; H, 8.90; Cl, 1043; N, 4.12. Found (percent): C, 66.98; H, 8.90; Cl, 10.39; N, 4.12.

Treatment of the hydrochloride with aqueous sodium hydroxide, extraction of the mixture with methylene chloride and evaporation of the methylene chloride extracts gave cis-A-decahydro-5 - (p-methoxyphenyl) - 1,7,7-trimethyl-4,1-benzoxazepine.

EXAMPLE 30

*Cis-A-octahydro-5-(3,4,5-trimethoxyphenyl)-4,1-benzoxazepin-2(3-H)-one*

(A) Cis-A-α-(3,4,5 - trimethoxyphenyl)-2-aminocyclohexanemethanol.—A mixture of 2 - (3,4,5 - trimethoxybenzoyl)cyclohexanone (83 g., 0.287 mole), 31 g. (0.29 mole) of benzylamine and 500 ml. of benzene was refluxed for 3 hours using an azeotropic separator. After 4.6 ml. of water was collected the mixture was evaporated to dryness. The resulting residue was dissolved in 500 ml. of ethanol and hydrogenated in two portions, each in the presence of 3 g. of platinum oxide catalyst at an initial pressure of 49 p.s.i. of hydrogen. After 25.5 hours, each mixture was filtered and hydrogenation was continued for 22 hours in the presence of 6 g. of 10% palladium-on-carbon catalyst. The combined mixture was filtered and evaporated to give a residue which was stirred for 1 hour with 600 ml. of ether and 600 ml. of 10% aqueous hydrochloric acid. Thereto was added 500 ml. of water to dissolve some solid. The acidic layer was separated, cooled, basified with 20% aqueous sodium hydroxide solution and extracted well with ether. The organic extract was washed with saturated salt solution, dried over anhydrous magnesium sulfate and evaporated to give a residue which was crystallized from ether, to give 43 g. (51% yield) of cis-A-α-(3,4,5-trimethoxyphenyl)-2-aminocyclohexanemethanol of melting point 119–120° C.

U.V.: sh. 223 (8,050); λ max. 268 (765); sh. 277 (588).

*Analysis.*—Calcd. for $C_{16}H_{25}NO_4$ (percent): C, 65.06; H, 8.53; N, 4.74. Found (percent): C, 65.20; H, 8.54; N, 4.46.

(B) Cis-A-2-chloro-N-[2-(α-hydroxy-3,4,5-trimethoxybenzyl)cyclohexyl]acetamide.—A solution of 10.7 g. (0.0945 mole) of chloroacetyl chloride in 320 ml. of ether was added during 1½ hours to a solution of 27.9 g. (0.0945 mole) of cis-A-α-(3,4,5-trimethoxyphenyl)-2-aminocyclohexanemethanol and 19.1 g. (0.189 mole) of triethylamine in 400 ml. of ether. The addition was carried out at a temperature of 6° C. and under stirring. The mixture was then stirred at 5° C. for a period of 2 hours, after which 300 ml. of water and 500 ml. of methylene chloride were added. The organic layer was separated, washed with water, with three 100-ml. portions of 10% aqueous hydrochloric acid, with saturated salt solution, dried over anhydrous magnesium sulfate and evaporated to give 32.8 g. of crude product which was used directly in the next step, the cyclization.

Crude product from another run was crystallized from ether to give cis-A-2-chloro-N-[2-(α-hydroxy-3,4,5-trimethoxybenzyl)cyclohexyl]acetamide of melting point 161–162° C.

U.V.: λ max. 204 (49,200); sh. 235 (6,850); 268 (773); sh. 278 (595).

Analysis.—Calcd. for $C_{18}H_{26}ClNO_5$ (percent): C, 58.13; H, 7.05; Cl, 9.54; N, 3.77. Found (percent): C, 58.13; H, 7.05; Cl, 9.69; N, 3.66.

(C) Cis-A-octahydro-5-(3,4,5 - trimethoxyphenyl)-4,1-benzoxazepin-2(3H)-one.—A solution of 32.8 g. (0.0884 mole) of cis-A-2-chloro-N-[2-(α-hydroxy - 3,4,5 - trimethoxybenzyl)cyclohexyl]acetamide in 365 ml. of tetrahydrofuran was added during a period of 5 min. to a suspension of sodium hydride (8.1 g. of 53% sodium hydride dispersion in mineral oil) and the mixture was stirred overnight. It was then evaporated and the residue was stirred for 30 min. with 200 ml. of water and 200 ml. of ether. The resulting suspension was filtered, the solid was washed with water, then with ether, and recrystallized twice from ethanol to give 13 g. of cis-A-octahydro-5-(3,4,5 - trimethoxyphenyl)-4,1-benzoxazepin-2(3H)-one of melting point 190–191° C., which after another recrystallization from ethanol had a melting point of 193–194° C.

U.V.: λ max. 205 (53,000); sh. 235 (6,770); 268 (805); sh. 277 (625).

Analysis.—Calcd. for $C_{18}H_{25}NO_5$ (percent): C, 64.46; H, 7.51; N, 4.18. Found (percent): C, 64.08; H, 7.79; N, 3.95.

EXAMPLE 31

Cis-A-decahydro-5-(3,4,5-trimethoxyphenyl)-4,1-benzoxazepine and hydrate

A solution of cis-A-octahydro-5-(3,4,5-trimethoxyphenyl)-4,1-benzoxazepin-2(3H)-one (1.6 g., 0.0048 mole) in 50 ml. of tetrahydrofuran was added during 1 min. to a solution of 1.6 g. of lithium aluminum hydride in 50 ml. of tetrahydrofuran. The mixture was refluxed for 18 hours, then decomposed by successive addition of 1.6 ml. of water, 1.6 ml. of 15% aqueous sodium hydroxide solution and 4.8 ml. of water. The suspension was filtered, the filter cake was washed with tetrahydrofuran, the filtrate and the tetrahydrofuran washings were combined and evaporated to give 1.3 g. of an oily crude product which solidified. This product was triturated with ether to give 0.4 g. of hydrated cis-A-decahydro-5-(3,4,5-trimethoxyphenyl)-4,1-benzoxazepine of melting point 180–181° C.

U.V.: λ max. 206 (47,500); sh. 235 (7,100); 271 (1,230); sh. 278 (1,004).

Analysis.—Calcd. for $C_{18}H_{27}NO_4 \cdot \frac{1}{3}H_2O$ (percent): C, 66.02; H, 8.52; N, 4.28. Found (percent): C, 65.81; H, 8.27; N, 4.43.

Heating this product at 110° C. at a 10–15 mm. Hg pressure for 3 days yielded anhydrous cis-A-decahydro-5-(3,4,5-trimethoxyphenyl)-4,1-benzoxazepine.

EXAMPLE 32

Cis-A-decahydro-5-phenyl-4,1-benzoxazepine (A) 2-benzoylcyclohexanone.—A solution of 80.5 g. (0.575 mole) of benzoyl chloride in 300 ml. of chloroform was added during 2 hours and 10 min. to a stirred solution of 96 g. (0.575 mole) of 1-morpholino-1-cyclohexene [Organic Syntheses, volume 41, p. 65, John Wiley and Sons, Inc., New York] and 58 g. (0.575 mole) of triethylamine in 700 ml. of chloroform in a nitrogen atmosphere, at a temperature between −7 to −10° C. The mixture was then stirred for 1 hour and at room temperature overnight. To this mixture was added 1 l. of a 10% aqueous hydrochloric acid solution, the mixture was then stirred for 2 hours and the aqueous layer was extracted with 200 ml. of chloroform. The combined chloroform solution was washed with saturated salt solution, dried over anhydrous magnesium sulfate and evaporated. The residue of 12.7 g. thus obtained was crystallized from 100 ml. of methanol to give in 2 crops, 52.2 g. (45% yield) of 2-benzoylcyclohexanone of melting point 91–92° C.

(B) Cis-A-α-phenyl-2-aminocyclohexanemethanol.—A mixture of 20.2 g. (0.1 mole) of 2-benzoylcyclohexanone, 11.1 g. of benzylamine and 150 ml. of benzene was refluxed for 4 hours under nitrogen using an azeotropic separator. The solution was evaporated to dryness, the resulting residue was dissolved in 150 ml. of ethanol and hydrogenated in the presence of 1 g. of platinum oxide catalyst at an initial hydrogen pressure of 46.5 p.s.i. After the absorption of 0.2 mole of hydrogen the mixture was filtered, 5 g. of 10% palladium-on-carbon catalyst was added and the hydrogenation was continued until 0.1 mole of hydrogen was absorbed. The mixture was filtered and the filtrate was evaporated to give a residue which was recrystallized from ether-petroleum ether (boiling range of petroleum ether 30–60° C.) to give in 2 crops, 12.7 g. of cis-A-α-phenyl-2-aminocyclohexanemethanol, melting point 110–111° C.

U.V.: sh. 242 (92); sh. 248 (125); λ max. 252 (164); 257 (199); sh. 260 (148); 263 (158); sh. 267 (94).

Analysis.—Calcd. for $C_{13}H_{19}NO$ (percent): C, 76.05; H, 9.33; N, 6.82. Found (percent): C, 75.97; H, 9.21; N, 6.74.

(C) Cis-A-2-chloro-N[2-(α-hydroxybenzyl)cyclohexyl]acetamide.—A solution of 4.66 g. (0.0413 mole) of chloroacetyl chloride in 115 ml. of ether was added under nitrogen during a period of 75 min. to a stirred and cooled solution of cis - A - α - 2 - aminocyclohexanemethanol and 8.35 g. (0.0826 mole) of triethylamine in 325 ml. of ether. The addition was carried out at 5° C. and the mixture was thereafter stirred for 1 hour at the same temperature. Thereafter, 100 ml. of water and 100 ml. of methylene chloride were added. The organic layer was separated, washed with water, then with 2 portions of 50 ml. each of 10% hydrochloric acid, water, saturated salt solution, then dried over magnesium sulfate and evaporated to give 11.5 g. of cis-A-2-chloro-N-[2-(α-hydroxybenzyl)cyclohexyl]acetamide.

(D) Hydrated cis-A-octahydro-5-phenyl-4,1-benzoxazepin-2(3H)-one.—To a solution of cis-A-2-chloro-N-[2-(α-hydroxybenzyl)cyclohexyl]acetamide (11.5 g., 0.041 mole) was added 3.7 g. of sodium hydride (as a 53% mineral oil dispersion) in 100 ml. of tetrahydrofuran. The mixture was stirred for 18 hours, then evaporated in vacuo on the steam bath; 100 ml. of water and 100 ml. of ether were added and the mixture was stirred for 15 min. The resulting suspension was filtered to give hydrated cis-A-octahydro-5-phenyl - 4,1 - benzoxazepin-2(3H)-one which after recrystallization from ethanol melted at 246.5–247.5° C.

U.V.: λ max. 204 (15,400); sh. 245 (191); 251 (194); 256 (314); 263 (164); sh. 166 (91).

Analysis.—Calcd. for $C_{15}H_{19}NO_2 \cdot 1/6H_2O$ (percent): C, 72.55; H, 7.71; N, 5.64. Found (percent): C, 72.51; H, 7.84; N, 5.70.

Heating the above hydrated material at 110° C. at 15 mm. Hg for 3 days yielded anhydrous cis-A-octahydro-5-phenyl-4,1-benzoxazepin-2(3H)-one.

(E) Cis-A-decahydro-5-phenyl-4,1-benzoxazepine, its hydrochloride and its hydrochloride methanol solvate.—To a solution of 5 g. of lithium aluminum hydride in 200 ml. of tetrahydrofuran was added 5 g. (0.0204 mole) of hydrated cis-A-octahydro-5-phenyl-4,1-benzoxazepin-2(3H)-one (Example 32D). The mixture was refluxed for 24 hours, then cooled in ice, and decomposed by successive addition of 5 ml. of water, 5 ml. of 15% aqueous sodium hydroxide solution and 15 ml. of water. The thus-obtained suspension was filtered, the filter cake washed with tetrahydrofuran, the combined filtrate and washings evaporated to give 4.4 g. of cis-A-decahydro-5-phenyl-4,1-benzoxazepine as a yellow oil.

U.V.: sh. 205 (9,750); sh. 209 (8,950); sh. 215 (6,250); sh. 242 (123); λ max. 247 (153); 251 (194);

257 (234); 259 (183); 263 (187); 267 (136); sh. 270 (62); 282 (46).

The oil was dissolved in ether and treated with ethereal hydrogen chloride to give cis-A-decahydro-5-phenyl-4,1-benzoxazepine hydrochloride, which after recrystallization from methanol-ether had a methanol of solvation and a melting point of 194–195° C. The yield was 3.5 g. (53%).

U.V.: λ max. 205 (9,000); 208 (8,850); sh. 236 (49); 242 (77); 246 (113); 251 (160); 256 (210); 259 (143); 263 (158); sh. 266 (90).

Analysis.—Calcd. for $C_{15}H_{21}NO \cdot HCl \cdot 1/4CH_3OH$ (percent): C, 66.41; H, 8.40; Cl, 12.86; N, 5.08. Found (percent): C, 66.58; H, 8.61; Cl, 13.05; N, 5.01.

Heating the above solvate at 120° C. for a period of 24 hours at a pressure of 10 mm. Hg gave solvent-free cis-A-decahydro-5-phenyl-4,1-benzoxazepine hydrochloride.

EXAMPLE 33

*Cis-A-octahydro-5-phenyl-4,1-benzoxazepine-1 (5H)-carboxaldehyde*

A mixture of 11.6 g. (0.05 mole) of cis-A-decahydro-5-phenyl-4,1-benzoxazepine and 250 ml. of ethyl formate was refluxed for 24 hours in a nitrogen atmosphere. The mixture was then evaporated to give a residue which was crystallized from ether to yield cis-A-octahydro-5-phenyl-4,1-benzoxazepine-1(5H)-carboxaldehyde in a total yield of 8.2 g. (64%) melting point 144–145° C.

U.V.: λ max. 246 (135); 251 (169); 256 (207); sh. 259.5 (145); 263 (158); 266 (91); sh. 271 (21).

Analysis.—Calcd. for $C_{16}H_{21}NO_2$ (percent): C, 74.10; H, 8.16; N, 5.40. Found (percent): C, 73.70; H, 8.03; N, 5.25.

EXAMPLE 34

*Cis-A-decahydro-5-phenyl-1-methyl-4,1-benzoxazepine and its hydrochloride*

A solution of 6.4 g. (0.0247 mole) of cis-A-octahydro-5-phenyl-4,1-benzoazepine-1(5H)-carboxaldehyde in 100 ml. of tetrahydrofuran was added to a solution of 6.4 g. of lithium aluminum hydride in 260 ml. of tetrahydrofuran and the mixture was refluxed in a nitrogen atmosphere for 20 hours. It was then cooled in ice and decomposed by successive addition of 6.4 ml. of water, 6.4 ml. of 15% aqueous sodium hydroxide solution and 19.2 ml. of water. The thus-obtained suspension was stirred at room temperature for 1 hour and filtered. The filtrate was dried over anhydrous magnesium sulfate and evaporated to give cis-A-decahydro-5-phenyl-1-methyl-4,1-benzoxazepine as a residue (6.1 g.) which was dissolved in ether and treated with ethereal hydrogen chloride. The crude hydrochloride was crystallized from methanol-ether to give 4.2 g. (61% yield) of cis-A-decahydro-5-phenyl-1-methyl-4,1-benzoxazepine hydrochloride of melting point 243–244° C.

U.V.: sh. 236 (54); sh. 242 (76); λ max. 246 (113); 251 (158); 256 (200); sh. 260; 263 (159); sh. 266 (85).

Analysis.—Calcd. for $C_{16}H_{23}NO \cdot HCl$ (percent): C, 68.20; H, 8.58; Cl, 12.58; N, 4.97. Found (percent): C, 67.83; H, 8.70; Cl, 12.59; N, 4.69.

EXAMPLE 35

*Cis-A-decahydro-5-phenyl-1-acetyl-4,1-benzoxazepine*

A solution of 12 g. (0.052 mole) of cis-A-decahydro-5-phenyl-4,1-benzoxazepine in 52 ml. of acetic anhydride was heated on the steam bath for 2 hours. It was then evaporated, 100 ml. of water was added and the mixture was heated on the steam bath for 30 min. The mixture was then cooled, the resulting suspension was filtered, and the solid was washed with water. The solid was then recrystallized from ether to give 9.8 g. of cis-A-decahydro-5-phenyl-1-acetyl-4,1-benzoxazepine of melting point 126–127° C.

U.V.: λ max. 246 (137); 252 (172); 257 (210); 259.5 (148); 263 (159); sh. 266 (90).

Analysis.—Calcd. for $C_{17}H_{23}NO_2$ (percent): C, 74.69; H, 8.48; N, 5.12. Found (percent): C, 74.49; H, 8.26; N, 4.99.

EXAMPLE 36

*Cis-A-decahydro-5-phenyl-1-ethyl-4,1-benzoxazepine and its hydrochloride*

To a solution of 9.3 g. of lithium aluminum hydride in 900 ml. of tetrahydrofuran was added 9.3 g. (0.034 mole) of cis-A-decahydro-5-phenyl-1-acetyl-4,1-benzoxazepine. The mixture was refluxed for 20 hours, then cooled and decomposed by successive addition of 9.3 ml. of water, 9.3 ml. of 15% aqueous sodium hydroxide and 28 ml. of water. The thus-obtained suspension was filtered, the filter cake washed with tetrahydrofuran, the filtrate and washings combined, dried over anhydrous magnesuim sulfate and evaporated to give 7.2 g. of oily cis-A-decahydro - 5 - phenyl-1-ethyl-4,1-benzoxazepine. This oil was treated with an ethereal solution of hydrogen chloride. The thus-obtained hydrochloride was crystallized from ethanol-ether to give 7 g. (69% yield) of cis-A-decahydro-5-phenyl-1-ethyl-4,1-benzoxazepine hydrochloride of melting point 232–233° C.

U.V.: sh. 236; sh. 242 (74); λ max. 246 (109); 252 (157); 257 (198); sh. 260 (133); 263 (154); 267 (83).

Analysis.—Calcd. for $C_{17}H_{25}NO \cdot HCl$ (percent): C, 69.01; H, 8.86; Cl, 11.99; N, 4.74. Found (percent): C, 68.46; H, 9.03; Cl, 11.98; N, 4.47.

The free amine, cis-A-decahydro-5-phenyl-1-ethyl-4,1-benzoxazepine was obtained by treating the hydrochloride with aqueous sodium hydroxide solution, extracting the free amine with ether and evaporating the ether solution.

EXAMPLE 37

*Cis-A-decahydro-5-(2-methoxy-4-methylphenyl)-4,1-benzoxazepine*

(A) Cis-A-2-chloro-N-[2-(α-hydroxy - 2 - methoxy-4-methylbenzyl)cyclohexyl]acetamide. — In the manner given in Example 1, cis-A-α-(2-methoxy-4-methylphenyl)-2 - aminocyclohexanemethanol was treated with chloroacetyl chloride to give cis-A-2-chloro-N-[2-(α-hydroxy-2-methoxy-4-methylbenzyl)cyclohexyl]acetamide.

(B) Cis-A-octahydro - 5 - (2 - methoxy-4-methylphenyl)-4,1-benzoxazepin-2(3H)-one.—In the manner given in Example 2, cis-A-2-chloro-N-[2-(α-hydroxy - 2 - methoxy - 4 - methylbenzyl)cyclohexyl]acetamide was treated with sodium hydride in tetrahydrofuran to give cis-A-octahydro - 5 - (2-methoxy-4-methylphenyl)-4,1 - benzoxazepin-2(3H)-one.

(C) Cis-A-decahydro - 5 - (2 - methoxy-4-methylphenyl)-4,1-benzoxazepine.—In the manner given in Example 4, cis-A-octahydro - 5 - (2-methoxy - 4 - methylphenyl)-4,1-benzoxazepin-2(3H)-one was added to a solution of lithium aluminum hydride in tetrahydrofuran to give cis-A-decahydro - 5 - (2 - methoxy-4-methylphenyl)-4,1-benzoxazepine.

EXAMPLE 38

*Cis-A-decahydro-5-(p-ethoxyphenyl)-4,1-benzoxazepine*

(A) Cis-A-2 - chloro-N-[2-(α-hydroxy-p-ethoxybenzyl) cyclohexyl]acetamide.—In the manner given in Example 1, cis-A-α - (p - ethoxyphenyl)-2-aminocyclohexanemethanol was treated with chloroacetyl chloride to give cis-A-2-chloro-N-[2-(α-hydroxy - p - ethoxybenzyl)cyclohexyl] acetamide.

(B) Cis-A-octahydro - 5 - (p-ethoxyphenyl)-4,1-benzoxazepin-2(3H)-one.—In the manner given in Example 2, cis-A-2-chloro-N-[2-(α-hydroxy - p - ethoxybenzyl)cyclohexyl]acetamide was treated with sodium hydride in tetrahydrofuran to give cis-A-octahydro-5-(p-ethoxyphenyl)-4,1-benzoxazepin-2(3H)-one.

(C) Cis-A-decahydro - 5 - (p-ethoxyphenyl)-4,1-benzoxazepine.—In the manner given in Example 4, cis-A-octahydro-5-(p-ethoxyphenyl) - 4,1-benzoxazepin-2(3H)-one was added to a solution of lithium aluminum hydride in tetrahydrofuran to give cis-A-decahydro - 5 - (p-ethoxyphenyl)-4,1-benzoxazepine.

EXAMPLE 39

Cis-A-decahydro-5-(3,5-dimethyl-4-methoxyphenyl)-4,1-benzoxazepine (A) Cis-A-2-chloro-N-[2 - (α - hydroxy-3,5-dimethyl-4-methoxybenzyl)cyclohexyl]acetamide.—In the manner given in Example 1, cis-A-α-(3,5-dimethyl-4-methoxyphenyl - 2 - aminocyclohexanemethanol was treated with chloroacetyl chloride to give cis-A-2-chloro-N-[2-(α-hydroxy-3,5-dimethyl - 4 - methoxybenzyl)cyclohexyl]acetamide.

(B) Cis-A-octahydro-5-(3,5 - dimethyl-4-methoxyphenyl)-4,1-benzoxazepin-2(3H)-one.—In the manner given in Example 2, cis - A - 2 - chloro-N-[2-(α-hydroxy-3,5-dimethyl-4-methoxybenzyl)cyclohexyl]acetamide was treated with sodium hydride in tetrahydrofuran to give cis-A-octahydro - 5 - (3,5-dimethyl - 4 - methoxyphenyl)-4,1-benzoxazepin-2(3H)-one.

(C) Cis-A-decahydro - 5 - (3,5-dimethyl - 4 - methoxyphenyl)-4,1-benzoxazepine.—In the manner given in Example 4, cis-A-octahydro - 5 - (3,5-dimethyl - 4 - methoxyphenyl)-4,1-benzoxazepin-2(3H)-one was added to a solution of lithium aluminum hydride in tetrahydrofuran to give cis-A-decahydro - 5 - (3,5-dimethyl - 4 - methoxyphenyl)-4,1-benzoxazepine.

EXAMPLE 40

Cis-A-decahydro-5-(p-trifluoromethylphenyl)-4,1-benzoxazepine (A) Cis - A - 2 - chloro-N-[2-(α-hydroxy - p - trifluoromethylbenzyl)cyclohexyl]acetamide. — In the manner given in Example 1, cis-A-α-(p-trifluoromethylphenyl)-2-aminocyclohexanemethanol was treated with chloroacetyl chloride to give cis-A-2-chloro-N-[2-(α-hydroxy - p - trifluoromethylbenzyl)cyclohexyl]acetamide.

(B) Cis-A-octahydro - 5 - (p-trifluoromethylphenyl)-4,1-benzoxazepin-2(3H)-one. — In the manner given in Example 2, cis-A-2-chloro-N-[2-(α-hydroxy - p - trifluoromethylbenzyl)cyclohexyl]acetamide was treated with sodium hydride in tetrahydrofuran to give cis-A-octahydro-5 - (p-trifluoromethylphenyl) - 4,1-benzoxazepin - 2(3H)-one.

(C) Cis-A-decahydro - 5 - (p-trifluoromethylphenyl)-4,1-benzoxazepine.—In the manner given in Example 4, cis-A-octahydro - 5 - (p-trifluoromethylphenyl)-4,1-benzoxazepin-2(3H)-one was added to a solution of lithium aluminum hydride in tetrahydrofuran to give cis-A-decahydro - 5 - (p-trifluoromethylphenyl)-4,1-benzoxazepine.

EXAMPLE 41

Cis-A-decahydro-5-(p-chlorophenyl)-4,1-benzoxazepine (A) Cis - A - 2 - chloro-N-[2-(α-hydroxy - p - chlorobenzyl)cyclohexyl]acetamide. — In the manner given in Example 1, cis-A-α-(p - chlorophenyl)-2-aminocyclohexanemethanol was treated with chloroacetyl chloride to give cis-A-2-chloro-N-[2-(α-hydroxy - p - chlorobenzyl)cyclohexyl]acetamide.

(B) Cis-A-octahydro - 5 - (p-chlorophenyl) - 4,1-benzoxazepin-2(3H)-one.—In the manner given in Example 2, cis-A-2-chloro-N-[2-(α-hydroxy - p - chlorobenzyl)cyclohexyl]acetamide was treated with sodium hydride in tetrahydrofuran to give cis-A-octahydro - 5 - (p-chlorophenyl) - 4,1-benzoxazepin-2(3H)-one.

(C) Cis-A-decahydro - 5 - (p-chlorophenyl) - 4,1-benzoxazepin. — In the manner given in Example 4, cis-A-octahydro-5-(p-chlorophenyl) - 4,1-benzoxazepin-2(3H)-one was added to a solution of lithium aluminum hydride in tetrahydrofuran to give cis-A-decahydro - 5 - (p-chlorophenyl)-4,1-benzoxazepine.

EXAMPLE 42

Cis-A-decahydro-5-(m-fluorophenyl)-4,1-benzoxazepine (A) Cis-A-2-chloro-N-[2-(α-hydroxy - m - fluorobenzyl)cyclohexyl]acetamide.—In the manner given in Example 1, cis-A-α-(m-fluorophenyl)-2-aminocyclohexanemethanol was treated with chloroacetyl chloride to give cis-A-2-chloro-N-[2-(α-hydroxy - m - fluorobenzyl)cyclohexyl]acetamide.

(B) Cis - A - octahydro-5-(m-fluorophenyl)-4,1-benzoxazepin-2(3H)-one.—In the manner given in Example 2, cis-A-2-chloro-N-[2-(α-hydroxy-m-fluorobenzyl)cyclohexyl]acetamide was treated with sodium hydride in tetrahydrofuran to give cis-A-octahydro-5-(m-fluorophenyl)-4,1-benzoxazepin-2(3H)-one.

(C) Cis - A - decahydro-5-(m - fluorophenyl)-4,1-benzoxazepine.—In the manner given in Example 4, cis-A-octahydro-5-(m-fluorophenyl)-4,1 - benzoxazepin-2(3H)-one was added to a solution of lithium aluminum hydride in tetrahydrofuran to give cis-A-decahydro-5-(m-fluorophenyl)-4,1-benzoxazepine.

EXAMPLE 43

Cis-A-decahydro-5-(o-iodophenyl)-4,1-benzoxazepine (A) Cis-A - 2 - chloro-N-[2-(α-hydroxy-o-iodobenzyl)cyclohexyl]acetamide.—In the manner given in Example 1, cis - A - α-(o-iodophenyl)-2-aminocyclohexanemethanol was treated with chloroacetyl chloride to give cis-A-2-chloro-N-[2-(α - hydroxy - o - iodobenzyl)cyclohexylacetamide.

(B) Cis - A - octahydro - 5 - (o - iodophenyl)-4,1-benzoxazepin-2(3H)-one.—In the manner given in Example 2, cis - A - 2-chloro-N-[2-(α-hydroxy-o-iodobenzyl)cyclohexyl]acetamide was treated with sodium hydride in tetrahydrofuran to give cis-A-octahydro-5-(o-iodophenyl)-4,1-benzoxazepin-2(3H)-one.

(C) Cis - A - decahydro - 5 - (o-iodophenyl)-4,1-benzoxazepine.—In the manner given in Example 4, cis-A-octahydro-5-(o-iodophenyl) - 4,1 - benzoxazepin - 2(3H)-one was added to a solution of lithium aluminum hydride in tetrahydrofuran to give cis-A-decahydro-5-(o-iodophenyl)-4,1-benzoxazepine.

EXAMPLE 44

Cis-A-decahydro-5-(2-methyl-4-bromophenyl)-4,1-benzoxazepine (A) Cis - A - 2-chloro-N-[2-(α-hydroxy - 2 - methyl-4-bromobenzyl)cyclohexyl]acetamide.—In the manner given in Example 1, cis-A-α-(2-methyl-4-bromophenyl)-2-aminocyclohexanemethanol was treated with chloroacetyl chloride to give cis-A-2-chloro-N-[2-(α-hydroxy-2-methyl-4-bromobenzyl)cyclohexyl]acetamide.

(B) Cis - A - octahydro-5-(2-methyl-4-bromophenyl)-4,1-benzoxazepin-2(3H)-one.—In the manner given in Example 2, cis-A-2-chloro-N-[2-(α-hydroxy-2-methyl-4-bromobenzyl)cyclohexyl]acetamide was treated with sodium hydride in tetrahydrofuran to give cis-A-octahydro-5-(2-methyl-4-bromophenyl)-4,1 - benzoxazepin - 2(3H)-one.

(C) Cis - A - decahydro-5-(2-methyl-4-bromophenyl)-4,1-benzoxazepine.—In the manner given in Example 4, cis - A - octahydro-5-(2-methyl-4-bromophenyl)-4,1-benzoxazepin-2(3H)-one was added to a solution of lithium aluminum hydride in tetrahydrofuran to give cis-A-decahydro-5-(2-methyl-4-bromophenyl)-4,1-benzoxazepine.

EXAMPLE 45

Cis-A-decahydro-5-(p-bromophenyl)-4,1-benzoxazepine (A) Cis - A - 2 - chloro-N-[2-(α-hydroxy-p-bromobenzyl)cyclohexyl]acetamide.—In the manner given in Example 1, cis-A-α-(p-bromophenyl)-2-aminocyclohexanemethanol was treated with chloroacetyl chloride to give cis-A - 2 - chloro-N-[2-(α-hydroxy-p-bromobenzyl)cyclohexyl]acetamide.

(B) Cis - A - octahydro - 5-(p-bromophenyl)-4,1-benzoxazepin-2(3H)-one.—In the manner given in Example 2, cis - A-2-chloro-N-[2-(α-hydroxy-p-bromobenzyl)cyclohexyl]acetamide was treated with sodium hydride in tetrahydrofuran to give cis-A - 2 - chloro-N-[2-(α-hydroxy-p-bromophenyl)-4,1-benzoxazepin-2(3H)-one.

(C) Cis - A - decahydro-5-(p-bromophenyl)-4,1-benzoxazepine.—In the manner given in Example 4, cis-A-octahydro-5-(p-bromophenyl)-4,1 - benzoxazepin-2(3H)-one was added to a solution of lithium aluminum hydride in tetrahydrofuran to give cis-A-decahydro-5-(p-bromophenyl)-4,1-benzoxazepine.

EXAMPLE 46

*Cis-A-decahydro-5-(p-t-butylphenyl)-4,1-benzoxazepine*

(A) Cis-A - 2 - chloro-N-[2-(α-hydroxy-p-t-butylbenzyl)cyclohexyl]acetamide.—In the manner given in Example 1, cis-A-α-(p-t-butylphenyl)-2-aminocyclohexanemethanol was treated with chloroacetyl chloride to give cis-A - 2 - chloro-N-[2-(α-hydroxy-p-t-butylbenzyl)cyclohexyl]acetamide.

(B) Cis - A - octahydro-5-(p-t-butylphenyl)-4,1-benzoxazepin-2(3H)-one.—In the manner given in Example 2, cis-A-2-chloro-N-[2-(α-hydroxy-p-t-butylbenzyl)cyclohexyl]acetamide was treated with sodium hydride in tetrahydrofuran to give cis-A-octahydro-5-(p-t-butylphenyl)-4,1-benzoxazepin-2(3H)-one.

(C) Cis - A - decahydro-5-(p-t-butylphenyl)-4,1-benzoxazepine.—In the manner given in Example 4, cis-A-octahydro - 5-(p-t-butylphenyl)-4,1-benzoxazepin-2(3H)-one was added to a solution of lithium aluminum hydride in tetrahydrofuran to give cis-A-decahydro-5-(p-t-butylphenyl)-4,1-benzoxazepine.

EXAMPLE 47

*Cis-A-octahydro-5-(3,4,5-trimethoxyphenyl)-1H-cyclopenta[e][1,4]oxazepine*

(A) Cis - A - 2 - chloro - N-[2-(α-hydroxy-3,4,5-trimethoxybenzyl)cyclopentyl]acetamide.—In the manner given in Example 1, cis-A-α-(3,4,5-trimethoxyphenyl)-2-aminocyclopentanemethanol was treated with chloroacetyl chloride to give cis-A-2-chloro-N-[2-(α-hydroxy-3,4,5-trimethoxybenzyl)cyclopentyl]acetamide.

(B) Cis - A - hexahydro - 5-(3,4,5-trimethoxyphenyl)-1H-cyclopenta[e][1,4]oxazepin-2(3H)-one.—In the manner given in Example 2, cis-A-2-chloro-N-[2-(α-hydroxy-3,4,5-trimethoxybenzyl)cyclopentyl]acetamide was treated with sodium hydride in tetrahydrofuran to give cis-A-hexahydro - 5 - (3,4,5-trimethoxyphenyl)-1H-cyclopenta[e][1,4]oxazepin-2(3H)-one.

(C) Cis-A-octahydro-5-(3,4,5 - trimethoxyphenyl)-1H-cyclopenta[e][1,4]oxazepine.—In the manner given in Example 4, cis-A-hexahydro-5-(3,4,5-trimethoxyphenyl)-1H-cyclopenta[e][1,4]oxazepin-2(3H)-one was added to a solution of lithium aluminum hydride in tetrahydrofuran to give cis-A-octahydro-5-(3,4,5-trimethoxyphenyl)-1H-cyclopenta[e][1,4]oxazepine.

EXAMPLE 48

*Cis-A-octahydro-5-(p-methoxyphenyl)-1H-cyclopenta[e][1,4]oxazepine*

(A) cis-A - 2 - chloro-N-[2-(α-hydroxy-p-methoxybenzyl)cyclopentyl]acetamide.—In the manner given in Example 1, cis-A-α-(p-methoxyphenyl)-2-aminocyclopentanemethanol was treated with chloroacetyl chloride to give cis-A-2-chloro-N-[2-(α-hydroxy-p - methoxybenzyl)cyclopentyl]acetamide.

(B) Cis - A - hexahydro-5-(p-methoxyphenyl)-1H-cyclopenta[e][1,4]oxazepin-2(3H)-one.—In the manner given in Example 2, cis-A-2-chloro-N-[2-(α-hydroxy-p-methoxybenzyl)cyclopentyl]acetamide was treated with sodium hydride in tetrahydrofuran to give cis-A-hexahydro - 5 - (p-methoxyphenyl) - 1H - cyclopenta[e][1,4]oxazepin-2(3H)-one.

(C) Cis - A - octahydro-5-(p-methoxyphenyl)-1H-cyclopenta[e][1,4]oxazepine.—In the manner given in Example 4, cis-A-hexahydro-5-(p-methoxyphenyl) - 1H-cyclopenta[e][1,4]oxazepin-2(3H)-one was added to a solution of lithium aluminum hydride in tetrahydrofuran to give cis-A-octahydro - 5 - (p-methoxyphenyl)-1H-cyclopenta[e][1,4]oxazepine.

EXAMPLE 49

*Cis-A-octahydro-5-(m-trifluoromethylphenyl)-1H-cyclopenta[e][1,4]oxazepine*

(A) Cis - A - 2 - chloro-N-[2-(α-hydroxy-m-trifluoromethylbenzyl)cyclopentyl]acetamide.—In the manner given in Example 1, cis-A-α-(m-trifluoromethylphenyl)-2-aminocyclopentanemethanol was treated with chloroacetyl chloride to give cis-A-2-chloro-N-[2-(α-hydroxy-m-trifluoromethylbenzyl)cyclopentyl]acetamide.

(B) Cis - A - hexahydro-5-(m-trifluoromethylphenyl)-1H - cyclopenta[e][1,4]oxazepin-2(3H) - one.—In the manner given in Example 2, cis-A-2-chloro-N-[2-(α-hydroxy - m - trifluoromethylbenzyl)cyclopentyl]acetamide was treated with sodium hydride in tetrahydrofuran to give cis-A-hexahydro-5-(m-trifluoromethylphenyl)-1H-cyclopenta[e][1,4]oxazepin-2(3H)-one.

(C) Cis-A-octahydro - 5 - (m-trifluoromethylphenyl)-1H-cyclopenta[e][1,4]oxazepine.—In the manner given in Example 4, cis-A-hexahydro-5-(m-trifluoromethylphenyl)-1H-cyclopenta[e][1,4]oxazepin - 2(3H) - one was added to a solution of lithium aluminum hydride in tetrahydrofuran to give cis-A-octahydro-5-(m-trifluoromethylphenyl)-1H-cyclopenta[e][1,4]oxazepine.

EXAMPLE 50

*Cis-A-octahydro-5-(p-bromophenyl)-6,6-dimethyl-1H cyclopenta[e][1,4]oxazepine*

(A) Cis - A - 2-chloro-N-[2-(α-hydroxy-p-bromobenzyl)-5,5 - dimethylcyclopentyl]acetamide.—In the manner given in Example 1, cis-A-α-(p-bromophenyl)-2-amino-5,5 - dimethylcyclopentanemethanol was treated with chloroacetyl chloride to give cis-A-2-chloro-N-[2-(α - hydroxy-p-bromobenzyl) - 5,5-dimethylcyclopentyl]acetamide.

(B) Cis - A - hexahydro-5-(p-bromophenyl)-6,6-dimethyl-1H-cyclopenta[e][1,4]oxazepin - 2(3H)-one.—In the manner given in Example 2, cis-A-2-chloro-N-[2-(α-hydroxy-p-bromobenzyl) - 5,5 - dimethylcyclopentyl]acetamide was treated with sodium hydride in tetrahydrofuran to give cis-A-hexahydro - 5 - (p-bromophenyl)-6,6-dimethyl-1H-cyclopenta[e][1,4]oxazepin-2(3H)-one.

(C) Cis - A - octahydro-5-(p-bromophenyl)-6,6-dimethyl-1H-cyclopenta[e][1,4]oxazepine.—In the manner given in Example 4, cis-A-hexahydro-5-(p-bromophenyl)-6,6-dimethyl - 1H - cyclopenta[e][1,4]oxazepin-2(3H)-one was added to a solution of lithium aluminum hydride in tetrahydrofuran to give cis-A-octahydro-5-(p-bromophenyl)-6,6-dimethyl - 1H - cyclopenta[e][1,4]oxazepine.

EXAMPLE 51

*Cis-A-decahydro-5-(3,4,5-trimethoxyphenyl)-1H-cyclohepta[e][1,4]oxazepine*

(A) Cis - A - 2 - chloro-N-[2-(α-hydroxy-3,4,5-trimethoxybenzyl)cycloheptyl]acetamide. — In the manner given in Example 1, cis-A-α-(3,4,5-trimethoxyphenyl)-2-aminocycloheptanemethanol was treated with chloroacetyl chloride to give cis-A-2-chloro-N-[2-(α-hydroxy-3,4,5-trimethoxybenzyl)cycloheptyl]acetamide.

(B) Cis - A - octahydro-5-(3,4,5-trimethoxyphenyl)-1H-cyclohepta[e][1,4]oxazepin - 2(3H) - one.—In the manner given in Example 2, cis-A-2-chloro-N-[2-(α-hydroxy-3,4,5 - trimethoxybenzyl)cycloheptyl]acetamide was treated with sodium hydride in tetrahydrofuran to give cis-A-octahydro-5-(3,4,5 - trimethoxyphenyl) - 1H-cyclohepta[e][1,4]oxazepin - 2(3H) - one.

(C) Cis - A - decahydro-5-(3,4,5-trimethoxyphenyl)-1H-cyclohepta[e][1,4]oxazepine.—In the manner given in Example 4, cis-A-octahydro-5-(3,4,5-trimethoxyphenyl) - 1H - cyclohepta[e][1,4]oxazepin-2(3H)-one was added to a solution of lithium aluminum hydride in tetrahydrofuran to give cis-A-decahydro-5-(3,4,5-trimethoxyphenyl)-1H-cyclohepta[e][1,4]oxazepine.

In the same manner shown above in Example 51, cis-A-decahydro - 5 - (3,4,5 - trimethoxyphenyl) - 10,10-dimethyl-1H-cyclohepta[e][1,4]oxazepine is obtained by substituting cis-A-α-(3,4,5-trimethoxyphenyl) - 2-amino-3,3-dimethylcycloheptanemethanol for the 1,3-aminoalcohol in Example 51A.

EXAMPLE 52

*Cis-A-decahydro-5-(p-isopropoxyphenyl)-1H-cyclopenta[e][1,4]oxazepine*

(A) Cis - A - 2-chloro-N-[2-(α-hydroxy-p-isopropoxybenzyl)cycloheptyl]acetamide.—In the manner given in Example 1, cis-A-α-(p-isopropoxyphenyl)-2-aminocycloheptanemethanol was treated with chloroacetyl chloride to give cis-A-2-chloro-N-[2-(α-hydroxy-p-isopropoxybenzyl)cycloheptyl]acetamide.

(B) Cis - A - octahydro-5-(p-isopropoxyphenyl)-1H-cyclohepta[e][1,4]oxazepin-2(3H)-one.—In the manner given in Example 2, cis-A-2-chloro-N-[2-(α-hydroxy-p-isopropoxybenzyl)cycloheptyl]acetamide was treated with sodium hydride in tetrahydrofuran to give cis-A-octahydro-5-(p-isopropoxyphenyl) - 1H - cyclohepta[e][1,4]oxazepin-2(3H)-one.

(C) Cis-A-decahydro-5-(p-isopropoxyphenyl) - 1H - cyclohepta[e][1,4]oxazepine.—In the manner given in Example 4, cis-A-octahydro-5-(p - isopropoxyphenyl)-1H-cyclohepta[e][1,4]oxazepin - 2(3H) - one was added to a solution of lithium aluminum hydride in tetrahydrofuran to give cis-A-decahydro - 5 - (p-isopropoxyphenyl)-1H-cyclohepta[e][1,4]oxazepine.

EXAMPLE 53

*Cis-A-dodecahydro-5(p-ethoxyphenyl)cycloocta[e][1,4]oxazepine*

(A) Cis - A - 2-chloro-N-[2-(α-hydroxy-p-ethoxybenzylcyclooctyl]acetamide.—In the manner given in Example 1, cis-A-α-(p-ethoxyphenyl)-2-aminocyclooctanemethanol was treated with chloroacetyl chloride to give cis-A-2-chloro-N-[2-(α-hydroxy - p - ethoxybenzyl)cyclooctyl]acetamide.

(B) Cis - A - decahydro-5-(p-ethoxyphenyl)cycloocta[e][1,4]oxazepin-2(3H)-one.—In the manner given in Example 2, cis - A - 2-chloro-N-[2-(α-hydroxy-p-ethoxybenzyl)cyclooctyl]acetamide was treated with sodium hydride in tetrahydrofuran to give cis-A-decahydro-5-(p-ethoxyphenyl)cycloocta[e][1,4]oxazepin-2(3H)-one.

(C) Cis - A - dodecahydro-5-(p-ethoxyphenyl)cycloocta[e][1,4]oxazepine.—In the manner given in Example 4, cis - A-decahydro-5-(p - ethoxyphenyl)cycloocta[e][1,4]oxzepin-2(3H)-one was added to a solution of lithium aluminum hydride in tetrahydrofuran to give cis-A - dodecahydro-5-(p - ethoxyphenyl)cycloocta[e][1,4]oxazepine.

In the manner given above, cis-A-α-(p-ethoxyphenyl)-2-amino-8,8-dimethylcyclooctanemethanol gave cis-A-dodecahydro - 5 - (p-ethoxyphenyl)-6,6-dimethylcycloocta[e][1,4]oxazepine.

EXAMPLE 54

*Cis-A-dodecahydro-5-(2,3,4-trimethoxyphenyl)-cycloocta[e][1,4]oxazepine*

(A) Cis - A-2 - chloro-N-[2-(α-hydroxy - 2,3,4 - trimethoxybenzyl)cyclooctyl]acetamide.—In the manner given in Example 1, cis-A-α-(2,3,4-trimethoxyphenyl)-2-aminocyclooctanemethanol was treated with chloroacetyl chloride to give cis-A-2-chloro-N-[2-(α-hydroxy-2,3,4-trimethoxybenzyl)cyclooctyl]acetamide.

(B) Cis-A-decahydro-5-(2,3,4-trimethoxyphenyl)cycloocta[e][1,4]oxazepin-2(3H)-one.—In the manner given in Example 2, cis-A-2-chloro-N-[2-(α-hydroxy-2,3,4-trimethoxybenzyl)cyclooctyl]acetamide was treated with sodium hydride in tetrahydrofuran to give cis-A-decahydro - 5 - (2,3,4-trimethoxyphenyl)cycloocta[e][1,4]oxazepin-2(3H)-one.

(C) Cis-A-dodecahydro-5-(2,3,4-trimethoxyphenyl)cycloocta[e][1,4]oxazepine.—In the manner given in Example 4, cis-A-decahydro-5-(2,3,4-trimethoxyphenyl)cycloocta[e][1,4]oxazepin-2(3H)-one was added to a solution of lithium aluminum hydride in tetrahydrofuran to give cis-A-dodecahydro-5-(2,3,4-trimethoxyphenyl)cycloocta[e][1,4]oxazepine.

EXAMPLE 55

*Cis-A-dodecahydro-5-(o-fluorophenyl)cycloocta-[e][1,4]oxazepine*

(A) Cis - A-2-chloro-N-[2-(α-hydroxy-o-fluorobenzyl)cyclooctyl]acetamide.—In the manner given in Example 1, cis-A-α-(o-fluorophenyl) - 2 - aminocyclooctanemethanol was treated with chloroacetyl chloride to give cis-A-2-chloro-N-[2 - (α - hydroxy-o-fluorobenzyl)cyclooctyl]acetamide.

(B) Cis-A-decahydro-5-(o - fluorophenyl)cycloocta[e][1,4]oxazepin-2-(3H)-one.—In the manner given in Example 2, cis-A-2-chloro-N-[2-(α-hydroxy-o-fluorobenzyl)-cyclooctyl]acetamide was treated with sodium hydride in tetrahydrofuran to give cis-A-decahydro-5-(o-fluorophenyl)cycloocta[e][1,4]oxazepin-2(3H)-one.

(C) Cis - A - dodecahydro-5-(o-fluorophenyl)cycloocta[e][1,4]oxazepine.—In the manner given in Example 4, cis-A-decahydro - 5 - (o-fluorophenyl)cycloocta[e][1,4]oxazepin-2(3H)-one was added to a solution of lithium aluminum hydride in tetrahydrofuran to give cis-A-dodecahydro - 5 - (o - fluorophenyl)cycloocta[e][1,4]oxazepine.

EXAMPLE 56

*Cis-A-dodecahydro-5-(2,4-diethoxyphenyl)cycloocta[e][1,4]oxazepine*

(A) Cis - A-2 - chloro-N-[2-(α-hydroxy-2,4-diethoxybenzyl)cyclooctyl]acetamide.—In a manner given in Example 1, cis-A-α-(2,4-diethoxyphenyl) - 2 - aminocyclooctanemethanol was treated with chloroacetyl chloride to give cis-A-2-chloro-N-[2-(α-hydroxy-2,4-diethoxybenzyl)cyclooctyl]acetamide.

(B) Cis-A-decahydro-5-(2,4-diethoxyphenyl)cycloocta-[e][1,4]oxazepin-2(3H)-one.—In the manner given in Example 2, cis-A-2-chloro-N-[2-(α-hydroxy-2,4-diethoxybenzyl)cyclooctyl]acetamide was treated with sodium hydride in tetrahydrofuran to give cis-A-decahydro-5-(2,4-diethoxyphenyl)cycloocta[e][1,4]oxazepin-2(3H)-one.

(C) Cis - A-dodecahydro-5-(2,4-diethoxyphenyl)cycloocta [e][1,4]oxazepine.—In the manner given in Example 4, cis-A-decahydro - 5 - (2,4-diethoxyphenyl)cycloocta[e][1,4]oxazepin-2(3H)-one was added to a solution of lithium aluminum hydride in tetrahydrofuran to give cis-A-dodecahydro - 5 - (2,4-diethoxyphenyl)cycloocta[e][1,4]oxazepine.

EXAMPLE 57

*Cis-A-decahydro-5-(2-methoxy-4-methylphenyl)-1-butyl-4,1-benzoxazepine*

(A) Cis-A-decahydro-5-(2 - methoxy-4-methylphenyl)-1-butyryl-4,1-benzoxazepine.—In the manner given in Example 8, cis-A-decahydro-5-(2-methoxy - 4 - methylphenyl)-4,1-benzoxazepine was heated with butyric anhydride to give cis-A-decahydro-5-(2 - methoxy-4-methylphenyl)-1-butyryl-4,1-benzoxazepine.

(B) Cis-A-decahydro-5-(2 - methoxy-4-methylphenyl)-1-butyl-4,1-benzoxazepine.—In the manner given in Example 9, cis-A-decahydro-5-(2-methoxy-4-methylphenyl)-1-butyryl-4,1-benzoxazepine was reduced with lithium aluminum hydride to give cis-A-decahydro-5-(2-methoxy-4-methylphenyl)-1-butyl-4,1-benzoxazepine.

EXAMPLE 58

*Cis-A-decahydro-5-(o-iodophenyl)-1-phenethyl-4,1-benzoxazepine*

(A) Cis-A-decahydro - 5 - (o-iodophenyl)-1-phenylacetyl-4,1-benzoxazepine.—In the manner given in Example 8, cis-A-decahydro-5-(o-iodophenyl)-4,1-benzoxazepine was heated with phenylacetic anhydride to give cis-A-decahydro - 5 - (o-iodophenyl)-1-phenylacetyl-4,1-benzoxazepine.

(B) Cis-A-decahydro - 5 - (o-iodophenyl)-1-phenethyl-4,1-benzoxazepine.—In the manner given in Example 9, cis-A-decahydro - 5 - (o-iodophenyl)-1-phenylacetyl-4,1-benzoxazepine was reduced with lithium aluminum hydride to give cis-A-decahydro-5-(o-iodophenyl)-1-phenethyl-4,1-benzoxazepine.

EXAMPLE 59

*Cis-A-octahydro-5-(3,4,5-trimethoxyphenyl)-1-hexadecyl-1H-cyclopenta[e][1,4]oxazepine*

(A) Cis-A-octahydro - 5 - (3,4,5-trimethoxyphenyl)-1-hexadecanoyl-1H-cyclopenta[e][1,4]oxazepine. — In the manner given in Example 18, cis-A-octahydro-5-(3,4,5-trimethoxyphenyl) - 1H - cyclopenta[e][1,4]oxazepine was heated with hexadecanoyl chloride in the presence of triethylamine to give cis-A-decahydro-5-(3,4,5-trimethoxyphenyl) - 1 - hexadecanoyl - 1H - cyclopenta[e][1,4]oxazepine.

(B) Cis-A-octahydro-5-(3,4,5 - trimethoxyphenyl)-1-hexadecyl-1H-cyclopenta[e][1,4]oxazepine.—In the manner given in Example 19, cis-A-octahydro-5-(3,4,5-trimethoxyphenyl) - 1 - hexadecanoyl - 1H - cyclopenta[e][1,4]oxazepine was reduced with lithium aluminum hydride to give cis-A-octahydro-5-(3,4,5-trimethoxyphenyl)-1-hexadecyl-1H-cyclopenta[e][1,4]oxazepine.

EXAMPLE 60

*4'-fluoro-4-cis-A-[decahydro-5-(3,4,5-trimethoxyphenyl)-1H-cyclohepta[e][1,4]oxazepin-1-yl]butyrophenone*

In the manner given in Example 20, cis-A-decahydro-5-(3,4,5-trimethoxyphenyl) - 1H - cyclohepta[e[[1,4]oxazepine was heated with 4-chloro-4'-fluorobutyrophenone, sodium carbonate and crystals of sodium iodide in 4-methyl-2-pentanone to give 4'-fluoro-4-cis-A-[decahydro-5-(3,4,5-trimethoxyphenyl) - 1H - cyclohepta[e][1,4]oxazepin-1-yl]butyrophenone.

EXAMPLE 61

*Cis-A-dodecahydro-5-(2,3,4-trimethoxyphenyl)-1-[2-(dimethylamino)ethyl]cycloocta[e][1,4]oxazepine*

(A) Cis-A-decahydro-5 - (2,3,4 - trimethoxyphenyl)-1-[2 - (dimethylamino)ethyl]cycloocta[e][1,4]oxazepin-2(3H)-one.—In the manner given in Example 12, cis-A-decahydro - 5-(2,3,4 - trimethoxyphenyl)cycloocta[e][1,4]oxazepin-2(3H)-one was treated with 2-(dimethylamino)ethyl chloride in the presence of sodium hydride in dimethylformamide solution to give cis-A-decahydro-5-(2,3,4 - trimethoxyphenyl) - 1,[2 - (dimethylamino)ethyl]cycloocta[e][1,4]oxazepin-2(3H)-one.

(B) Cis-A-dodecahydro - 5 - (2,3,4-trimethoxyphenyl) - 1 - [2 - (dimethylamino)ethyl]cycloocta[e][1,4]oxazepine.—In the manner given in Example 13, cis-A-decahydro-5-(2,3,4 - trimethoxyphenyl) - 1-[2-dimethylamino)ethyl]cycloocta[e][1,4]oxazepin-2(3H)-one was reduced with lithium aluminum hydride to give cis-A-dodecahydro-5 - (2,3,4 - trimethoxyphenyl) - 1-[2-(dimethylamino)ethyl]cycloocta[e][1,4]oxazepine.

EXAMPLE 62

*Cis-A-dodecahydro-5-(2,3,4-trimethoxyphenyl)-1-(2-piperidinoethyl)cycloocta[e][1,4]oxazepine*

(A) Cis-A-decahydro - 5 - (2,3,4 - trimethoxyphenyl)-1-(2 - piperidinoethyl)cycloocta[e][1,4]oxazepin-2(3H)-one.—In the manner given in Example 12, cis-A-decahydro - 5 - (2,3,4 - trimethoxyphenyl)cycloocta[e][1,4]oxazepin-2(3H)-one was treated with 2-piperidinoethyl chloride in the presence of sodium hydride in dimethylformamide solution to give cis-A-decahydro-5-(2,3,4-trimethoxyphenyl) - 1 - (2 - piperidinoethyl)cycloocta[e][1,4]oxazepin-2(3H)-one.

(B) Cis-A-dodecahydro - 5 - (2,3,4 - trimethoxyphenyl) - 1-(2 - piperidinoethyl)cycloocta[e][1,4]oxazepine—In the manner given in Example 13, cis-A-decahydro-5-(2,3,4 - trimethoxyphenyl) - 1 - (2-piperidinoethyl)cycloocta[e][1,4]oxazepin-2(3H)-one was reduced with lithium aluminum hydride to give cis-A-dodecahydro-5-(2,3,4-trimethoxyphenyl) - 1 - (2 - piperidinoethyl)cycloocta[e][1,4]oxazepine.

EXAMPLE 63

*Cis-A-decahydro-5-(p-methoxyphenyl)-1-sulfanilyl-4,1-benzoxazepine*

(A) Cis-A-decahydro-5 - (p-methoxyphenyl) - 1 - (p-nitrobenzenesulfonyl) - 4,1-benzoxazepine.—To 2.61 g. (10 mmoles) of cis-A-decahydro-5-(p-methoxyphenyl)-4,1-benzoxazepine in 3 ml. of dry pyridine at 0° C. was added, dropwise, 2.21 g. (10 mmoles) of p-nitrobenzenesulfonyl chloride in 8 ml. of dry pyridine. The reaction mixture was stirred for 18 hours at room temperature (24–26° C.). Ice water and chloroform (100 ml. of each) were added and the mixture was shaken. The organic layer was separated and washed three times with cold 10% hydrochloric acid, then with water and finally with saturated sodium chloride solution. The washed organic solution was dried with anhydrous sodium sulfate, filtered, and concentrated to a syrup. The latter was chromatographed on 320 g. of silica gel, using 30% ethyl acetate-70% cyclohexane (by volume) and collecting 200-ml. fractions. Fractions 4, 5 and 6 were combined and evaporated to dryness. The residue was crystallized from benzene-Skellysolve B hexanes, to obtain 0.5 g. of cis-A-decahydro-5-(p-methoxyphenyl) - 1 - (p-nitrobenzenesulfonyl)-4,1-benzoxazepine of melting point 151–152° C.

*Analysis.*—Calcd. for $C_{22}H_{26}N_2O_6S$ (percent): N, 6.27; S, 7.18. Found (percent): N. 6.25; S, 7.33.

(B) Cis-A-decahydro-5 - (p-methoxyphenyl) - 1 - sulfanilyl-4,1-benzoxazepine.—A mixture of 0.5 g. of cis-A-decahydro-5-(p-methoxyphenyl) - 1 - (p-nitrobenzenesulfonyl)-4,1-benzoxazepine, 1.0 ml. of Raney nickel catalyst, and 20 ml. of absolute methanol was shaken in the presence of hydrogen for 2⅓ hours. The mixture was filtered and the filtrate was concentrated to a syrup, which crystallized from a small amount of methanol. There was thus obtained 0.24 g. of cis-A-decahydro-5-(p-methoxyphenyl)-1-sulfanilyl - 4,1 - benzoxazepine of melting point 171.5–173° C.

*Analysis.*—Calcd. for $C_{22}H_{28}N_2O_4S$ (percent): C, 63.44; H, 6.78; N, 6.72. Found (percent): C, 63.19; H, 6.54; N, 6.61.

In the manner given in the preceding examples, other cis-A-compounds of Formulae III, IV, V and VI are produced such as:

Cis-A-octahydro-5-(p-isopropylphenyl)-1H-cyclopenta[e][1,4]oxazepine;

Cis-A-hexahydro-5-(m-ethylphenyl)-1H-cyclopenta[e][1,4]oxazepin-2(3H)-one;

Cis-A-octahydro-5-(m-isobutylphenyl)-1-dodecyl-1H-cyclopenta[e][1,4]oxazepine;

Cis-A-octahydro-5-(2,4-dibromophenyl)-1-(2-piperidinoethyl)-1H-cyclopenta[e][1,4]oxazepine;

Cis-A-octahydro-5-(p-bromophenyl)-1-propyl-6,6-dimethyl-1H-cyclopenta[e][1,4]oxazepine;

Cis-A-octahydro-5-(o-ethoxyphenyl)-1-[2-(diethyl-
 amino)ethyl]-1H-cyclopenta[e][1,4]oxazepine;
Cis-A-octahydro-5-(p-chlorophenyl)-1-[2-(butylamino)
 ethyl]-1H-cyclopenta[e][1,4]oxazepine;
Cis-A-octahydro-5-(p-butoxyphenyl)-1-sulfanilyl-1H-
 cyclopenta[e][1,4]oxazepine;
Cis-A-decahydro-5-(m-trifluoromethylphenyl)-1-octyl-
 4,1-benzoxyazepine;
Cis-A-octahydro-5-(3,5-diethylphenyl)-1-decyl-4,1-
 benzoxazepin-2(3H)-one;
Cis-A-decahydro-5-(2,4-dichlorophenyl)-1-(3-pyr-
 rolidinohexyl)-4,1-benzoxazepine;
Cis-A-decahydro-5-(2-chloro-3,4-diethylphenyl)-1-iso-
 butyl-4,1-benzoxazepine;
Cis-A-decahydro-5-(2,4-diiodo-5-ethylphenyl)-1-[3-(di-
 butylamino)propyl]-4,1-benzoxazepine;
Cis-A-decahydro-5-(p-fluorophenyl)-1-(2-morpholino-
 ethyl)-4,1-benzoxazepine;
Cis-A-decahydro-5-(p-isopropylphenyl)-1-[3-(4-methyl-
 piperazino)butyl]-4,1-benzoxazepine;
Cis-A-octahydro-5-(o-methylphenyl)-1H-cyclohepta[e]
 [1,4]oxazepin-2(3H)-one;
Cis-A-octahydro-5-(2,4-dichlorophenyl)-1-benzoyl-1H-
 cyclohepta[e][1,4]oxazepin-2(3H)-one;
Cis-A-decahydro-5-(o-iodophenyl)-1-dodecyl-1H-cyclo-
 hepta[e][1,4]oxazepine;
Cis-A-decahydro-5-(2,4-difluorophenyl)-1-butyl-1H-
 cyclohepta[e][1,4]oxazepine;
Cis-A-decahydro-5-(2-ethyl-3-bromophenyl)-1-isopropyl-
 1H-cyclohepta[e][1,4]oxazepine;
Cis-A-decahydro-5-(m-isopropoxyphenyl)-1-[4-(di-
 propylamino)butyl]-1H-cyclohepta[e][1,4]
 oxazepine;
Cis-A-decahydro-5-(3,4,5-triethoxyphenyl)-1-(3-piperi-
 dinopropyl)-1H-cyclohepta[e][1,4]oxazepine;
Cis-A-decahydro-5-(3,4,5-triethoxyphenyl)-1-propyl-10,
 10-dimethyl-1H-cyclohepta[e][1,4]oxazepine;
Cis-A-decahydro-5-phenyl-1-(2-hexamethyleneimino-
 ethyl)-1H-cyclohepta[e][1,4]oxazepine;
Cis-A-decahydro-5-(p-ethoxyphenyl)-1-isobutyl-6,6-di-
 methylcycloocta[e][1,4]oxazepin-2(3H)-one;
Cis-A-decahydro-5-(p-trifluoromethylphenyl)-1-hexanoyl-
 cycloocta[e][1,4]oxazepin-2(3H)-one;
Cis-A-decahydro-5-(2,4-dichlorophenyl)-1-[2-(diethyl-
 amino)ethyl]cycloocta[e][1,4]oxazepin-2(3H)-one;
Cis-A-decahydro-5-(2-iodo-4-butylphenyl)-1-phenyl-
 acetylcycloocta[e][1,4]oxazepin-2(3H)-one;
Cis-A-dodecahydro-5-(3-ethyl-5-ethoxyphenyl)-1-benzyl-
 cycloocta[e][1,4]oxazepine;
Cis-A-dodecahydro-5-(p-hexylphenyl)-1-sulfanilyl
 cycloocta[e][1,4]oxazepine;
4'-fluoro-cis-A-[dodecahydro-5-(p-propoxyphenyl)cyclo-
 octa[e][1,4]oxazepin-1-yl]-butyrophenone;
Cis-A-dodecahydro-5-(m-iodophenyl)-1-(3-pyrrolidino-
 propyl)cycloocta[e][1,4]oxazepine;
Cis-A-dodecahydro-5-(2-bromo-4-methylphenyl)-1-[2-
 (2-isopropylpiperidino)ethyl]cycloocta[e][1,4]
 oxazepine;
Cis-A-dodecahydro-5-(3,5-diiodophenyl)-1-[3-(2,2-di-
 methylpyrrolidino)butyl]cycloocta[e][1,4]oxazepine,
and the like.

EXAMPLE 64

*Cis-B-decahydro-5-(p-methoxyphenyl)-4,1-benz-
oxazepine and oxalate thereof*

(A) Cis-A-2-[(2-hydroxyethyl)amino]-α-(p-methoxy-
phenyl)cyclohexanemethanol.—A mixture of 69.5 g. (0.3
mole) of 2-(p-methoxybenzoyl)cyclohexanone, 2-amino-
ethanol (19.2 g., 0.31 mole) and 450 ml. of benzene was
refluxed for 2.5 hours in a nitrogen atmosphere. After
6 ml. of water was collected in an azeotropic separator,
the solution was evaporated to give a yellow solid having
the following ultraviolet spectrum.

U.V.: (absolute ethanol): sh. 217 ($a$=36.21); λ max.
258 (20.78); 347 (70.01).

A solution of the above solid in 600 ml. of ethanol was
hydrogenated in the presence of 5 g. of platinum oxide
catalyst at 49 p.s.i. initial hydrogen pressure. After the
absorbtion of 2 molar equivalents of hydrogen, the mix-
ture was filtered, evaporated and the thus-resulting solid
stirred for 2 hours with 600 ml. of 10% aqueous acetic
acid and 900 ml. of ether. The ether layer was extracted
with 100 ml. of water, the ether discarded, and the com-
bined aqueous layer was again extracted with ether and
the ether discarded. The aqueous solution was then cooled
in ice and basified with 250 ml. of 20% aqueous sodium
hydroxide solution. The resulting suspension was ex-
tracted twice with methylene chloride. The organic solu-
tion was washed with saturated salt solution, dried over
anhydrous magnesium sulfate, and evaporated, to give
85.9 g. of solid. This solid was recrystallized from 300
ml. of benzene and 350 ml. of petroleum ether (boiling
range 30–60 C.) to give 17.1 g. (84% yield) of cis-A-2-
[(2 - hydroxyethyl)amino] - α - (p-methoxyphenyl)cyclo-
hexanemethanol of melting point 110–112° C.

(B) Cis-B-decahydro-5-(p-methoxyphenyl)-4,1 - benz-
oxazepine oxalate.—To 54.7 g. (0.196 mole) of cis-A-2-
[(2 - hydroxyethyl)amino] - α-(p-methoxyphenyl)cyclo-
hexanemethanol was added under cooling 200 ml. of
trifluoroacetic acid. The mixture was then stirred at room
temperature for 40 min. The resulting greenish solution
was cooled in ice; 500 ml. of water and 560 ml. of 20%
aqueous sodium hydroxide solution were added and the
mixture was stirred at room temperature for 30 min. The
mixture was then extracted with 5 portions of 200 ml.
each of methylene chloride. The organic extracts were
combined, washed with 200 ml. of saturated salt solution
and dried over anhydrous magesium sulfate and evap-
orated to give 52 g. of oil. A solution of this oil in 200 ml.
of isopropyl alcohol was added to a solution of 18 g. (0.2
mole) of oxalic acid in 400 ml. of isopropyl alcohol. The
resulting suspension was filtered and the solid triturated
with 500 ml. of hot methanol to give 27 g. of cis-B-deca-
hydro-5-(p-methoxyphenyl)-4,1-benzoxazepine oxalate of
melting point 235–237° C., and upon recrystallization
from methanol of melting point 239–241° C.

U.V.: λ max. 225 (24,900); 273 (3,150); 280 (2,670).

*Analysis.*—Calcd. for $(C_{16}H_{23}NO_2)_2 \cdot (COOH)_2$ (per-
cent): C, 66.64; H, 7.90; N, 4.57. Found (percent): C,
66.50; H, 7.87; N, 4.74.

(C) Cis-B-decahydro-5-(p-methoxyphenyl)-4,1 - benz-
oxazepine.—The 27 g. of oxalate was added to 300 ml. of
10% aqueous sodium hydroxide solution and the mixture
extracted with ether. The ether solution was washed with
saturated salt solution, dried over anhydrous magnesium
sulfate and evaporated to give 20 g. of an oil. Crystalliza-
tion of the oil from petroleum ether at −70° C. afforded
9.5 g. of crystalline cis-B-decahydro-5-(p-methoxyphen-
yl)-4,1-benzoxazepine melting at 59–60° C. A second
crop of 5.6 g. was also obtained. A carefully prepared
analytical sample recrystallized from petroleum ether
melted at 61–62° C.

U.V.: λ max. 225 (12,200); 274 (1,500); 281 (1,300).

*Analysis.*—Calcd. for $C_{16}H_{23}NO_2$ (percent): C, 73.53;
H, 8.87; N, 5.36. Found (percent): C, 73.09; H, 8.70;
N, 5.31.

EXAMPLE 65

*Cis-B-decahydro-5-(p-methoxyphenyl)-1-methyl-
4,1-benzoxazepine*

A mixture of 5 g. (0.0192 mole) of cis-B-decahydro-5-
(p-methoxyphenyl)-4,1-benzoxazepine and 250 ml. of
ethyl formate was refluxed overnight in a nitrogen atmos-
phere. The reaction mixture was evaporated to give cis-
B - octahydro - 5-(p-methoxyphenyl)-4,1-benzoxazepine-1
(5H)-carboxaldehyde as a colorless oil; infrared showed
a peak at 1725 cm.$^{-1}$.

A solution of the colorless oil in 250 ml. of ether was added to a solution of 5 g. of lithium aluminum hydride in 500 ml. of ether. The mixture was refluxed overnight, then decomposed successively with 5 ml. of water, 5 ml. of 15% aqueous sodium hydroxide and 15 ml. of water. The thus-obtained suspension was filtered, filter cake washed with ether, the filtrate and washings combined, dried over anhydrous magnesium sulfate and evaporated to give 5 g. of an oil. This oil was dissolved in 50 ml. of 20% acetone-80% benzene (by volume) and chromatographed on 500 g. of silica gel with the same solvent system. Elution with four 250-ml. portions gave no material. Elution with an additional 3 portions of 250 ml. gave 0.415 g. of an oil which was crystallized twice from petroleum ether at −70° C. to give cis-B-decahydro-5-(p-methoxyphenyl)-1-methyl-4,1-benzoxazepine of melting point 44.5–46° C.

U.V.: λ max. 224.5 (12,300); 274 (1,490); 281 (1,240).

Analysis.—Calcd. for $C_{17}H_{25}NO_2$ (percent): C, 74.14; H, 9.15; N, 5.09. Found (percent): C, 74.31; H, 9.34; N, 5.00.

EXAMPLE 66

Cis-B-decahydro-5-(p-methoxyphenyl)-1-ethyl-4,1-benzoxazepine and its hydrochloride (A) Cis-B-decahydro-5-(p-methoxyphenyl)-1-acetyl-4,1-benzoxazepine.—A mixture of 5 g. (0.0192 mole) of cis-A-decahydro-5-(p-methoxyphenyl)-4,1-benzoxazepine and 20 ml. of acetic anhydride was heated on the steam bath for 75 min. The solution was evaporated, 40 ml. of water was added, the mixture was heated for 30 min. on the steam bath and allowed to stand overnight. It was then extracted with 3 portions of 50 ml. each of ether, the ether extracts were combined, washed successively with 50 ml. of saturated sodium bicarbonate solution and saturated salt solution, then dried over anhydrous magnesium sulfate and evaporated to give 4.9 g. of solid. This solid was recrystallized from ether several times to give pure cis-B-decahydro-5-(p-methoxyphenyl)-1-acetyl - 4,1-benzoxazepine of melting point 125–126° C. The yield was 4.4 g. (78%).

U.V.: λ max. 224 (14,350); 274 (1,500); 281 (1,300).

Analysis.—Calcd. for $C_{18}H_{25}NO_3$ (percent): C, 71.25; H, 8.31; N, 4.62. Found (percent): C, 71.60; H, 8.40; N, 4.49.

(B) Cis - B - decahydro - 5 - (p - methoxyphenyl)-1-ethyl-4,1-benzoxazepine and its hydrochloride.—A solution of 3 g. (0.01 mole) of cis-B-decahydro-5-(p-methoxyphenyl)-1-acetyl - 4,1 - benzoxazepine in 20 ml. of tetrahydrofuran was added during 2 min. to a solution of 3 g. of lithium aluminum hydride in 130 ml. of tetrahydrofuran. The mixture was then refluxed for 6½ hours, cooled and decomposed by successive addition of 3 ml. of water, 3 ml. of 15% aqueous sodium hydroxide solution and 9 ml. of water. The thus-obtained suspension was filtered, the filter cake washed with tetrahydrofuran, the filtrates and washings combined, dried over anhydrous magnesium sulfate and evaporated to give 2.8 g. of a colorless oil. This oil was chromatographed over 280 g. of silica gel, using a mixture of 10% acetone-90% benzene (volume) containing 1% of triethylamine. Fractions of 150 ml. each were collected. Fractions 10–13 gave 1.996 g. of an oil. This was cis-B-decahydro-5-(p-methoxyphenyl)-1-ethyl-4,1-benzoxazepine.

U.V.: λ max. 225 (a=42.79); 274 (a=5.12); 281 (a=4.39).

The oil was dissloved in ether and treated with ethereal hydrogen chloride. The resulting solid was washed with ether and then crystallized from acetone-ether to give 1.3 g. of cis - B - decahydro - 5 - (p-methoxyphenyl)-1-ethyl-4,1-benzoxazepine hydrochloride of melting point 191–192° C.

U.V.: λ max. 225.5 (12,650); 273 (1,450); 281 (1,250).

Analysis.—Calcd. for $C_{18}H_{27}NO_2 \cdot HCl$ (percent): C, 66.34; H, 8.66; Cl, 10.88; N, 4.30. Found (percent): C, 65.93; H, 8.89; Cl, 11.01; N, 4.19.

ALTERNATIVE PROCEDURE FOR COMPOUNDS OF FORMULA XXIII IN THE CIS-B SERIES

EXAMPLE 67

Cis-B-α-(p-methoxyphenyl)-2-aminocyclohexanemethanol

To 47 g. (0.02 mole) of cis-A-α-(p-methoxyphenyl)-2-aminocyclohexanemethanol cooled in ice, was added all at once 400 ml. of trifluoroacetic acid. The mixture was stirred for 20 min. at room temperature, then cooled in ice; 400 g. of ice and 1 l. of water were added, followed by 1 l. of 20% aqueous sodium hydroxide solution while keeping the temperature below 10° C. The resulting suspension was filtered, and the solid washed well with water. The solid was then dissolved in 2 l. of ether, the ether solution dried over anhydrous magnesium sulfate, evaporated to about 200 ml. and seeded, to give 12.5 g. of cis-B-α-(p - methoxyphenyl) - 2 - aminocyclohexanemethanol of melting point 84–86 C. A second and third crop gave an additional amount of 23.1 g.

EXAMPLE 68

Cis-B-octahydro-5-(p-methoxyphenyl)-4,1-benzoxazepin-2(3H)-one (A) Cis - B - 2 - chloro - N-[2-(α-hydroxy-p-methoxybenzyl)cyclohexyl]acetamide.—A solution of 5.65 g. (0.05 mole) of chloroacetyl chloride in 100 ml. of ether was added during 30 min. to a solution of cis-B-α-(p-methoxyphenyl) - 2 - aminocyclohexanemethanol, 12.5 g., 0.0532 mole) and 10.7 g. (0.106 mole) of triethylamine in 1 l. of ether, keeping the temperature at 3–5° C. The mixture was then stirred at the same temperature for 1 hour. 100 ml. of water was added, the ether layer was separated and washed with three 50-ml. portions of 10% hydrochloric acid, then with water and saturated salt solution, dried over anhydrous magnesium sulfate and evaporated to give a residue. The latter was crystallized from ether, giving a total of 12.1 g. of cis-B-2-chloro-N-[2-(α-hydroxy-p-methoxybenzyl)cyclohexyl]acetamide of melting point 127–128° C.

U.V.: λ max. 224 (12,650); 274 (1,500); 281 (1,300).

Analysis.—Calcd. for $C_{16}H_{22}ClNO_3$ (percent): C, 61.63; H, 7.11; Cl, 11.37; N, 4.49. Found (percent): C, 61.57; H, 7.07; Cl, 11.72; N, 4.27.

(B) Cis - B - octahydro - 5 - (p-methoxyphenyl)-4,1-benzoxazepin-2(3H)-one.—A solution of 11.6 g. (0.0373 mole) of cis-B-2-chloro-N-[2-(α-hydroxy - p - methoxybenzyl)cyclohexyl]acetamide in 50 ml. of tetrahydrofuran was added during 10 min. to a suspension of sodium hydride (containing 3.4 g. of sodium hydride in a 53% dispersion in mineral oil) and the mixture was stirred overnight at room temperature (about 24 to 26° C). The mixture was then evaporated, 100 ml. of water was added to the residue and the product was extracted twice with methylene chloride. The organic extract was washed with water, dried over anhydrous magnesium sulfate and evaporated to give 10.5 g. of a residue. This residue was crystallized from ethanol and subsequently from chloroform-ethanol to give ethanol-solvated cis-B-octahydro-5-(p-methoxyphnyl)-4,1-benzoxazepin - 2(3H)-one of melting point 252–254° C.

U.V.: λ max. 226 (11,350); 274 (1,300); 281 (1,100).

Analysis.—Calcd. for $C_{16}H_{21}NO_3 \cdot 0.5C_2H_5OH$ (percent): C, 68.43; H, 8.11; N, 4.70. Found (percent): C, 68.43; H, 7.81; N, 5.08.

Heating t he above solvate at 120° C. for a period of 24 hours at a pressure of 10 mm. Hg gave unsolvated cis - B - octahydro - 5 - (p-methoxyphenyl) - 4,1 - benzoxazepin-2(3H)-one.

The latter compound was reduced with lithium aluminum hydride to obtain cis-B-decahydro-5-(p-methoxyphenyl)-4,1-benzoxazepine, identical with the product of Example 64C.

EXAMPLE 69

*Trans-D-octahydro-5-(p-methoxyphenyl)-4,1-benzoxazepin-2(3H)-one*

(A) Cis-2-aminocyclohexyl p-methoxyphenyl ketone.—To a solution of 12.0 g. (0.051 mole) of cis-A-α-(p-methoxyphenyl)-2-aminocyclohexanemethanol in 200 ml. of acetone was added 19 ml. (0.076 eq.) of 8 N chromium trioxide solution in aqueous sulfuric acid. The addition was done with stirring and over a 20 min. period of time. This was followed by 5 min. stirring at 25° C. and then addition of 20 ml. of isopropyl alcohol and stirring. The stirring was continued for 30 min., the reaction mixture was then filtered (a precipitate remained on the filter) and the filtrate was concentrated to give a residue. The residue and the precipitate collected on the filter were added to a mixture of 450 ml. of water and 50 ml. of 50% aqueous sodium hydroxide solution. The aqueous phase was extracted several times with methylene chloride and the combined organic layers were dried over anhydrous sodium sulfate. Filtration and evaporation of the solvent gave approximately 12 g. of cis-2-aminocyclohexyl p-methoxyphenyl ketone.

(B) Trans - 2 - aminocyclohexyl p-methoxyphenyl ketone and its hydrochloride.—To a solution of 7.8 g. (0.034 mole) of crude cis-2-aminocyclohexyl p-methoxyphenyl ketone in 250 ml. of 2% triethylamine-3% methanol-95% benzene was added 50 g. of silica gel (trademark: Brinkmann). The reaction mixture was stirred for 16 hours at 25° C., then filtered, the silica gel was washed with methanol-triethylamine, the filtrate and washings combined and distilled in vacuo to give a residue of 7.8 g. of crude trans-2-aminocyclohexyl p-methoxyphenyl ketone.

This ketone was treated with hydrogen chloride in ether solution to give the corresponding hydrochloride, which after recrystallization from methanol has a melting point of 198–198.5° C.

*Analysis.*—Calcd. for $C_{14}H_{29}NO_2 \cdot HCl$ (percent): C, 62.33; H, 7.47; N, 5.19; Cl, 13.14. Found (percent): C, 62.34; H, 7.55; N, 5.17; Cl, 13.07.

(C) Trans - D - α-(p-methoxyphenyl)-2-aminocyclohexanemethanol by catalytic hydrogenation.—To a suspension of platinum in 150 ml. of ethanol (the platinum was prepared by previously reducing 500 ml. of platinum oxide with hydrogen) was added 7 g. (0.03 mole) of crude trans-2-aminocyclohexyl p-methoxyphenyl ketone. The mixture was reduced on a Parr hydrogenator over a period of 30 hours during which 80% of the calculated quantity of hydrogen was consumed. The reaction mixture was filtered and the filtrate was concentrated to give a thick yellow oil which was treated with 100 ml. of 10% aqueous acetic acid and extracted with methylene chloride. The colorless aqueous phase was made basic with 20% aqueous sodium hydroxide solution and the white crystalline solid which appeared was collected by filtration and dried. This material was then recrystallized three times from benzene to give a white powder of trans-D-α-(p-methoxyphenyl)-2-aminocyclohexanemethanol of melting point 108–112° C.

*Analysis.*—Calcd. for $C_{14}H_{21}NO_2$ (percent): C, 71.45; H, 9.00; N, 5.95. Found (percent): C, 71.42; H, 9.17; N, 5.86.

(D) Trans - D - α-(p-methoxyphenyl)-2-aminocyclohexanemethanol by lithium aluminum hydride reduction.—A solution of 29.3 g. of crude trans-2-aminocyclohexyl p-methoxyphenyl ketone in 300 ml. of ether was added to 30 g. (3.16 eq.) of lithium aluminum hydride in 2500 ml. of ether during a period of 30 min. The mixture was stirred for a period of 20 hours at 25° C., decomposed by successive addition of 30 ml. of water, 30 ml. of 15% aqueous sodium hydroxide solution and 90 ml. of water, and then filtered. The filter cake was washed with ether and the filtrates and washings combined and evaporated to dryness to give a residue which was treated with 200 ml. of 10% aqueous acetic acid and then extracted with methylene chloride. The organic layer was washed with aqueous sodium hydroxide solution, 10% acetic acid and finally with water. The two acetic acid layers were combined, basified with 20% aqueous sodium hydroxide solution, and the solution was cooled to provide 21 g. of a crude solid which was collected on a filter. This crude product was recrystallized from benzene and shown to be trans - D - α - (p-methoxyphenyl)-2-aminocyclohexanemethanol of melting point 108–112° C., identical to the product obtained under C.

(E) Trans - C - α-(p-methoxyphenyl)-2-aminocyclohexanemethanol.—To 5.2 g. (0.02 mole) of trans-D-α-(p-methoxyphenyl)-2-aminocyclohexanemethanol was added under cooling in an ice bath 40 ml. of trifluoroacetic acid, dropwise, and with stirring. After the addition was completed and the mixture stirred for another 20 min. at 25° C., 50 ml. of ice water was added and then, with cooling, 150 ml. of approximately 20% aqueous sodium hydroxide solution. The reaction mixture was stirred for another 20 min. at 25° C., then extracted with methylene chloride and the organic layer was dried over anhydrous sodium sulfate. Removal of the solvent resulted in recovery of approximately 5 g. of a thick oil which solidified upon standing. The material was recrystallized three times from Skellysolve B hexanes with a recovery of 3.3 g. of trans-C-α-(p-methoxyphenyl)-2-aminocyclohexanemethanol of melting point 79–81° C.

*Analysis.*—Calcd. for $C_{14}H_{21}NO_2$ (percent): C, 71.45; H, 9.00; N, 5.45. Found (percent): 70.99; H, 9.00; N, 5.63.

(F) Trans - C - 2-chloro-N-[2-(α-hydroxy-p-methoxybenzyl)cyclohexyl]acetamide.—To a solution of 2.5 g. (0.011 mole) of trans-C-α-(p-methoxyphenyl)-2-aminocyclohexanemethanol in 75 ml. of methylene chloride, cooled to 0° C., was added 2.15 g. (0.021 mole) of triethylamine followed by dropwise addition of 1.2 g. (0.011 mole) of chloroacetyl chloride in 25 ml. of methylene chloride. The temperature of the reaction mixture was maintained below 5° C. during the addition and at 0° C. for an hour after the addition was completed. The reaction mixture was successively washed with 25 ml. of water, 4 portions of 25 ml. each of 10% hydrochloric acid, 25 ml. of water and 25 ml. of brine. The organic layer was then dried over anhydrous magnesium sulfate, and evaporated to dryness to give 2.9 g. (90% yield) of trans - C - 2-chloro-N-[2-(α-hydroxy-p-methoxybenzyl) cyclohexyl]acetamide as an oil.

(G) Trans - C - octahydro-5-(p-methoxyphenyl)-4,1-benzoxazepin-2(3H)-one.—To a flask equipped with a stirrer, nitrogen inlet tube and drying tube was added 783 mg. (0.019 mole) of sodium hydride (53% dispersion in mineral oil) in 75 ml. of dry tetrahydrofuran, followed by the dropwise addition of 2.9 g. (0.009 mole) of trans-C-2 - chloro - N - [2-(α-hydroxy-p-methoxybenzyl)cyclohexyl]acetamide in 25 ml. of tetrahydrofuran. The reaction mixture was stirred at 25° C. under an atmosphere of nitrogen pressure for a period of 22 hours. The mixture was then evaporated, 60 ml. of water was added and the brown precipitate which formed was collected and dried. This material was recrystallized twice from dimethyl sulfoxide to give in about 61% yield trans-C - octahydro - 5 - (p-methoxyphenyl)-4,1-benzoxazepin-2(3H)-one of melting point 262–263° C.

*Analysis.*—Calcd. for $C_{16}H_{21}NO_3$ (percent): C, 69.79; H, 7.69; N, 5.09. Found (percent): C, 69.45; H, 7.84; N, 4.71.

EXAMPLE 70

*Trans-C-decahydro-5-(p-methoxyphenyl)-4,1-benzoxazepine*

To a suspension of 900 mg. of lithium aluminum hydride in 500 ml. of tetrahydrofuran was added 827 mg. (0.003 mole) of trans-C-octahydro-5-(p-methoxyphenyl)-4,1-benzoxazepin-2(3H)-one in portions, over a 2 min. period. The reaction mixture was stirred and heated under reflux for 23 hours, cooled and decomposed by successive addition of 1 ml. of water, 1 ml. of 15% aqueous sodium hydroxide solution, and 3 ml. of water The mixture was stirred for 30 min., filtered, the filter cake washed with tetrahydrofuran, the filtrates and washings combined, the mixture evaporated and the resulting residue recrystallized from Skellysolve B hexanes to give trans-C-decahydro-5-(p-methoxyphenyl)-4,1-benzoxazepine of melting point 102–106° C.

*Analysis.*—Calcd. for $C_{16}H_{23}NO_2$ (percent): C, 73.53; H, 8.87; N, 5.36. Found (percent): C, 73.32; H, 8.93; N, 5.39.

EXAMPLE 71

*Trans-C-decahydro-5-(p-methoxyphenyl)-1-ethyl-4,1-benzoxazepine*

A mixture of 1.8 g. (0.007 mole) of trans-C-decahydro-5-(p-methoxyphenyl)-4,1-benzoxazepine and 20 ml. of acetic anhydride was heated on a steam bath for 1 hour. The solvent was then removed in vacuo, 20 ml. of water was added to the resulting residue, and the mixture was heated on a steam bath for 30 min., cooled and extracted with ether. The ether extracts were combined, washed with 3 portions of 25 ml. each of aqueous sodium bicarbonate, then brine, dried over anhydrous magnesium sulfate, and evaporated in vacuo to give 1.9 g. of solid material. This solid was recrystallized from ether to give 400 mg. of trans-C-decahydro-5-(p-methoxyphenyl)-1-acetyl-4,1-benzoxazepine of melting point 146–147° C.

In the manner given in Example 9, trans-C-decahydro-5-(p-methoxyphenyl)-1-acetyl-4,1-benzoxazepine in tetrahydrofuran solution was added to a solution of lithium aluminum hydride in tetrahydrofuran and the mixture refluxed for 4 hours. It was then cooled, decomposed with water and sodium hydroxide solution to give trans-C-decahydro-5-(p-methoxyphenyl)-1-ethyl-4,1-benzoxazepine.

EXAMPLE 72

*Trans-D-octahydro-5-(p-methoxyphenyl)-4,1-benzoxazepin-2(3H)-one*

To a suspension of 970 mg. (0.023 mole) of sodium hydride (53% suspension in mineral oil) in 75 ml. of tetrahydrofuran in a flask equipped with a reflux condenser, stirrer and nitrogen inlet, was added 5.0 g. (0.021 mole) of trans-D-α-(p-methoxyphenyl)-2-aminocyclohexanemethanol. After the evolution of hydrogen ceased, 3.0 g. of ethyl chloroacetate in 25 ml. of tetrahydrofuran was added over a period of about 40 min. The reaction was allowed to proceed for 3 hours at 25° C. in a nitrogen atmosphere. The reaction mixture was then distilled to remove the solvent and to the residue was added 100 ml. of water. The water suspension was extracted with ether, and the ether extract was dried over anhydrous magnesium sulfate and evaporated to give 5.7 g. of residue which was chromatographed over 500 g. of silica gel using a solvent system of 3% triethylamine-7% methanol-90% benzene, by volume. Fractions of 150 ml. were taken. Fractions 5 and 6 were combined and evaporated to give 4.3 g. of material which was taken up in benzene. Addition of Skellysolve B hexanes gave a white solid. This material was recrystallized from benzene to give trans-D-octahydro-5-(p-methoxyphenyl)-4,1-benzoxazepin-2(3H)-one of melting point 243–245° C.

*Analysis.*—Calcd. for $C_{16}H_{21}NO_3$ (percent): C, 69.79; H, 7.69. Found (percent): C, 69.25; H, 7.77.

EXAMPLE 73

*Trans-D-decahydro-5-(p-methoxyphenyl)-4,1-benzoxazepine*

In the manner given in Example 70, trans-D-octahydro-5-(p-methoxyphenyl)-4,1-benzoxazepin-2(3H)-one was treated with lithium aluminum hydride in tetrahydrofuran to give after the decomposition with water and sodium hydroxide, trans-D-decahydro-5-(p-methoxyphenyl)-4,1-benzoxazepine.

EXAMPLE 74

*Cis-A-octahydro-5-(3,4,5-trimethoxyphenyl)-1-decyl-1H-cyclopenta[e][1,4]-oxazepine*

In the manner given in Example 8, cis-A-octahydro-5-(3,4,5-trimethoxyphenyl)-1H-cyclopenta[e][1,4]-oxazepine was treated with decanoic anhydride to give cis-A-octahydro-5-(3,4,5-trimethoxyphenyl)-1-decanoyl-1-H-cyclopenta[e][1,4]-oxazepine.

In the manner given in Example 9, cis-A-octahydro-5-(3,4,5-trimethoxyphenyl)-1-decanoyl-1H-cyclopenta[e][1,4]-oxazepine was reduced with lithium aluminum hydride in tetrahydrofuran to give, after decomposition of the mixture with water and sodium hydroxide, cis-A-octahydro-5-(3,4,5-trimethoxyphenyl)-1-decyl-1H-cyclopenta[e][1,4]-oxazepine.

EXAMPLE 75

*Cis-A-octahydro-5-(m-trifluoromethylphenyl)-1-1-H-cyclopenta[e][1,4]-oxazepine*

In the manner given in Example 8, cis-A-octahydro-5-(m-trifluoromethylphenyl)-1H-cyclopenta[e][1,4]-oxazepine was treated with decanoic anhydride to give cis-A-octahydro-5-(m-trifluoromethylphenyl)-1 decanoyl-1H-cyclopenta[e][1,4]-oxazepine.

In the manner given in Example 9, cis-A-octahydro-5-(m-trifluoromethylphenyl)-1-decanoyl-1H-cyclopenta[e][1,4]-oxazepine was reduced with lithium aluminum hydride in tetrahydrofuran to give, after decomposition of the mixture with water and sodium hydroxide, cis-A-octahydro-5-(m-trifluoromethylphenyl)-1-decyl-1H-cyclopenta[e][1,4]-oxazepine.

EXAMPLE 76

*Cis-A-octahydro-5-(p-fluorophenyl)-1-benzyl-1H-cyclopenta[e][1,4]-oxazepine*

In the manner given in Example 8, cis-A-octahydro-5-(p-fluorophenyl)-1H-cyclopenta[e][1,4]-oxazepine was treated with benzoic anhydride to give cis-A-octahydro-5-(p-fluorophenyl)-1-benzoyl-1H-cyclopenta[e][1,4]-oxazepine.

In the manner given in Example 9, cis-A-octahydro-5-(p-fluorophenyl)-1-benzoyl-1H-cyclopenta[e][1,4]-oxazepine was reduced with lithium aluminum hydride in tetrahydrofuran to give, after decomposition of the mixture with water and sodium hydroxide, cis-A-octahydro-5-(p-fluorophenyl)-1-benzyl-1H-cyclopenta[e][2,4]-oxazepine.

EXAMPLE 77

*Cis-A-octahydro-5-(o-iodophenyl)-1-heptyl-1-H-cyclopenta[e]1,4]-oxazepine*

In the manner given in Example 8, cis-A-octahydro-5-(o-iodophenyl)-1H-cyclopenta[e][1,4]-oxaazepine was treated with heptanoic anhydride to give cis-A-octahydro-5-(o-iodophenyl)-1-heptanoyl-1H-cyclopenta[e][1,4] oxazepine.

In the manner given in Example 9, cis-A-octahydro-5-(o-iodophenyl)-1-heptanoyl-1H-cyclopenta[e][1,4]-oxazepine was reduced with lithium aluminum hydride in tetrahydrofuran to give, after decomposition of the mixture with water and sodium hydroxide, cis-A-octahydro- 5 - (o - iodophenyl) - heptyl - 1H-cyclopenta[e][1,4]-oxazepine.

EXAMPLE 78

Cis-A-octahydro-5-(3,5-diethylphenyl)-1-undecyl-1H-cyclopenta[e][1,4]-oxazepine

In the manner given in Example 8, cis-A-octahydro-5-(3,5 - diethylphenyl) - 1H - cyclopenta[e][1,4]-oxazepine was treated with undecanoic anhydride to give cis-A-octahydro - 5 - (3,5 - diethylphenyl)-1-undecanoyl-1-H-cyclopenta[e][1,4]-oxazepine.

In the manner given in Example 9, cis-A-octahydro-5-(3,5 - diethylphenyl) - 1 - undecanoyl-1H-cyclopenta[e][1,4]-oxazepine was reduced with lithium aluminum hydride in tetrahydrofuran to give, after decompostion of the mixture with water and sodium hydroxide, cis-A-octahydro - 5 - (3,5 - diethylphenyl)-1-undecyl-1H-cyclopenta[e][1,4]-oxazepine.

EXAMPLE 79

4' - fluoro-4-cis-A-[hexahydro-5-(p-methoxyphenyl)-1H-cyclopenta[e][1,4] - oxazepine - 1[5H] - yl]butyrophenone In the manner given in Example 20, cis-A-octahydro-5-(p - methoxyphenyl) - 1H - cyclopenta[e][1,4]oxazepine was treated with 4-chloro-4'-fluorobutyrophenone in the presence of sodium carbonate and a few crystals of potassium iodide in 4-methyl-2-pentanone to give 4'-fluoro-4-cis-A-[hexahydro-5-(p-methoxyphenyl) - 1H - cyclopenta[e][1,4]-oxazepine-1[5H]-yl]butyrophenone.

EXAMPLE 80

Cis-A-decahydro-5-(3,4,5-trimethoxyphenyl)-1-phenethyl-1H-cyclohepta[e][1,4]oxazepine In the manner given in Example 8, cis-A-decahydro-5-(3,4,5 - trimethoxyphenyl) - 1H - cyclohepta[e][1,4]oxazepine was treated with phenylacetic anhydride to give cis-A-decahydro - 5 - (3,4,5-trimethoxyphenyl)-1-phenylacetyl-1H-cyclohepta[e][1,4]oxazepine.

In the manner given in Example 9, cis-A-decahydro-5-(3,4,5 - trimethoxyphenyl)-1-phenylacetyl-1H-cyclohepta[e][1,4]oxazepine was reduced with lithium aluminum hydride in tetrahydrofuran to give, after decomposition of the mixture with water and sodium hydroxide, cis-A-decahydro - 5 - (3,4,5-trimethoxyphenyl)-1-phenethyl-1H-cyclohepta[e][1,4]oxazepine.

EXAMPLE 81

Cis-A-dodecahydro-5-(2,3,4-trimethoxyphenyl)-1-pentylcycloocta[e][1,4]oxazepine

In the manner given in Example 8, cis-A-dodecahydro-5 - (2,3,4 - trimethoxyphenyl)cycloocta[e][1,4]oxazepine was treated with valeric anhydride to give cis-A-dodecahydro - 5 - (2,3,4 - trimethoxyphenyl)-1-valerylcycloocta[e][1,4]oxazepine.

In the manner given in Example 9, cis-A-dodecahydro-5-(2,3,4-trimethoxyphenyl) - 1 - valerylcycloocta[e][1,4]oxazepine was reduced with lithium aluminum hydride in tetrahydrofuran to give, after decomposition of the mixture with water and sodium hydroxide, cis-A-dodecahydro - 5 - (2,3,4-trimethoxyphenyl)-1-pentylcycloocta[e][1,4]oxazepine.

EXAMPLE 82

Cis-B-octahydro-5-(3,4,5-trimethoxyphenyl)-1H-cyclopenta[e][1,4]oxazepine

In the manner given in Example 64A, 2-(3,4,5-trimethoxybenzoyl)cyclohexanone was condensed with 2-aminoethanol and the thus-obtained enamine was hydrogenated in the presence of platinum oxide catalyst to give cis-A-2 - [(2-hydroxyethyl)amino] - α - (3,4,5-trimethoxyphenyl)cyclopentanemethanol.

This product was treated with trifluoroacetic acid (as in Example 64B) to give cis-B-octahydro-5-(3,4,5-trimethoxyphenyl)-1H-cyclopenta[e][1,4]oxazepine.

Likewise substituting in Example 64 for the 2-(p-methoxybenzoyl)cyclohexanone, other 2-benzoyl or substituted benzoyl cycloalkanones produces the corresponding cis-B-polyhydro-5-phenyl (or substituted phenyl) oxazepines. Representative compounds thus produced include:

Cis-B-octahydro-5-(m-isobutylphenyl)-1H-cyclopenta[e][1,4]oxazepine;
Cis-B-octahydro-5-(p-methoxyphenyl)-1H-cyclopenta[e][1,4]oxazepine;
Cis-B-octahydro-5-(m-trifluoromethylphenyl)-1H-cyclopenta[e][1,4]oxazepine;
Cis-B-octahydro-5-(p-bromophenyl)-1H-cyclopenta[e][1,4]oxazepine;
Cis-B-octahydro-5-(2,4-dibromophenyl)-1H-cyclopenta[e][1,4]oxazepine;
Cis-B-octahydro-5-(p-bromophenyl)-6,6-dimethyl-1H-cyclopenta[e][1,4]oxazepine;
Cis-B-octahydro-5-(o-ethoxyphenyl)-1H-cyclopenta[e][1,4]oxazepine;
Cis-B-octahydro-5-(p-chlorophenyl)-1H-cyclopenta[e][1,4]oxazepine;
Cis-B-octahydro-5-(p-butoxyphenyl)-1H-cyclopenta[e][1,4]oxazepine;
Cis-B-decahydro-5-(m-trifluoromethylphenyl)-4,1-benzoxazepine;
Cis-B-decahydro-5-(2,4-dichlorophenyl)-4,1-benzoxazepine;
Cis-B-decahydro-5-(2-chloro-3,4-diethylphenyl)-4,1-benzoxazepine;
Cis-B-decahydro-5-(2,4-diiodo-5-ethylphenyl)-4,1-benzoxazepine;
Cis-B-decahydro-5-(p-fluorophenyl)-4,1-benzoxazepine;
Cis-B-decahydro-5-(p-isopropylphenyl)-4,1-benzoxazepine;
Cis-B-decahydro-5-(o-iodophenyl)-1H-cyclohepta[e][1,4]oxazepine;
Cis-B-decahydro-5-(2,4-difluorophenyl)-1H-cyclopenta[e][1,4]oxazepine;
Cis-B-decahydro-5-(2-ethyl-3-bromophenyl)-1H-cyclohepta[e][1,4]oxazepine;
Cis-B-decahydro-5-(m-isopropoxyphenyl)-1H-cyclohepta[e][1,4]oxazepine;
Cis-B-decahydro-5-(3,4,5-triethoxyphenyl)-1H-cyclohepta[e][1,4]oxazepine;
Cis-B-decahydro-5-(3,4,5-triethoxyphenyl)-10,10-dimethyl-1H-cyclohepta[e][1,4]oxazepine;
Cis-B-decahydro-5-phenyl-1H-cyclohepta[e][1,4]oxazepine;
Cis-B-dodecahydro-5-(3-ethyl-5-ethoxyphenyl)cycloocta[e][1,4]oxazepine;
Cis-B-dodecahydro-5-(p-hexylphenyl)cycloocta[e][1,4]oxazepine;
4'-fluoro-4-cis-B-[dodecahydro-5-(p-propoxyphenyl)cycloocta[e][1,4]oxazepin-1-yl]butyrophenone;
Cis-B-dodecahydro-5-m-iodophenyl)cycloocta[e][1,4]oxazepine;
Cis-B-dodecahydro-5-(2-bromo-4-methylphenyl)-1-(2-piperidinoethyl)cycloocta[e][1,4]oxazepine;
Cis-B-dodecahydro-5-(p-ethoxyphenyl)-6,6-dimethylcycloocta[e][1,4]oxazepine;
Cis-B-dodecahydro-5-(o-fluorophenyl)-9,9-dimethylcycloocta[e][1,4]oxazepine;
Cis-B-dodecahydro-5-(3,5-diiodophenyl)cycloocta[e][1,4]oxazepine, and the like.

EXAMPLE 83

Trans-C-octahydro-5-(3,4,5-trimethoxyphenyl)-1-ethyl-1H-cyclopenta[e][1,4]oxazepine (A) In the manner given in Example 69A, cis-A-α-(3,4,5 - trimethoxyphenyl)-2-aminocyclopentanemethanol was oxidized with chromic trioxide in aqueous sulfuric acid to give cis-2-aminocyclopentyl 3,4,5-trimethoxyphenyl ketone.

(B) In the same manner given in Example 69B, this ketone was dissolved in a mixture of triethylamine (2% volume), methanol (3% volume) and benzene (95% volume) and thereto was added silica gel. This mixture was stirred at room temperature (24–26° C.) for one day to give trans-2-aminocyclopentyl 3,4,5-trimethoxyphenyl ketone.

(C) Trans-2-aminocyclopentyl 3,4,5-trimethoxyphenyl ketone thus obtained was hydrogenated as in Example 69D in the presence of platinum oxide to give trans-D-α-(3,4,5-trimethoxyphenyl) - 2 - aminocyclopentanemethanol.

(D) The thus-obtained trans-D-α-(3,4,5-trimethoxyphenyl)-2-aminocyclopentanemethanol was treated as in Example 69E at low temperature (0–5° C.) with trifluoroacetic acid to give trans-C-α-(3,4,5-trimethoxyphenyl)-2-aminocyclopentanemethanol.

(E) The thus-obtained trans-C-alcohol was reacted in methylene chloride solution at 0° C. with chloracetyl chloride in the presence of triethylamine as in Example 69F, to give trans-C-2-chloro-N-[2-(α-hydroxy-3,4,5-trimethoxybenzyl)cyclopentyl]acetamide.

(F) As in Example 69G, trans-C-2-chloro-N-[2-(α-hydroxy-3,4,5-trimethoxybenzyl)cyclopentyl]acetamide was treated with sodium hydride to give trans-C-hexahydro-5 - (3,4,5 - trimethoxyphenyl)-1H-cyclopenta[e][1,4]oxazepin-2(3H)-one.

(G) As in Example 70, the oxazepin-2(3H)-one above was reduced with lithium aluminum hydride to give trans-C-octahydro-5-(3,4,5 - trimethoxyphenyl)-1H-cyclopenta[e][1,4]oxazepine.

As in Example 71, the trans-C-octahydro-5-(3,4,5-trimethoxyphenyl) - 1H - cyclopenta[e][1,4]oxazepine was acetylated with acetic anhydride and the acetamide subsequently reduced with lithium aluminum hydride to give trans-C-octahydro-5-(3,4,5-trimethoxyphenyl) - 1 - ethyl-1H-cyclopenta[e][1,4]oxazepine.

EXAMPLE 84

Trans-C-decahydro-5-(3,4,5-trimethoxyphenyl)-1-ethyl-1H-cyclohepta[e][1,4]oxazepine (A) In the manner given in Example 69A, cis-A-α-(3,4,5-trimethoxyphenyl) - 2-aminocycloheptanemethanol was oxidized with chromic trioxide in aqueous sulfuric acid to give cis-2-aminocycloheptyl 3,4,5-trimethoxyphenyl ketone.

(B) In the manner given in Example 69B, this ketone was dissolved in a mixture of triethylamine (2% volume), methanol (3% volume) and benzene (95% volume) and thereto was added silica gel. This mixture was stirred at room temperature (24–26° C.) for one day to give trans-2-aminocycloheptyl 3,4,5-trimethoxyphenyl ketone.

(C) Trans-2-aminocycloheptyl 3,4,5-trimethoxyphenyl ketone thus obtained was hydrogenated as in Example 69D in the presence of platinum oxide to give trans-D-α-(3,4,5-trimethoxyphenyl)-2-aminocycloheptanemethanol.

(D) The thus-obtained trans-D-α-(3,4,5-trimethoxyphenyl)-2-aminocycloheptanemethanol was treated as in Example 69E at low temperature (0–5° C.) with trifluoroacetic acid to give trans-C-α-(3,4,5-trimethoxyphenyl)-2-aminocycloheptanemethanol.

(E) The thus-obtained trans-C-alcohol was reacted in methylene chloride solution at 0° C. with chloracetyl chloride in the presence of triethylamine as in Example 69F, to give trans-C-2-chloro-N-[2-(α-hydroxy-3,4,5-trimethoxybenzyl)chloroheptyl]acetamide.

(F) As in Example 69G, trans-C-2-chloro-N-[2-(α-hydroxy-3,4,5-trimethoxybenzyl)cycloheptyl]acetamide was treated with sodium hydride to give trans-C-octahydro-5-(3,4,5-trimethoxyphenyl) - 1H - cyclohepta[e][1,4]oxazepin-2(3H)-one.

(G) As in Example 70, the oxazepin-2(3H)-one above was reduced with lithium aluminum hydride to give trans-C-decahydro-5-(3,4,5 - trimethoxyphenyl)-1H-cyclohepta[e][1,4]oxazepine.

As in Example 71, the trans-C-decahydro-5-(3,4,5-trimethoxyphenyl) - 1H - cyclohepta[e][1,4]oxazepine was acetylated with acetic anhydride and the acetamide subsequently reduced with lithium aluminum hydride to give trans-C-decahydro - 5 - (3,4,5-trimethoxyphenyl)-1-ethyl-1H-cyclohepta[e][1,4]oxazepine.

EXAMPLE 85

Trans-C-dodecahydro-5-(2,3,4-trimethoxyphenyl)-1-butylcycloocta[e][1,4]oxazepine (A) In the same manner given in Example 69A, cis-A-α-(2,3,4-trimethoxyphenyl) - 2 - aminocyclooctanemethanol was oxidized with chromic trioxide in aqueous sulfuric acid to give cis-2-aminocyclooctyl 2,3,4-trimethoxyphenyl ketone.

(B) In the manner given in Example 69B, this ketone was dissolved in a mixture of triethylamine (2% volume), methanol (3% volume) and benzene (95% volume) and thereto was added silica gel. This mixture was stirred at room temperature (24–26° C.) for one day to give trans-2-aminocyclooctyl 2,3,4-trimethoxyphenyl ketone.

(C) Trans-2-aminocyclooctyl 2,3,4-trimethoxyphenyl ketone thus obtained was hydrogenated as in Example 69D in the presence of platinum oxide to give trans-D-α-(2,3,4-trimethoxyphenyl)-2-aminocyclooctanemethanol.

(D) The thus-obtained trans-D-α-(2,3,4-trimethoxyphenyl)-2-aminocyclooctanemethanol was treated as in Example 69E at low temperature (0–5° C.) with trifluoroacetic acid to give trans-C-α-(2,3,4-trimethoxyphenyl)-2-aminocyclooctanemethanol.

(E) The thus-obtained trans-C-alcohol was reacted in methylene chloride solution at 0° C. with chloracetyl chloride in the presence of triethylamine as in Example 69F, to give trans-C-2-chloro-N-[2-(α-hydroxy-2,3,4-trimethoxybenzyl)cyclooctyl]acetamide.

(F) As in Example 69G, trans-C-2-chloro - N - [2-(α-hydroxy - 2,3,4 - trimethoxybenzyl)cyclooctyl]acetamide was treated with sodium hydride to give trans-C-decahydro - 5 - (2,3,4-trimethoxyphenyl)-cycloocta[e][1,4]oxazepin-2(3H)-one.

(G) As in Example 70, the oxazepin-2(3H)-one above was reduced with lithium aluminum hydride to give trans-C-dodecahydro-5-(2,3,4 - trimethoxyphenyl)cycloocta[e][1,4]oxazepine.

As in Example 71, the trans-C-dodecahydro-5-(2,3,4-trimethoxyphenyl)cycloocta[e][1,4]oxazepine was acylated with butyric anhydride and the butyramide subsequently reduced with lithium aluminum hydride to give trans-C-dodecahydro-5-(2,3,4-trimethoxyphenyl) - 1 - butylcycloocta[e][1,4]oxazepine.

EXAMPLE 86

Trans-D-octahydro-5-(3,4,5-trimethoxyphenyl)-1-propyl-1H-cyclopenta[e][1,4]oxazepine In the manner given in Example 69F, trans-D-α-(3,4,5-trimethoxyphenyl)-2-aminocyclopentanemethanol was reacted in methylene chloride solution at 0° C. with chloroacetyl chloride in the presence of triethylamine to give trans - D - 2-chloro-N-[2-(α-hydroxy - 3,4,5 - trimethoxybenzyl)cyclopentyl]acetamide.

As in Example 69G, trans-D-2-chloro-N-[2-(α-hydroxy-3,4,5-trimethoxybenzyl)cyclopentyl]acetamide was treated with sodium hydride to give trans-D-hexahydro-5-(3,4,5-trimethoxyphenyl) - 1H - cyclopenta[e][1,4]oxazepin-2(3H)-one.

As in Example 71, the trans-D-octahydro-5-(3,4,5-trimethoxyphenyl) - 1H - cyclopenta[e][1,4]oxazepine was acylated with propionic anhydride and the propionamide subsequently reduced with lithium aluminum hydride to give trans-D-octahydro - 5 - (3,4,5-trimethoxyphenyl)-1-propyl-1H-cyclopenta[e][1,4]oxazepine.

EXAMPLE 87

*Trans-D-decahydro-5-(3,4,5-trimethoxyphenyl)-1-hexadecyl-1H-cyclohepta[e][1,4]oxazepine*

In the manner given in Example 69F, trans-D-α-(3,4,5-trimethoxyphenyl) - 2 - aminocycloheptanemethanol was reacted in methylene chloride solution at 0°  C. with chloroacetyl chloride in the presence of triethylamine to give trans-D-2-chloro-N-[2-(α-hydroxy-3,4,5-trimethoxybenzyl)cycloheptyl]acetamide.

As in Example 69G, trans-D-2-chloro - N - [2 - (α-hydroxy-3,4,5-trimethoxybenzyl)cycloheptyl]acetamide was treated with sodium hydride to give trans-D-octahydro-5-(3,4,5-trimethoxyphenyl) - 1H - cyclohepta[e][1,4]oxazepin-2(3H)-one.

As in Example 70, the oxazepin-2(3H)-one above was reduced with lithium aluminum hydride to give trans-D-decahydro - 5 - (3,4,5-trimethoxyphenyl)-1H-cyclohepta[e][1,4]oxazepine.

As in Example 71, the trans-D-decahydro-5-(3,4,5-trimethoxyphenyl) - 1H - cyclohepta[e][1,4]oxazepine was acylated with hexadecanoic anhydride and the thus-obtained amide subsequently reduced with lithium aluminum hydride to give trans-D-decahydro-5-(3,4,5-trimethoxyphenyl)-1-hexadecyl-1H-cyclohepta[e][1,4]oxazepine.

EXAMPLE 88

*Trans-D-dodecahydro-5-(2,3,4-trimethoxyphenyl)-1-phenethylcycloocta[e][1,4]oxazepine*

In the manner given in Example 69F, trans-D-α-(2,3,4-trimethoxyphenyl) - 2 - aminocyclooctanemethanol was reacted in methylene chloride solution at 0° C. with chloroacetyl chloride in the presence of triethylamine to give trans-D-2-chloro-N-[2-(α-hydroxy - 2,3,4-trimethoxybenzyl)cyclooctyl]acetamide.

As in Example 69G, trans-D-2-chloro-N-[2-(α-hydroxy-2,3,4-trimethoxybenzyl)cyclooctyl]acetamide was treated with sodium hydride to give trans-D-decahydro-5-(2,3,4-trimethoxyphenyl)cycloocta[e][1,4]oxazepin-2(3H)-one.

As in Example 70, the oxazepin-2(3H)-one above was reduced with lithium aluminum hydride to give trans-D-dodecahydro - 5 - (2,3,4 - trimethoxyphenyl)cycloocta[e][1,4]oxazepine.

As in Example 71, the trans-D-docecahydro-5-(2,3,4-trimethoxyphenyl)cycloocta[e][1,4]oxazepine was acylated with phenylacetic anhydride and the phenylacetamide subsequently reduced with lithium aluminum hydride to give trans-D-dodecahydro - 5 - (2,3,4-trimethoxyphenyl)-1-phenethylcycloocta[e][1,4]oxazepine.

In the manner given in the preceding examples, other representative compounds of Formula XXIII:

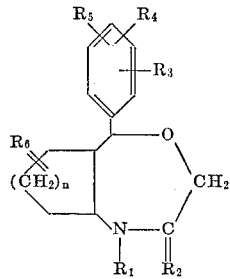

wherein $n$ has a value from 1 to 4, inclusive; wherein $R_1$ is hydrogen, alkyl from 1 to 16 carbon atoms, inclusive, phenylalkyl, heterocyclicaminoalkyl, alkylaminoalkyl, dialkylaminoalkyl, alkanoyl from 1 to 16 carbon atoms, inclusive, benzoyl, phenylacetyl,

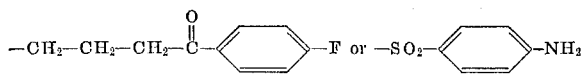

wherein $R_2$ is

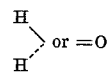

wherein $R_3$, $R_4$ and $R_5$ are selected from the group consisting of hydrogen, alkoxy, halogen, lower alkyl and —$CF_3$; and wherein $R_6$ is hydrogen or

including the cis-A, cis-B, trans-C, and trans-D forms can be made such as, e.g.:

Cis-B-decahydro - 1 - methyl-5-phenyl-4,1-benzoxazepine and its trans-C and trans-D isomers;

Cis-B-decahydro - 5 - phenyl-1-(2-dihexylaminoethyl)-4,1-benzoxazepine and its trans-C and trans-D isomers;

Cis-B-decahydro - 5 - (2-methoxy-4-methylphenyl)-4,1-benzoxazepine and its trans-C and trans-D isomers;

Cis-B-decahydro - 5 - (p-ethoxyphenyl)-4,1-benzoxazepine and its trans-C and trans-D isomers;

Cis-B-decahydro - 5 - (3,5-dimethyl-4-methoxyphenyl)-4,1-benzoxazepine and its trans-C and trans-D isomers;

Cis-B-decahydro - 5 - (p-trifluoromethylphenyl) - 4,1-benzoxazepine and its trans-C and trans-D isomers;

Cis-B-decahydro - 5 - (p-chlorophenyl) - 4,1 - benzoxazepine and its trans-C and trans-D isomers;

Cis-B-decahydro - 5 - (m-fluorophenyl)-1-dodecyl-4,1-benzoxazepine and its trans-C and trans-D isomers;

Cis-B-decahydro-5-(2,4 - diiodophenyl)-1-benzoyl-4,1-benzoxazepine and its trans-C and trans-D isomers;

Cis-B-octahydro-5-(3,4,5 - trimethoxyphenyl)-1-pentyl-4,1-benzoxazepin-2(3H)-one and its trans-C and trans-D-isomers;

Cis-B-octahydro - 5 - (2,4-diethyl-5-bromophenyl)-1-phenethyl-4,1-benzoxazepin-2(3H) - one and its trans-C and trans-D isomers;

Cis-B-octahydro - 5 - phenyl - 1H - cyclopenta[e][1,4]oxazepine and its trans-C and trans-D isomers;

Cis-B-octahydro - 5 - (p-methoxyphenyl)-1-ethyl-1H-cyclopenta[e][1,4]oxazepine and its trans-C and trans-D isomers;

Cis-B-octahydro - 5 - (p-fluorophenyl)-1-dodecyl-1H-cyclopenta[e][1,4]oxazepine and its trans-C and trans-D isomers;

Cis-B-octahydro - 5 - (m - trifluoromethylphenyl)-1-benzoyl-1H-cyclopenta[e][1,4]oxazepine and its trans-C and trans-D isomers;

Cis-B-hexahydro-5-(o - chlorophenyl)-1-hexadecanoyl-1H-cyclopenta[e][1,4]oxazepin-2(3H)-one and its trans-C and trans-D isomers;

Cis-B-hexahydro - 5 - (p - hexylphenyl)-1-benzyl-1H-cyclopenta[e][1,4]oxazepin - 2(3H)-one and its trans-C and trans-D isomers;

Cis-B-decahydro - 5 - phenyl - 1H-cyclohepta[e][1,4]oxazepine and its trans-C and trans-D isomers;

Cis-B-decahydro - 5 - (p-methoxyphenyl)-1-ethyl-1H-cyclohepta[e][1,4]oxazepine and its trans-C and trans-D isomers;

Cis-B-decahydro - 5 - (p-fluorophenyl)-1-dodecyl-1H-cyclohepta[e][1,4]oxazepine and its trans-C and trans-D isomers;

Cis-B-decahydro - 5 - (p - trifluoromethylphenyl)-1-benzoyl-1H-cyclohepta[e][1,4]oxazepine and its trans-C and trans-D isomers;

Cis-B-decahydro-5-(o - chlorophenyl)-1-hexadecanoyl-1H-cyclohepta[e][1,4]oxazepine and its trans-C and trans-D isomers;

Cis-B-decahydro - 5 - (p - butylphenyl)-1-benzyl-1H-cyclohepta[e][1,4]oxazepine and its trans-C and trans-D isomers;

Cis-B-octahydro - 5 - (p - propylphenyl)-1-butyl-1H-cyclohepta[e][1,4]oxazepin - 2(3H)-one and its trans-C and trans-D isomers;

Cis-B-octahydro - 5 - (2,4 - diiodophenyl)-1-ethyl-1H- cyclohepta[e][1,4]oxazepin - 2(3H)-one and its trans-C and trans-D isomers;

Cis-B-octahydro - 5 - (p - ethoxyphenyl)-1-butyl-1H-cyclohepta[e][1,4]oxazepin - 2(3H)-one and its trans-C and trans-D isomers;

Cis-B-dodecahydro - 5 - (3,5 - dimethyl - 4 - methoxyphenyl)-cycloocta[e]]1,4]oxazepine and its trans-C and trans-D isomers;

Cis-B-dodecahydro - 5 - (p-trifluoromethylphenyl)-1-butylcycloocta[e][1,4]oxazepine and its trans-C and trans-D isomers;

Cis-B-dodecahydro - 5 - (p-chlorophenyl)-1-isopropylcycloocta[e][1,4]oxazepine and its trans-C and trans-D isomers;

Cis-B-dodecahydro - 5 - (m-fluorophenyl)-1-decylcycloocta[e][1,4]oxazepine and its trans-C and trans-D isomers;

Cis-B-dodecahydro - 5 - (2,4-dibromophenyl)-1-benzoylcycloocta[e][1,4]oxazepine and its trans-C and trans-D isomers;

Cis-B-decahydro - 5 - (3,4,5 - trimethoxyphenyl)-1-butylcycloocta[e][1,4]oxazepin-2(3H)-one and its trans-C and trans-D isomers;

Cis-B-decahydro - 5 - (2,4-diethyl-5-bromophenyl)-1-phenethylcycloocta[e][1,4]oxazepin - 2(3H)-one and its trans-C and trans-D isomers, and the like.

EXAMPLE 89

*Cis-A-decahydro-5-(p-methoxyphenyl)-1-methyl-4,1-benzoxapepine N-oxide and its hydrochloride*

To an ice-cooled solution of 7 mmoles of cis-A-decahydro-5-(p-methoxyphenyl)-1-methyl-4,1-benzoazepine in 50 ml. of methanol, was added 14 mmoles of m-chloroperbenzoic acid. The resulting colorless solution was allowed to stand in ice for 6 hours and then at room temperature (23 to 25° C.) for about 18 hours. It was evaporated to dryness at 35° C. to give an oily residue. To this residue was added 25 ml. of water followed by 25 ml. of 5% aqueous sodium hydroxide, and then the mixture was extracted three times with a total of 100 ml. of methylene chloride. The methylene chloride extracts were combined, washed twice with saturated salt solution, dried by passage through anhydrous sodium sulfate and evaporated to give an oil. The oil was dissolved in 25 ml. of hot ethyl acetate and the cloudy solution was filtered through a sintered funnel. The resulting clear solution was evaporated to 8 ml. volume and cooled. The resulting crystals were recovered by filtration and washed with ether to give cis-A-decahydro - 5-(p-methoxyphenyl)-1-methyl-1,4-benzoxazepine N-oxide.

In the manner given in Example 89, N-oxides of other tertiary amino compounds of this invention, described in the preceding example, can be produced by reacting such compounds with a peracid, preferably m-chlorobenzoic acid in solution. This includes the compounds in all geometric configurations, cis-A, cis-B, trans-C, and trans-D.

A solution of cis-A-decahydro-5-(p-methoxyphenyl)-1-methyl-4,1-benzoxazepine N-oxide (0.01 mole) in ether and an ether solution containing 0.01 mole of gaseous hydrogen chloride were mixed in the cold. The mixture was then evaporated to dryness at reduced pressure to give cis-A-decahydro-5 - (p-methoxyphenyl)-4,1-benzoxazepine N-oxide hydrochloride.

EXAMPLE 90

*Cis-A-decahydro-5-(p-methoxyphenyl)-1,1-dimethyl-4,1-benzoxazepinium iodide*

A solution of 0.1 mole of methyl iodide and 0.01 mole of cis-A-decahydro - 5-(p-methoxyphenyl)-1-methyl-4,1-benzoxazepine in 100 ml. of ethanol was allowed to stand for a period of 48 hours at room temperature. The solution was then evaporated to dryness to obtain cis-A-decahydro - 5 - (p-methoxyphenyl)-1,1-dimethyl-4,1-benzoxazepinium iodide as a solid.

EXAMPLE 91

*Cis-B-octahydro-5-(3,4,5-trimethoxyphenyl)-1,1-diethyl-1H-cyclopenta[e][1,4]oxazepinium bromide*

A mixture of 0.1 mole of ethyl bromide, 0.01 mole of cis-B-octahydro - 5 - (3,4,5 - trimethoxyphenyl)-1H-cyclopenta[e][1,4]oxazepine, 0.01 mole of sodium bicarbonate and 100 ml. of methanol was heated for 6 hours at the reflux temperature. The mixture was evaporated to dryness, and the solid residue was washed with water and then dried over phosphorus pentoxide, to obtain cis-B-octahydro - 5 - (3,4,5 - trimethoxyphenyl)-1,1-diethyl-1H-cyclopenta[e][1,4]oxazepinium bromide.

EXAMPLE 92

*Cis-B-octahydro-5-(3,4,5-trimethoxyphenyl)-1,1-diethyl-1H-cyclopenta[e][1,4]oxazepinium sulfate*

A suspension of 1 molar equivalent of cis-B-octahydro-5-(3,4,5 - trimethoxyphenyl) - 1,1-diethyl-1H-cyclopenta[e][1,4]oxazepinium bromide and 3 molar equivalents of aqueous silver oxide was stirred for 20 minutes and extracted with ether.

The ether extracts containing the above oxazepinium compound as quaternary hydroxide were evaporated and the residue slowly added to a 10% aqueous sulfuric acid solution. Evaporation of the water and recrystallization from water gave cis-B-octahydro-5 - (3,4,5-trimethoxyphenyl) - 1,1-diethyl-1H-cyclopenta[e][1,4]oxazepinium sulfate.

In the manner given in Example 90 or 91, other quaternary ammonium halide salts (oxazepinium halides) can be produced by alkylation of the oxazepines disclosed in the preceding examples, with alkyl chlorides, bromides, or iodides.

In the manner given in Example 92, quaternary ammonium salts other than halides are prepared by reacting the oxazepinium halide with a base such as silver oxide or silver carbonate in aqueous suspension to give the corresponding oxazepinium hydroxide and treating the oxazepinium hydroxide with a selected mineral or organic acid.

Acid addition salts of the basic compounds of Formula XXIII can be prepared by reacting stoichiometric amounts of the amine with the selected acid, e.g., in aqueous, ethereal, or alcoholic solution, and evaporating the solvent.

Illustrative acids useful for preparing acid addition salts, as described, are: halohydric acids such as hydrogen chloride, hydrogen bromide, hydrogen iodide; other mineral acids, e.g., sulfuric acid, perchloric acid, phosphoric acid; organic acids, e.g., benzenesulfonic acid, o-, m-, and p-toluenesulfonic acid, o-, m-, and p-chlorobenzenesulfonic acid, acetic, lactic, tartaric, succinic, malic, maleic, citric, thiocyanic, and trichloroacetic acid; fluosilicic acid, and the like.

EXAMPLE 93

*Cis-A-decahydro-5-(p-hydroxyphenyl)-1-ethyl-4,1-benzoxazepine*

A suspension of 28.9 g. (0.1 mole) of cis-A-decahydro-5 - (p-methoxyphenyl)-1-ethyl-4,1-benzoxazepine in 100 ml. of methylene chloride at 0° C. was admixed with 23.4 g. (0.2 mole) of boron trichloride. The reaction mixture was immediately poured onto crushed ice, then 25 g. of sodium bicarbonate was added, followed by 200 ml. of methylene chloride. The organic layer was separated, dried over anhydrous magnesium sulfate and evaporated to give a residue. The residue was twice recrystallized from ethanol to give pure cis-A-decahydro-5-(p-hydroxyphenyl)-1-ethyl-4,1-benzoxazepine.

EXAMPLE 94

*Cis-A-decahydro-5-(p-hydroxyphenyl)-1-acetyl-4,1-benzoxazepine*

In the manner given in Example 93, a suspension of 0.1 mole of cis-A-decahydro - 5-(p-methoxyphenyl)-1-acetyl- 4,1-benzoxazepine in 100 ml. of methylene chloride was treated with 0.1 mole of boron trichloride to give cis-A-decahydro - 5-(p-hydroxyphenyl)-1-acetyl-4,1-benzoxazepine of melting point 243–245° C.

*Analysis.*—Calcd. for $C_{17}H_{23}NO_3$ (percent): C, 70.56; H, 8.01; N, 4.84. Found (percent): C, 70.73; H, 8.18; N, 4.96.

In the manner given in Examples 93 and 94, polyhydro-5-(alkoxyphenyl)-cycloalkane-oxazepine and -oxazepinones can be converted to the corresponding polyhydro-5 - (hydroxyphenyl)cycloalkane-oxazepines and -oxazepinones by treatment with boron trichloride or boron tribromide at low temperatures.

Other compounds thus obtained include:

Cis-B-decahydro - 5 - (2 - hydroxy-4-methylphenyl)-4,1-benzoxazepine;
Cis-A-decahydro-5-(p-hydroxyphenyl)-4,1-benzoxazepine;
Cis-B-decahydro-5-(3,5-dimethyl-4-hydroxyphenyl)-4,1-benzoxazepine;
Cis-B-octahydro-5-(3,4,5-trihydroxyphenyl)-1-pentyl-4,1-benzoxazepin-2(3H)-one;
Cis-B-octahydro-5-(p-hydroxyphenyl)-1-ethyl-1H-cyclopenta[e][1,4]oxazepine;
Trans-C-decahydro-5-(p-hydroxyphenyl)-1-ethyl-1H-cyclohepta[e][1,4]oxazepine;
Trans-D-decahydro-5-(o-hydroxyphenyl)-1-valeryl-1H-cyclohepta[e][1,4]oxazepine;
Trans-C-dodecahydro-5-(3,4,5-trihydroxyphenyl)-1-hexadecanoylcycloocta[e][1,4]oxazepine;
Trans-D-decahydro-5-(m-hydroxyphenyl)-1-butylcycloocta[e][1,4]oxazepin-2(3H)-one and the like.

Example 95

*Cis-A-decahydro-5-(p-acetoxyphenyl)-1-acetyl-4,1-benzoxazepine*

To 0.15 mole of acetic anhydride was added 0.1 mole of cis-A-decahydro-5-(p-hydroxyphenyl) - 1 - acetyl-4,1-benzoxazepine. The mixture was heated to 95° C. for one hour; water was added and the mixture was heated to 95° C. for another hour. The reaction mixture was then extracted with methylene chloride, the extracts washed wtih aqueous sodium bicarbonate solution, then water, dried over anhydrous magnesium sulfate, and evaporated to give cis-A-decahydro-5-(p-acetoxyphenyl)-1-acetyl-4,1-benzoxazepine.

Example 96

*Cis-A-decahydro-5-(p-propionyloxyphenyl)-1-ethyl-4,1-benzoxazepine*

A suspension of 0.1 mole of sodium hydride and 0.1 mole of cis-A-decahydro-5-(p-hydroxyphenyl)-1-ethyl-4,1-benzoxazepine in 100 ml. of dimethylformamide was stirred for 1 hour at room temperature. Thereupon 0.1 mole of propionic anhydride was added and the mixture heated to 95° C. for one hour. Water was added, and the aqueous mixture was heated for one hour, and then extracted with methylene chloride. The methylene chloride extracts were dried over anhydrous magnesium sulfate and evaporated to give cis-A-decahydro-5-(p-propionyloxyphenyl)-1-ethyl-4,1-benzoxazepine.

In the same manner given in Examples 95 and 96, phenolic compounds produced as in Examples 93 and 94 are esterified with acid anhydrides to give the corresponding polyhydro-5-(acyloxyphenyl)-cycloalkane-oxazepines and -oxazepinones. Representative compounds thus produced include:

Cis-B-decahydro-5-(2-butyryloxy-4-methylphenyl)-4,1-oxazepine;
Cis-A-decahydro-5-(o-hexanoyloxyphenyl)-4,1-oxazepine;
Cis-B-decahydro-5-(3,5-dimethyl-4-hexanoyloxyphenyl)-4,1-oxazepine;
Cis-B-octahydro-5-(3,4,5-triacetoxyphenyl)-1-pentyl-4,1-benzoxazepin-2(3H)-one;
Cis-B-octahydro-5-(p-butyryloxyphenyl)-1-ethyl-1H-cyclopenta[e][1,4]oxazepine;
Cis-B-octahydro-5-(m-hexanoyloxyphenyl)-1-ethyl-6,6-dimethyl-1H-cyclopenta[e][1,4]oxazepine;
Trans-C-decahydro-5-(p-valeryloxyphenyl)-1-ethyl-1H-cyclohepta[e][1,4]oxazepine;
Trans-D-decahydro-5-(o-butyryloxyphenyl)-1-valeryl-1H-cyclohepta[e][1,4]oxazepine;
Trans-C-dodecahydro-5(3,4,5-trivaleryloxyphenyl)-1-hexadecanoyl-1H-cyclohepta[e][1,4]oxazepine;
Trans-D-decahydro-5-(m-acetoxyphenyl)-1-butylcycloocta[e][1,4]oxazepin-2(3H)-one;
Trans-D-dodecahydro-5-(p-propionyloxyphenyl)-1-hexyl - 8,8 - dimethyl-cycloocta[e][1,4]oxazepine, and the like.

These compounds can be converted to acid addition salts, quaternary ammonium halides and quaternary ammonium salts and N-oxides and N-oxide acid addition salts as shown before in the preceding examples.

What is claimed is:
1. A perhydro-5-phenylcycloalkapolyene-1,4-oxazepine of the Formula XXIII:

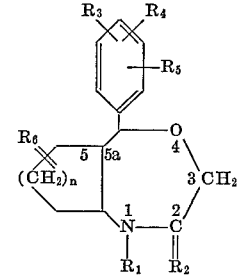

XXIII wherein *n* has a value of 1 to 4, inclusive; wherein $R_1$ is selected from the group consisting of hydrogen, alkyl of 1 to 16 carbon atoms, inclusive, phenylalkyl, in which alkyl is of 1 to 6 carbon atoms, inclusive, alkanoyl of 1 to 16 carbon atoms, inclusive, benzoyl, phenylacetyl,

and

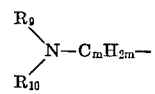

in which

is selected from the group consisting of alkylamino and dialkylamino wherein each alkyl is of 1 to 6 carbon atoms, inclusive, and heterocyclicamino selected from the group consisting of unsubstituted and mono- and polyalkyl substituted pyrrolidino, piperidino, morpholino, piperazino and hexamethyleneimino, in which the alkyl group on the heterocyclic amine is of 1 to 6 carbon atoms, inclusive, and in which *m* has a value from 2 to 6, inclusive; wherein $R_2$ is

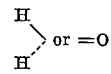

wherein $R_3$, $R_4$ and $R_5$ are selected from the group consisting of hydrogen, hydroxy, halogen, alkyl of 1 to 6 carbon atoms, inclusive, alkoxy of 1 to 6 carbon atoms, inclusive, and alkanoyloxy of 1 to 6 carbon atoms, inclusive, and —CF$_3$; wherein R$_6$ is

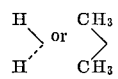

the hydrochloric, hydrobromic or hydriodic acid addition salts thereof; the alkyl quaternary ammonium halide salts wherein alkyl is of 1 to 16 carbon atoms, and the N-oxides and the hydrochloric acid addition salts thereof.

2. A cis-A compound according to claim 1 wherein $n$ is 2, R$_1$, R$_2$, R$_3$, R$_4$ and R$_6$ are hydrogen, R$_5$ is p-methoxy and the compound is therefore cis-A-decahydro-5-(p-methoxyphenyl)-4,1-benzoxazepine.

3. The hydrochloride of the compound of claim 2, namely, cis-A-decahydro - 5 - (p - methoxyphenyl) - 4,1-benzoxazepine hydrochloride.

4. A cis-A compound according to claim 1 wherein $n$ is 2, R$_1$ is methyl, R$_2$, R$_3$, R$_4$ and R$_6$ are hydrogen, R$_5$ is p-methoxy and the compound is therefore cis-A-decahydro-5-(p-methoxyphenyl)-1-methyl-4,1-benzoxazepine.

5. A cis-A compound according to claim 1 wherein $n$ is 2, R$_1$ is ethyl, R$_2$, R$_3$, R$_4$ and R$_6$ are hydrogen, R$_5$ is p-methoxy and the compound is therefore cis-A-decahydro-5-(p-methoxyphenyl)-1-ethyl-4,1-benzoxazepine.

6. A cis-A compound according to claim 1 as dihydrochloride wherein $n$ is 2, R$_1$ is 3-(dimethylamino)propyl, R$_2$, R$_3$, R$_4$ and R$_6$ are hydrogen, R$_5$ is p-methoxy and the compound is therefore cis - A - decahydro-5-(p-methoxyphenyl) - 1 - [3-(dimethylamino)propyl] - 4,1 - benzoxazepine dihydrochloride.

7. A cis-A compound according to claim 1 wherein $n$ is 2, R$_1$ is 2-(dimethylamino)ethyl, R$_2$, R$_3$, R$_4$ and R$_6$ are hydrogen, R$_5$ is p-methoxy and the compound is therefore cis-A-decahydro - 5 - (p-methoxyphenyl)-1-[2-(dimethylamino)ethyl]-4,1-benzoxazepine.

8. A cis-A compound according to claim 1 wherein $n$ is 2, R$_1$ is propyl, R$_2$, R$_3$, R$_4$ and R$_6$ are hydrogen, R$_5$ is p-methoxy and the compound is therefore cis-A-decahydro-5-(p-methoxyphenyl)-1-propyl-4,1-benzoxazepine.

9. A cis-A compound according to claim 1 wherein $n$ is 2, R$_1$ is butyl, R$_2$, R$_3$, R$_4$ and R$_6$ are hydrogen, R$_5$ is p-methoxy and the compound is therefore cis-A-decahydro-5-(p-methoxyphenyl)-1-butyl-4,1-benzoxazepine.

10. The hydrochloride of the compound of claim 9, namely, cis-A-decahydro-5-(p - methoxyphenyl)-1-butyl-4,1-benzoxazepine hydrochloride.

11. A cis-A compound according to claim 1 wherein $n$ is 2, R$_1$ is 4-oxo-4-(p-fluorophenyl)butyl, R$_2$, R$_3$, R$_4$ and R$_6$ are hydrogen, R$_5$ is p-methoxy and the compound is therefore 4'-fluoro-4-cis-A-[octahydro-5-(p - methoxyphenyl)-4,1-benzoxazepin-1(5H)-yl]butyrophenone.

12. A cis-A compound according to claim 1 wherein $n$ is 2, R$_1$ is isopropyl, R$_2$, R$_3$, R$_4$ and R$_6$ are hydrogen, R$_5$ is p-methoxy and the compound is therefore cis-A-decahydro - 5 - (p - methoxyphenyl)-1-isopropyl-4,1-benzoxazepine.

13. A cis-A compound according to claim 1 wherein $n$ is 2, R$_1$, R$_2$, R$_3$, R$_4$ and R$_6$ are hydrogen, R$_5$ is o-methoxy and the compound is therefore cis-A-decahydro-5-(o-methoxyphenyl)-4,1-benzoxazepine.

14. A cis-A compound according to claim 1 wherein $n$ is 2, R$_1$ is ethyl, R$_2$, R$_3$, R$_4$ and R$_6$ are hydrogen, R$_5$ is o-methoxy and the compound is therefore cis-A-decahydro-5-(o-methoxyphenyl)-1-ethyl-4,1-benzoxazepine.

15. A cis-A compound according to claim 1 wherein $n$ is 2, R$_1$ is methyl, R$_2$, R$_3$, R$_4$ and R$_6$ are hydrogen, R$_5$ is o-methoxy and the compound is therefore cis-A-decahydro-5-(o-methoxyphenyl)-1-methyl-4,1-benzoxazepine.

16. A cis-A compound according to claim 1 wherein $n$ is 2, R$_1$, R$_2$, R$_3$, and R$_4$ are hydrogen, R$_5$ is p-methoxy and R$_6$ is 7,7-dimethyl and the compound is therefore cis - A - decahydro - 5 - (p-methoxyphenyl)-7,7-dimethyl-4,1-benzoxazepine.

17. A cis-A compound according to claim 1 wherein $n$ is 2, R$_1$ is methyl, R$_2$, R$_3$ and R$_4$ are hydrogen, R$_5$ is p-methoxy and R$_6$ is 7,7-dimethyl and the compound is therefore cis - A - decahydro-5-(p-methoxyphenyl)1,7,7-trimethyl-4,1-benzoxazepine.

18. A cis-A compound according to claim 1 wherein $n$ is 2, R$_1$ is ethyl, R$_2$, R$_3$, and R$_4$ are hydrogen, R$_5$ is p-methoxy, R$_6$ is 7,7-dimethyl and the compound is therefore cis - A - decahydro - 5 - (p - methoxyphenyl)-1-ethyl-7,7-dimethyl-4,1-benzoxazepine.

19. A cis-A compound according to claim 1 wherein $n$ is 2, R$_1$, R$_2$, and R$_6$ are hydrogen, R$_3$, R$_4$ and R$_5$ are 3-, 4- and 5-methoxy and the compound is therefore cis-A-decahydro-5-(3,4,5-trimethoxyphenyl) - 4,1 - benzoxazepine.

20. A cis-A compound according to claim 1 wherein $n$ is 2, R$_1$, R$_2$, R$_3$, R$_4$, R$_5$ and R$_6$ are hydrogen and the compound is therefore cis - A - decahydro-5-phenyl-4,1-benzoxazepine.

21. A cis-A compound according to claim 1 wherein $n$ is 2, R$_1$ is methyl, R$_2$, R$_3$, R$_4$, R$_5$ and R$_6$ are hydrogen, and the compound is therefore cis-A-decahydro-5-phenyl-1-methyl-4,1-benzoxazepine.

22. The hydrochloride of the compound of claim 21, namely, cis-A-decahydro-5-phenyl-1-methyl - 4,1 - benzoxazepine hydrochloride.

23. A cis-A compound according to claim 1 as hydrochloride, wherein $n$ is 2, R$_1$ is ethyl, R$_2$, R$_3$, R$_4$, R$_5$ and R$_6$ are hydrogen and the compound is therefore cis-A-decahydro-5-phenyl-1-ethyl-4,1-benzoxazepine hydrochloride.

24. A cis-P compound according to claim 1 wherein $n$ is 2, R$_1$, R$_2$, R$_3$, R$_4$ and R$_6$ are hydrogen, R$_5$ is p-methoxy and the compound is therefore cis-B-decahydro-5-(p-methoxyphenyl)-4,1-benzoxazepine.

25. A cis-B compound according to claim 1 wherein $n$ is 2, R$_1$ is methyl, R$_2$, R$_3$, R$_4$ and R$_6$ are hydrogen, R$_5$ is p-methoxy and the compound is therefore cis-B-decahydro-5-(p-methoxyphenyl)-1-methyl-4,1-benzoxazepine.

26. A cis-B compound according to claim 1 wherein $n$ is 2, R$_1$ is ethyl, R$_2$, R$_3$, R$_4$ and R$_6$ are hydrogen, R$_5$ is p-methoxy and the compound is therefore cis-B-decahydro-5-(p-methoxyphenyl)-1-ethyl-4,1-benzoxazepine.

27. A trans-C compound according to claim 1 wherein $n$ is 2, R$_1$, R$_2$, R$_3$, R$_4$ and R$_6$ are hydrogen, R$_5$ is p-methoxy and the compound is therefore trans-C-decahydro-5-(p-methoxyphenyl)-4,1-benzoxazepine.

28. A trans-C compound according to claim 1 wherein $n$ is 2, R$_1$ is ethyl, R$_2$, R$_3$, R$_4$ and R$_6$ are hydrogen, R$_5$ is p-methoxy and the compound is therefore trans-C-decahydro-5-(p-methoxyphenyl)-1-ethyl-4,1-benzoxazepine.

29. A trans-D compound according to claim 1 wherein $n$ is 2, R$_1$, R$_2$, R$_3$, R$_4$ and R$_6$ are hydrogen, R$_5$ is p-methoxy and the compound is therefore trans-D-decahydro-5-(p-methoxyphenyl)-4,1-benzoxazepine.

30. A cis-A compound according to claim 1 wherein $n$ is 2, R$_1$, R$_3$, R$_4$ and R$_6$ are hydrogen, R$_2$ is oxygen, R$_5$ is p-methoxy and the compound is therefore cis-A-octahydro-5-(p-methoxyphenyl)-4,1 - benzoxazepin - 2-(3H)-one.

31. A cis-A compound according to claim 1 wherein $n$ is 2, R$_1$ is methyl, R$_3$, R$_4$ and R$_6$ are hydrogen, R$_2$ is oxygen, R$_5$ is p-methoxy and the compound is therefore cis-A-octahydro-5-(p-methoxyphenyl) - 1 - methyl - 4,1-benzoxazepin-2(3H)-one.

32. A cis-A compound according to claim 1 wherein $n$ is 2, R$_1$ is 3-(dimethylamino)propyl, R$_2$ is oxygen, R$_3$, R$_4$ and R$_6$ are hydrogen, R$_5$ is p-methoxy and the compound is therefore cis-A-octahydro-5 - (p-methoxyphenyl) - 1 - [3 - (dimethylamino)propyl]-4,1-benzoxazepin-2(3H)-one.

33. A cis-A compound according to claim 1 wherein $n$ is 2, R$_1$ is 2-(dimethylamino)ethyl, R$_3$, R$_4$ and R$_6$ are hydrogen, R$_2$ is oxygen, R$_5$ is p-methoxy and the compound is therefore cis-A-octahydro-5-(p-methoxyphenyl)-1 - [2 - (dimethylamino)ethyl]-4,1-benzoxazepin-2(3H)-one.

34. A cis-A compound according to claim 1 wherein $n$ is 2, $R_1$ is propyl, $R_2$ is oxygen, $R_3$, $R_4$ and $R_6$ are hydrogen, $R_5$ is p-methoxy and the compound is therefore cis-A-octahydro-5-(p-methoxyphenyl) - 1 - propyl-4,1-benzoxazepin-2(3H)-one.

35. A cis-A-compound according to claim 1 wherein $n$ is 2, $R_1$ is butyl, $R_2$ is oxygen, $R_3$, $R_4$ and $R_6$ are hydrogen, $R_5$ is p-methoxy and the compound is therefore cis-A-octahydro-5-(p-methoxyphenyl) - 1 - butyl - 4,1-benzoxazepin-2(3H)-one.

36. A cis-A compound according to claim 1 wherein $n$ is 2, $R_1$, $R_3$, $R_4$, $R_5$ and $R_6$ are hydrogen, $R_2$ is oxygen, and the compound is therefore cis-A-octahydro-5-phenyl-4,1-benzoxazepin-2(3H)-one.

37. A cis-B compound according to claim 1 wherein $n$ is 2, $R_1$, $R_3$, $R_4$ and $R_6$ are hydrogen, $R_2$ is oxygen, $R_5$ is p-methoxy and the compound is therefore cis-B-octahydro - 5 - (p-methoxyphenyl)-4,1-benzoxazepin-2(3H)-one.

38. A cis-A compound according to claim 1, wherein $n$ is 2, $R_1$, $R_3$, $R_4$ and $R_6$ are hydrogen, $R_2$ is oxygen and $R_5$ is o-methoxy and the compound is therefore cis-A-octahydro - 5 - (o-methoxyphenyl) - 4,1 - benzoxazepin-2(3H)-one.

39. A cis-A compound according to claim 1, wherein $n$ is 2, $R_1$, $R_3$, $R_4$ are hydrogen, $R_2$ is oxygen, $R_5$ is p-methoxy, $R_6$ is 7,7-dimethyl and the compound is therefore cis-A-octahydro - 5 - (p-methoxyphenyl) - 7,7-dimethyl - 4,1 - benzoxazepin - 2(3H)-one.

40. A cis-A compound according to claim 1, wherein $n$ is 2, $R_1$ and $R_6$ are hydrogen, $R_2$ is oxygen and $R_3$, $R_4$ and $R_5$ are 3-, 4- and 5-methoxy and the compound is therefore cis-A-octahydro - 5 - (3,4,5 - trimethoxyphenyl)-4,1-benzoxazepin-2(3H)-one.

41. A trans-C compound according to claim 1, wherein $n$ is 2, $R_1$, $R_3$, $R_4$ and $R_6$ are hydrogen, $R_2$ is oxygen and $R_5$ is p-methoxy and the compound is therefore trans-C-octahydro - 5 - (p-methoxyphenyl) - 4,1 - benzoxazepin-2(3H)-one.

42. A trans-D compound according to claim 1, wherein $n$ is 2, $R_1$, $R_3$, $R_4$ and $R_6$ are hydrogen, $R_2$ is oxygen, and $R_5$ is p-methoxy and the compound is therefore trans-D-octahydro-5-(p-methoxyphenyl) - 4,1 - benzoxazepin-2(3H)-one.

43. A cis-A compound according to claim 1 wherein $n$ is 2, $R_1$ is formyl, $R_2$, $R_3$, $R_4$ and $R_6$ are hydrogen, $R_5$ is p-methoxy and the compound is therefore cis-A-octahydro - 5 - (p-methoxyphenyl)-4,1-benzoxazepine-1(5H)-carboxaldehyde.

44. A cis-A compound according to claim 1 wherein $n$ is 2, $R_1$ is acetyl, $R_2$, $R_3$, $R_4$ and $R_6$ are hydrogen, $R_5$ is p-methoxy and the compound is therefore cis-A-decahydro - 5 - (p-methoxyphenyl) - 1 - acetyl - 4,1-benzoxazepine.

45. A cis-B compound according to claim 1 wherein $n$ is 2, $R_1$ is formyl, $R_2$, $R_3$, $R_4$ and $R_6$ are hydrogen, $R_5$ is p-methoxy and which is therefore cis-B-octahydro-5-(p-methoxyphenyl)-4,1-benzoxazepine - 1(5H) - carboxaldehyde.

46. A cis-B compound according to claim 1 wherein $n$ is 2, $R_1$ is acetyl, $R_2$, $R_3$, $R_4$ and $R_6$ are hydrogen, $R_5$ is p-methoxy and the compound is therefore cis-B-decahydro - 5 - (p-methoxyphenyl) - 1 - acetyl - 4,1-benzoxazepine.

47. A cis-A compound according to claim 1 wherein $n$ is 2, $R_1$ is butyryl, $R_2$, $R_3$, $R_4$, and $R_6$ are hydrogen, $R_5$ is p-methoxy and the compound is therefore cis-A-decahydro - 5 - (p-methoxyphenyl) - 1 - butyryl - 4,1-benzoxazepine.

48. A cis-A compound according to claim 1 wherein $n$ is 2, $R_1$ is formyl, $R_2$, $R_3$, $R_4$ and $R_6$ are hydrogen, $R_5$ is o-methoxy and the compound is therefore cis-A-octahydro - 5 - (o-methoxyphenyl) - 4,1 - benzoxazepine-1(5H)-carboxaldehyde.

49. A cis-A compound according to claim 1 wherein $n$ is 2, $R_1$ is acetyl, $R_2$, $R_3$, $R_4$ and $R_6$ are hydrogen, $R_5$ is o-methoxy and the compound is therefore cis-A-decahydro - 5 - (o-methoxyphenyl) - 1 - acetyl - 4,1-benzoxazepine.

50. A cis-A compound according to claim 1 wherein $n$ is 2, $R_1$ is ethyl, $R_2$, $R_3$, $R_4$ and $R_6$ are hydrogen, $R_5$ is p-hydroxy and the compound is therefore cis-A-decahydro - 5 - (p-hydroxyphenyl) - 1 - ethyl-4,1-benzoxazepine.

51. A cis-A compound according to claim 1 wherein $n$ is 2, $R_1$ is acetyl, $R_2$, $R_3$, $R_4$ and $R_6$ are hydrogen and $R_5$ is p-hydroxy and the compound is therefore cis-A-decahydro-5-(p-hydroxyphenyl)-1-acetyl-4,1-benzoxazepine.

52. A cis-A compound according to claim 1 wherein $n$ is 2, $R_1$ is acetyl, $R_2$, $R_3$, $R_4$ and $R_6$ are hydrogen, $R_5$ is p-acetoxy and the compound is therefore cis-A-decahydro-5-(p-acetoxyphenyl)-1-acetyl-4,1-benzoxazepine.

53. A cis-A compound according to claim 1 wherein $n$ is 2, $R_1$ is formyl, $R_2$, $R_3$ and $R_4$ are hydrogen, $R_5$ is p-methoxy, $R_6$ is 7,7-dimethyl and the compound is therefore cis-A-octahydro - 5 - (p-methoxyphenyl) - 7,7-dimethyl-4,1-benzoxazepine-1(5H)-carboxaldehyde.

54. A cis-A compound according to claim 1 wherein $n$ is 2, $R_1$ is acetyl, $R_2$, $R_3$ and $R_4$ are hydrogen, $R_5$ is p-methoxy, $R_6$ is 7,7-dimethyl and the compound is therefore cis-A-decahydro - 5 - (p-methoxyphenyl)-1-acetyl-7,7-dimethyl-4,1-benzoxazepine.

55. A cis-A compound according to claim 1 wherein $n$ is 2 $R_1$ is fromyl, $R_2$, $R_3$, $R_4$, $R_5$ and $R_6$ are hydrogen, and the compound is therefore cis-A-octahydro-5-phenyl-4,1-benzoxazepine-1(5H)-carboxaldehyde.

56. A cis-A compound according to claim 1 wherein $n$ is 2, $R_1$ is hexadecanoyl, $R_2$, $R_3$, $R_4$ and $R_6$ are hydrogen, $R_5$ is p-methoxy and the compound is therefore cis-A-decahydro - 5 - (p-methoxyphenyl) - 1 - hexadecanoyl-4,1-benzoxazepine.

57. A cis-A compound according to claim 1 wherein $n$ is 2, $R_1$ is benzoyl, $R_2$, $R_3$, $R_4$ and $R_6$ are hydrogen, $R_5$ is p-methoxy and the compound is therefore cis-A-decahydro - 5 - (p-methoxyphenyl) - 1 - benzoyl - 4,1-benzoxazepine.

58. A cis-A compound according to claim 1 wherein $n$ is 2, $R_1$ is phenylacetyl, $R_2$, $R_3$, $R_4$ and $R_6$ are hydrogen, $R_5$ is p-methoxy and the compound is therefore cis-A-decahydro - 5 - (p-methoxyphenyl) - 1-phenylacetyl-4,1-benzoxazepine.

59. A cis-A compound according to claim 1 wherein $n$ is 2, $R_1$ is acetyl, $R_2$, $R_3$, $R_4$, $R_5$ and $R_6$ are hydrogen, and the compound is therefore cis-A-decahydro-5-phenyl-1-acetyl-4,1-benzoxazepine.

60. A trans-C compound according to claim 1 where $n$ is 2, $R_1$ is acetyl, $R_2$, $R_3$, $R_4$ and $R_6$ are hydrogen, $R_5$ is p-methoxy and the compound is therefore trans-C-decahydro-5-(p-methoxyphenyl) - 1 - acetyl - 4,1 - benzoxazepine.

61. A cis-A compound according to claim 1 wherein $n$ is 2, $R_1$ is phenethyl, $R_2$, $R_3$, $R_4$ and $R_6$ are hydrogen, $R_5$ is p-methoxy and the compound is therefore cis-A-decahydro - 5 - (p - methoxphenyl) - 1 - phenethyl - 4,1 - benzoxazepine hydrochloride.

62. A cis-A compound according to claim 1 wherein $n$ is 2, $R_1$ is benzyl, $R_2$, $R_3$, $R_4$ and $R_6$ are hydrogen, $R_5$ is p-methoxy and the compound is therefore cis-A-decahydro - 5 - (p - methoxyphenyl) - 1 - benzyl - 4,1 - benzoxazepine.

63. A cis-A compound according to claim 1 wherein $n$ is 2, $R_1$ is hexadecyl, $R_2$, $R_3$, $R_4$ and $R_6$ are hydrogen, $R_5$ is p-methoxy and the compound is therefore cis-A-decahydro - 5 - (p - methoxyphenyl) - 1 - hexadecyl - 4,1-benzoxazepine.

64. In a process for the preparation of a perhydro-5- phenylcycloalkapolyene - 1,4 - oxazepine of the formula XXIII:

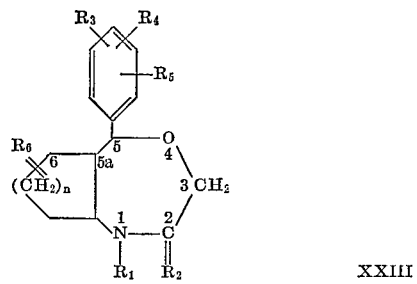

wherein $n$ has a value from 1 to 4, inclusive; wherein $R_1$ is selected from the group consisting of hydrogen, alkyl of 1 to 16 carbon atoms, inclusive, phenylalkyl in which alkyl is of 1 to 6 carbon atoms, inclusive, alkanoyl of 1 to 16 carbon atoms, inclusive, benzoyl, phenylacetyl,

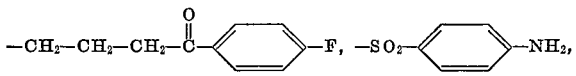

and

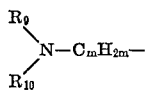

in which

is selected from the group consisting of alkylamino and dialkylamino wherein each alkyl is of 1 to 6 carbon atoms, inclusive, and heterocyclic-amino selected from the group consisting of unsubstituted and mono- and polyalkyl substituted pyrrolidino, piperidino, morpholino piperazino and hexamethyleneimino, in which the alkyl group on the heterocyclic amine is of 1 to 6 carbon atoms, inclusive; wherein $R_2$ is

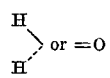

wherein $R_3$, $R_4$ and $R_5$ are selected from the group consisting of hydrogen, hydroxy, halogen, alkyl of 1 to 6 carbon atoms, inclusive, alkoxy of 1 to 6 carbon atoms, inclusive, and alkanoyloxy of 1 to 6 carbon atoms, inclusive, and $-CF_3$; wherein $R_6$ is

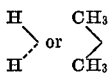

the steps which comprise, treating a 1,3-amino alcohol of the formula:

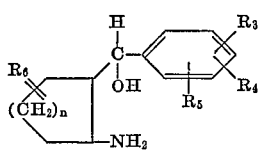

wherein $n$, $R_3$, $R_4$, $R_5$ and $R_6$ are defined as above, with chloroacetyl chloride in the presence of a base in an organic solvent between $-10$ and $+20°$ C. to obtain an acetamide of the formula:

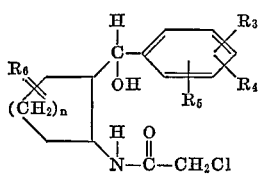

in which $n$, $R_3$, $R_4$, $R_5$ and $R_6$ are defined as above; and treating this compound in an organic solvent with a strong base to obtain the corresponding 2-oxazepinone of the formula:

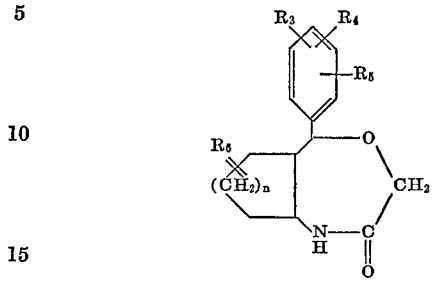

wherein $n$, $R_3$, $R_4$, $R_5$, and $R_6$ are defined as above.

65. A process according to claim 64 for the production of a perhydro-5-phenylcycloalkapolyene - 1,4 - oxazepine compound of the Formula XXIIIb:

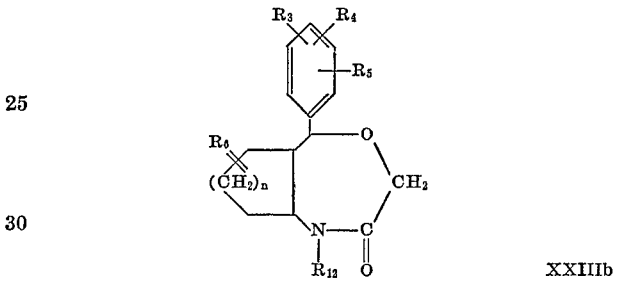

wherein $n$ has a value from 1 to 4, inclusive; wherein $R_{12}$ is alkyl of 1 to 16 carbon atoms, inclusive, phenylalkyl, in which alkyl is of 1 to 6 carbon atoms, inclusive, and

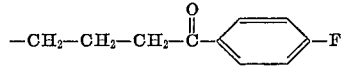

and wherein $R_3$, $R_4$, and $R_5$ are selected from the group of substituents consisting of hydrogen, halogen, alkyl of 1 to 6 carbon atoms, inclusive, and alkoxy of 1 to 6 carbon atoms, inclusive, and $-CF_3$; wherein $R_6$ is

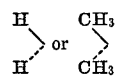

which comprises: treating a 2-oxazepinone of the formula:

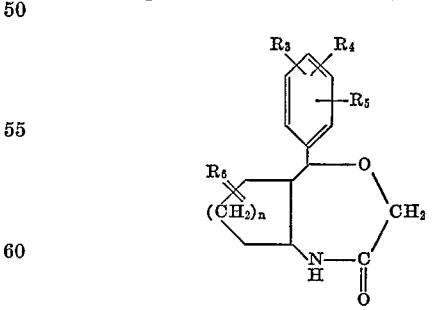

wherein $n$, $R_3$, $R_4$, $R_5$, and $R_6$ are defined as above, with a halo compound selected from alkyl halides in which alkyl has from 1 to 16 carbon atoms, inclusive, phenylalkyl halides, in which alkyl is of 1 to 6 carbon atoms, inclusive, and

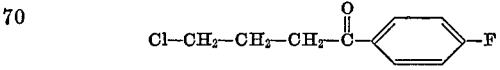

in the presence of a strong base to obtain the compound XXIIIb above.

66. A process according to claim 64 for the production of a perhydro - 5 - phenylcycloalkapolyene-1,4-oxazepine compound of the Formula XXIIIa:

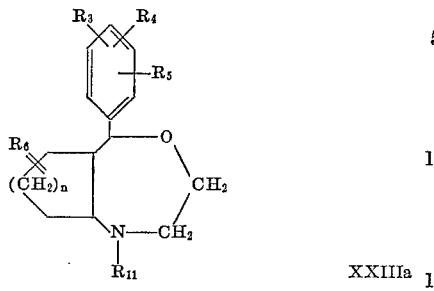
XXIIIa wherein $n$ has a value from 1 to 4, inclusive; wherein $R_{11}$ is alkyl of 1 to 16 carbon atoms, inclusive, benzyl and phenethyl; wherein $R_3$, $R_4$, and $R_5$ are selected from the group of substituents consisting of hydrogen, halogen, alkyl of 1 to 6 carbon atoms, inclusive, and alkoxy of 1 to 6 carbon atoms, inclusive, and —$CF_3$ wherein $R_6$ is

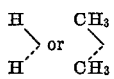

which comprises: treating in an organic solvent a 1,3-aminoalcohol of the formula:

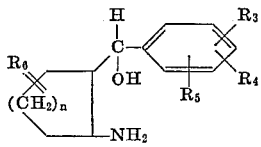

wherein $n$, $R_3$, $R_4$, $R_5$ and $R_6$ have the significance of above, with chloroacetyl chloride, at a temperature between —10 and +20° C. to obtain the corresponding acetamide of the formula:

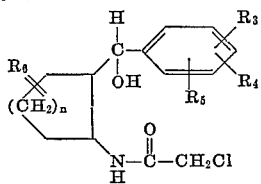

wherein $n$, $R_3$, $R_4$, $R_5$ and $R_6$ are defined as above; treating this compound with a strong base to obtain the corresponding 2-oxazepinone of the formula:

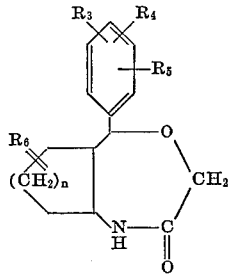

wherein $n$, $R_3$, $R_4$, $R_5$ and $R_6$ are defined as above; reducing this 2-oxapinone with lithium aluminum hydride to obtain the oxazepine of the formula:

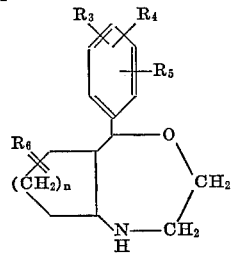

wherein $n$, $R_3$, $R_4$, $R_5$ and $R_6$ are defined as above; treating this oxazepine with an acylating agent selected from formic acid ethyl formate, the acid halides and acid anhydrides of alkanoic acids of 2 to 16 carbon atoms, inclusive, and of benzoic acid and phenylacetic acid to obtain the corresponding 1-acyloxazepine and reducing this 1-acyloxazepine with lithium aluminum hydride to obtain a product of the Formula XXIIIa above.

67. The process of claim 65 wherein the base is sodium hydride.

68. A process for the production of cis-A-decahydro-5-(p-methoxyphenyl) - 4,1 - benzoxazepine, according to claim 64, which comprises: treating cis-A-α-(p-methoxyphenyl)-2 - aminocyclohexanemethanol with chloroacetyl chloride in an organic solvent in the presence of triethylamine to give cis - A - 2 - chloro-N-[2-(α-hydroxy-p-methoxybenzyl)cyclohexyl]acetamide; treating this amide in an organic solvent with a strong base to obtain cis-A-octahydro-5-(p-methoxyphenyl) - 4,1 - benzoxazepin-2 (3H)-one; reducing this oxazepinone with lithium aluminum hydride in an organic solvent to obtain cis-A-decahydro-5-(p-methoxyphenyl)-4,1-benzoxazepine.

69. The process of claim 68 in which the strong base used in the cyclization is sodium hydride in the presence of tetrahydrofuran.

70. The process of claim 68 in which the strong base used in the cyclization is sodium ethoxide in the presence of ethanol.

71. A process for the production of cis-A-decahyro-5-phenyl-4,1-benzoxazepine according to claim 64, which comprises: treating cis-A-α-phenyl-2-aminocyclohexanemethanol with chloroacetyl chloride in an organic solvent in the presence of triethylamine to give cis-A-2-chloro-N-[2 - (α-hydroxybenzyl)cyclohexyl]acetamide; treating this amide in an organic solvent with a strong base to obtain cis-A-octahydro - 5 - phenyl - 4,1 - benzoxazepin-2(3H)-one; reducing this oxazepinone with lithium aluminum hydride in an organic solvent to obtain cis-A-decahydro-5-phenyl-4,1-benzoxazepine.

72. A process according to claim 68 for the production of cis-A-decahydro-5-(p-methoxyphenyl)-1-ethyl-4,1-benzoxazepine, which comprises the additional steps of acylating cis-A-decahydro-5-(p-methoxyphenyl)-4-,1-oxazepine with acetic anhydride and reducing the thus-obtained amide with lithium aluminum hydride to obtain cis-A-decahydro - 5 - (p-methoxyphenyl) - 1 - ethyl-4,1-benzoxazepine.

73. A process according to claim 64 for the production of cis-A-decahydro-5-(p-methoxyphenyl) - 1 -butyl-4,1-benzoxazepine which comprises the additional steps of alkylating with butyl bromide in the presence of sodium hydride in an organic solvent cis-A-decahydro-5-(p-methoxyphenyl)-4,1-benzoxazepin-2(3H)-one, and reducing the resulting cis-A-octahydro - 5 - (p-methoxyphenyl)-1-butyl-4,1-benzoxazepin-2(3H)-one with lithium aluminum hydride in an organic solvent.

74. A process according to claim 64 for the production of cis-A-decahydro-5-(p-methoxyphenyl)-1-[2 - (dimethylamino)ethyl] - 4,1 - benzoxazepine which comprises the additional steps of alkylating with 2-(dimethylamino)ethyl chloride in the presence of sodium hydride in an organic solvent cis-A-decahydro-5-(p-methoxyphenyl)-4,1-benzoxazepin-2(3H)-one and reducing the thus obtained cis-A-octahydro-5-(p-methoxyphenyl) - 1 - [2-(dimethylamino)ethyl] - 4,1 - benzoxazepin-2(3H)-one with lithium aluminum hydride in an organic solvent.

References Cited
UNITED STATES PATENTS
3,346,565  10/1967  Testa et al. _____ 260—239.3

HENRY R. JILES, Primary Examiner

U.S. Cl. X.R.

260—247.5, 268, 562, 294.7, 326.5, 333, 591, 570.5; 424— 244, 248, 250, 267, 274; 71—88, 94, 92, 95; 252—401, 62.2

UNITED STATES PATENT OFFICE
CERTIFICATE OF CORRECTION

Patent No. 3,598,808     Dated August 10, 1971

Inventor(s) Jacob Szmuszkovicz

It is certified that error appears in the above-identified patent and that said Letters Patent are hereby corrected as shown below:

Column 1, line 11, for "cycloalkapolylene" read -- cycloalkapolyene --. Column 7, line 38, for "$R_3$ $R_4$ $R_5$" read -- $R_3$, $R_4$, $R_5$ --; line 40, for "alkyl to 1" read -- alkyl of 1 --. Column 8, line 1, "cyclophentyl" read -- cyclopentyl --; line 34, for "propylpiperidino" read -- piperidino --; line 43, for "anl" read -- and --; line 44, for "(2-" read -- 2-( --; line 46, for "aminoethyl" read -- amino)ethyl --; line 50, for "3-di-" read -- 3-(di- --. Column 9, line 19, for "halide," read --halides, --; line 34, for "phenyl-2-" read -- phenyl)-2- --; line 60, for "oxazepine" read -- oxazepines --. Column 11, line 22, for "salt" read -- salt. --. Column 12, line 4, for "with a" read -- with an --. Column 14, line 6, for "24," read -- $\underline{24}$, --; line 18, for "benzensulfonates" read -- benzenesulfonates --. Column 19, line 56, for "C, 69.75;" read -- C, 69.79; --. Column 21, line 27, for "40 ml." read -- 400 ml. --. Column 22, line 23, for "1-[3-dimethyl" read -- 1-[3-(dimethyl- --. Column 23, line 60, for "[2-dimethy- amino]" read -- [2-(dimethylamino) --. Column 24, line 66, for "$C_{20}H_{32}NO_2$" read -- $C_{20}H_{31}NO_2$ --. Column 27, line 2, for "benzoazepine" read -- benzoxazepine --; line 35, for "mole" read -- mole) --; line 45, for "-5-p-" read -- -5-(p- --. Column 30, line 74, for "C, 17.33;" read -- C, 71.33; --. Column 31, line 5, for "13.2 of" read -- 13.2 g. of --; line 6, for "31.2 g." read -- 13.2 g. --; line 22, for ",1,550);" read -- (1,550); --; line 47, for "4.9 g." read -- 4.7 g. --; line 62, for "(14,250;" read -- (14,250); --; line 62, for "(1,500);" read -- (1,550); --. Column 32, line 2, for "2882" read -- 282 --; line 18, for "benzoazepine" read -- benzoxazepine --; line 22, for "1043" read -- 10.43 --. Column 35, line 38, for "benzoazepine" read -- benzoxazepine --. Column 37, line 14, for "yl-2-" read -- -yl)-2- --; line 73, for "benzoxazepin" read -- benzoxazepine --. Column 38, line 32, for "cyclohexlacet- amide" read Page 2

UNITED STATES PATENT OFFICE
CERTIFICATE OF CORRECTION

Patent No. 3,598,808                    Dated  August 10, 1971

Inventor(s) Jacob Szmuszkovicz

It is certified that error appears in the above-identified patent and that said Letters Patent are hereby corrected as shown below:

-- cyclohexyl] --. Column 41, line 20, for "cyclopenta" read -- cyclohepta --; line 46, for "zylcyclo-" read -- zyl)cyclo --; line 60, for "oxzepin" read -- oxazepin --. Column 42, line 46, for "in a" read -- in the --. Column 43, line 47, for "[e[[1,4]" read -- [e][1,4] --; line 71, for "[2-" read -- [2-( --. Column 46, line 20, for "30-60 C." read -- 30-60° C. --. Column 47, line 6, for "filter cake" read -- the filter cake --. Column 48, line 23, for "84-86 C." read -- 84-86° C. --; line 35, for "12.5 g." read -- (12.5 g. --; line 66, for "phnyl)" read -- phenyl) --. Column 50, line 36, for "70.99;" read -- C, 70.99; --. Column 51, line 74, for "benzoazepin" read -- benzoxazepin --. Column 52, line 21, for "-1-H-" read -- -1H- --; line 32, for "1-H-" read --decyl-1H- --; line 60, for "[2,4]" read -- [1,4] --; lines 64-65, for "-1-H-cyclopenta-[e]1,4]" read -- -1H-cyclopenta[e][1,4] --. Column 53, line 1, for "-heptyl" read -- 1-heptyl --; line 9, for "-1-H-" read -- -1H- --; line 57, for "5-m" read -- 5-(m- --. Column 59, line 32, for "benzoazepine" read -- benzoxazepine --; line 54, for "m-chlorobenzoic" read -- m-chloroperbenzoic --. Column 62, Formula XXIII, should read as shown below:

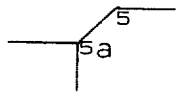

Column 64, line 30, for "cis-P" read -- cis-B --. Column 66, line 52, for "phenvl" read -- phenyl --; line 59, Claim 61, for "claim 1 wherein" read -- claim 1 as hydrochloride wherein --. Column 69, line 61, for "2-oxapinone" read -- 2-oxazepinone. --.

Signed and sealed this 18th day of July 1972.

(SEAL)
Attest:

EDWARD M. FLETCHER, JR.
Attesting Officer

ROBERT GOTTSCHALK
Commissioner of Patents